(12) United States Patent
Musilli et al.

(10) Patent No.: US 12,507,815 B2
(45) Date of Patent: Dec. 30, 2025

(54) STOREFRONT PICKUP SYSTEM

(71) Applicant: Shayo Musilli Holdings, LLC, Astoria, NY (US)

(72) Inventors: Michael Anthony Musilli, New York, NY (US); Matthew Austin Shayo, New York, NY (US)

(73) Assignee: Shayo Musilli Holdings, LLC, Astoria, NY (US)

( * ) Notice: Subject to any disclaimer, the term of this patent is extended or adjusted under 35 U.S.C. 154(b) by 268 days.

(21) Appl. No.: 18/179,819

(22) Filed: Mar. 7, 2023

(65) Prior Publication Data

US 2023/0309720 A1 Oct. 5, 2023

Related U.S. Application Data

(60) Provisional application No. 63/362,463, filed on Apr. 5, 2022.

(51) Int. Cl.
| | |
|---|---|
| *A47F 10/00* | (2006.01) |
| *A47B 46/00* | (2006.01) |
| *A61L 2/10* | (2006.01) |
| *E05F 15/611* | (2015.01) |
| *E06B 7/32* | (2006.01) |
| *F25D 13/02* | (2006.01) |

(52) U.S. Cl.
CPC .............. *A47F 10/00* (2013.01); *A47B 46/00* (2013.01); *A61L 2/10* (2013.01); *E05F 15/611* (2015.01); *E06B 7/32* (2013.01); *F25D 13/02* (2013.01); *A61L 2202/11* (2013.01); *A61L 2202/121* (2013.01); *E05Y 2201/434* (2013.01); *E05Y 2201/686* (2013.01); *E05Y 2999/00* (2024.05)

(58) Field of Classification Search
CPC . A47F 10/00; A47B 46/00; A61L 2/10; A61L 2202/11; A61L 2202/121; E05F 15/611; E05Y 2999/00; E05Y 2201/434; E05Y 2201/686; E06B 7/32; F25D 13/02
See application file for complete search history.

(56) References Cited

U.S. PATENT DOCUMENTS

| | | | |
|---|---|---|---|
| 3,224,361 A | 12/1965 | Öjelid | |
| 3,397,817 A | 8/1968 | Smith | |
| 4,677,278 A | 6/1987 | Knoll | |
| 6,588,655 B2 | 7/2003 | Stapleton, Jr. | |
| 9,926,737 B2 * | 3/2018 | Wanjohi | A47G 29/126 |
| 9,955,812 B2 * | 5/2018 | Charbeneau | A47G 29/22 |

(Continued)

OTHER PUBLICATIONS

What Are Food Lockers? How Do They Work?; GRUBBRR; Nov. 8, 2021; available at: https://grubbrr.com/what-are-food-lockers/.

(Continued)

*Primary Examiner* — Chi Q Nguyen
(74) *Attorney, Agent, or Firm* — Merchant & Gould P.C.

(57) ABSTRACT

A storefront pickup system for installation into a storefront of a building. The storefront pickup system provides a thermal break between an exterior and an interior of the building, allowing ordered items such as food and beverages to travel through the storefront. The storefront pickup system includes a storage compartment having a rear door assembly providing access to the storage compartment from an interior of the building, and a front door assembly providing access to the storage compartment from an exterior of the building.

18 Claims, 47 Drawing Sheets

(56) References Cited

U.S. PATENT DOCUMENTS

| | | | |
|---|---|---|---|
| 10,304,147 | B2 | 5/2019 | Kelly et al. |
| 10,586,411 | B2 | 3/2020 | Zurkuhlen et al. |
| 10,588,439 | B2 * | 3/2020 | Charbeneau ........... A47G 29/22 |
| 10,600,041 | B2 | 3/2020 | Kelly et al. |
| 11,224,302 | B2 * | 1/2022 | Jeffs ....................... A47G 29/30 |
| 11,278,144 | B2 * | 3/2022 | Vernal Silva ........ A47G 29/141 |
| 11,328,545 | B2 * | 5/2022 | Kane .................. G07C 9/00896 |
| 11,346,150 | B1 * | 5/2022 | Johnston ............... A47G 29/141 |
| 11,426,020 | B2 * | 8/2022 | Morgan ............. A47G 29/1245 |
| 11,534,015 | B2 * | 12/2022 | Janas .................... A47G 29/141 |
| 11,889,938 | B2 * | 2/2024 | Jordan ................. A47G 29/141 |
| 12,296,058 | B2 * | 5/2025 | Stibich ....................... A61L 2/24 |
| 2014/0089077 | A1 | 3/2014 | Zuckerman et al. |
| 2021/0045564 | A1 * | 2/2021 | Duckers .................. E06B 3/483 |
| 2021/0230926 | A1 * | 7/2021 | Schler .................... G06Q 10/08 |

OTHER PUBLICATIONS

Dean, Grace; Why Food Lockers Are Poised to Be the Next Big Thing in Fast Food; Business Insider; Mar. 7, 2021, available at: https://www.businessinsider.com/what-are-food-lockers-kfc-burger-king-smashburger-2021-3.

Bell and Howell Introduces Versatile Grocery Locker, Food Logistics, Jan. 4, 2021, obtained online at: https://www.foodlogisitics.com/warehousing/grocery-retail/press-release/21219639/bell-and-howell-introduces-versatile-grocery-locker, 2 pgs.

Hatco's Flav-R 2-Go® Pizza Locker System Changes the Carry-Out Pizza Game, Sep. 1, 2021, obtained online at: htttps://www.hatcocorp.com/en/news/press-releases/detail/flav-r-2-go-pizza-locker-system, 3 pgs.

Merco, "Demand for Efficient Order Handoff Inspires ORDERHQ™ Lockers", Sep. 1, 2021, obtained online at: https://www.mercoproducts.com/News/News/2021/September/Demand-for-Efficient-Order-Handoff-Inspires, 4 pgs.

Pagertec, "Food Delivery Locker", obtained online Aug. 27, 2025 at: https://www.pagertec.com/pages/food-delivery-locker, 16 pgs.

Penguin Lockers, "We manufacture cold and hot food lockers with great software", obtained online Aug. 27, 2025 at: https://penguinlockers.com/, 25 pgs.

RestaurantNews.com, "Taffer's Tavern Introduces Thru-wall, Contactless Locker System in Collaboration with Carter-Hoffmann and Perfect Company", Mar. 18, 2021, obtained online at: https://www.restaurantnews.com/taffers-tavern-introduces-thru-wall-contactless-locker-system-in-collaboration-with-carter-hoffmann-and-perfect-company, 6 pgs.

* cited by examiner

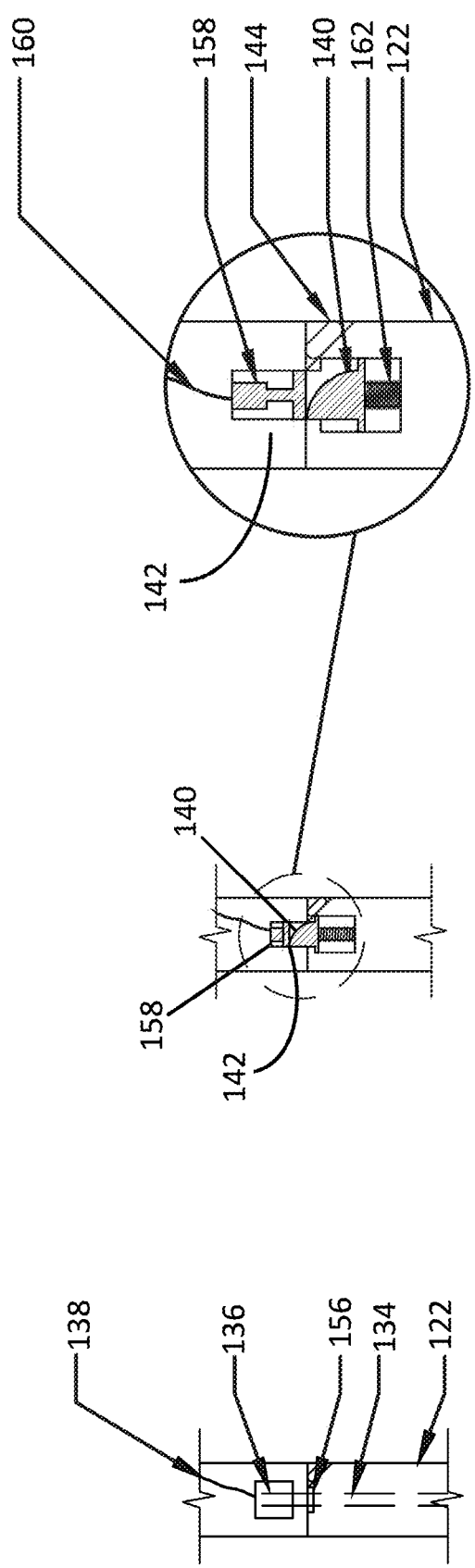

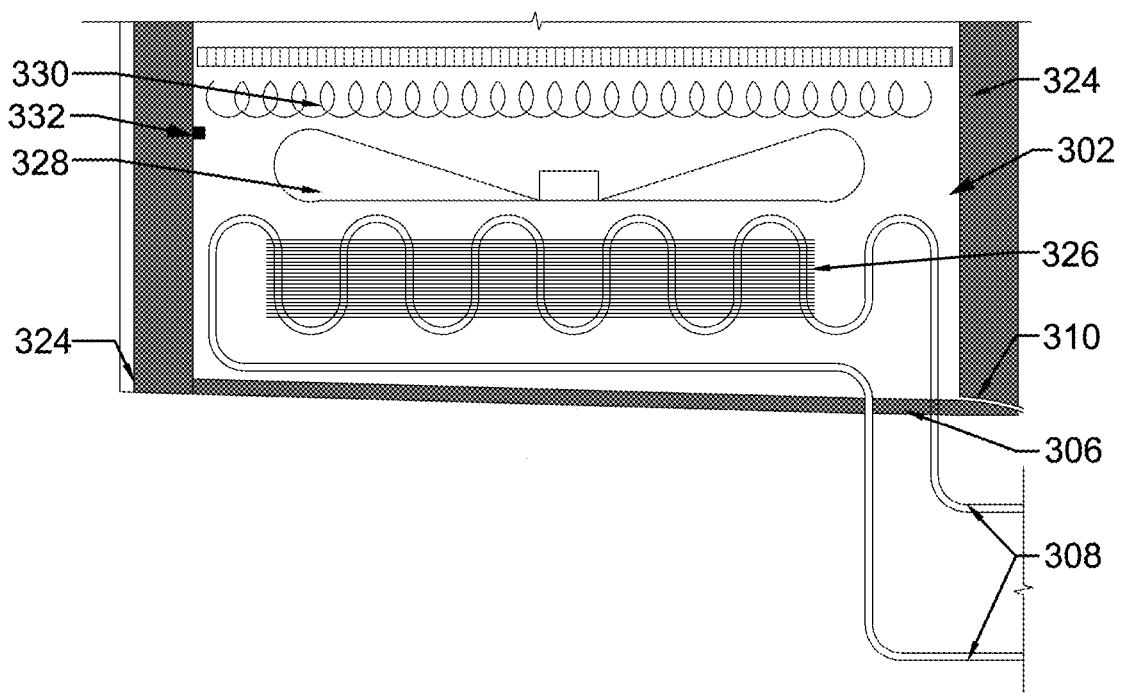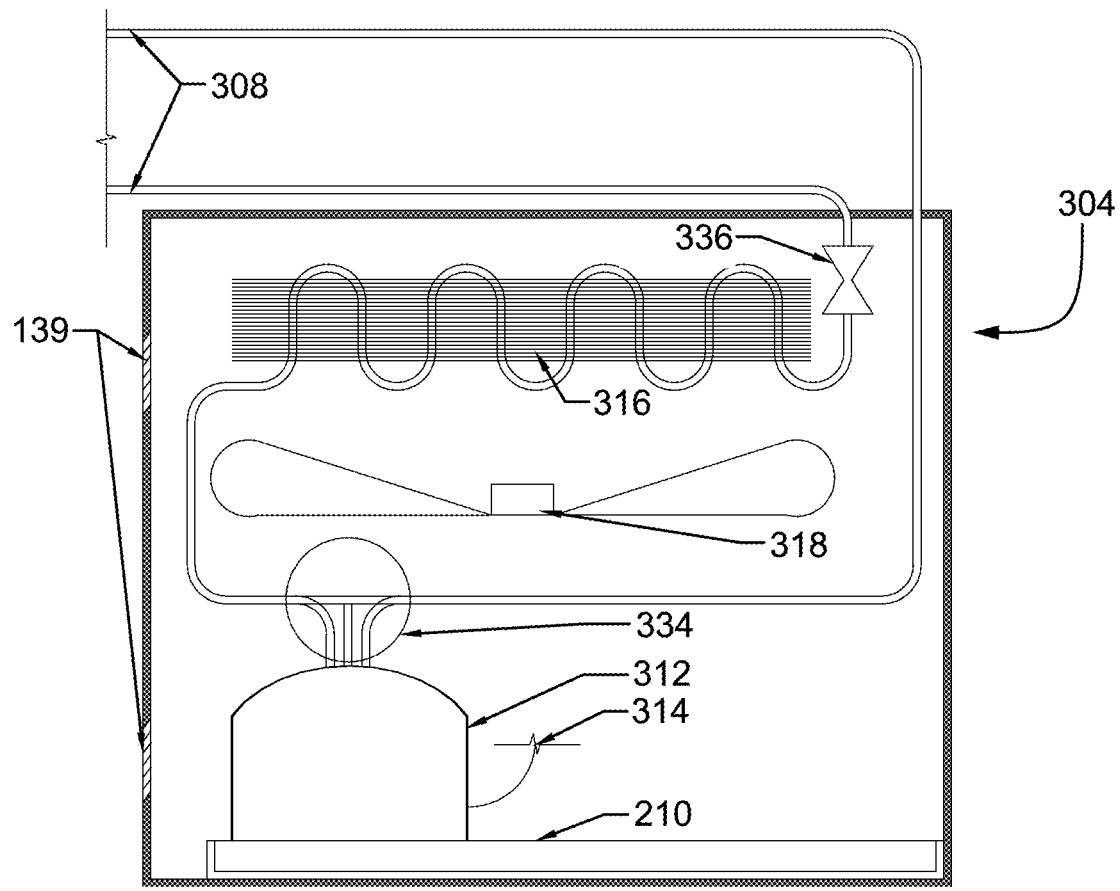
FIG. 21C

STOREFRONT PICKUP SYSTEM

CROSS REFERENCE TO RELATED APPLICATIONS

This application claims priority to U.S. patent application Ser. No. 63/362,463, filed Apr. 5, 2022, the disclosure of which is incorporated herein by reference in its entirety.

BACKGROUND

In the food and beverage industry, locker pickup systems have increased in popularity. A locker pickup system typically includes individual cubicles that hold items such as food and beverages for pick-up. Products ordered through locker pickup systems are often left waiting for pick up in a non-thermally optimized and conditioned environment, causing the food and beverage products to deviate from their optimal temperature for consumption by customers.

Locker pickup systems can integrate with traditional restaurant ordering and management systems. In some examples, locker pickup systems allow customers to enter a code to unlock a cubicle and retrieve a completed order having food and beverage items.

Locker pickup systems are typically located inside an interior of a retail establishment such as a restaurant, which requires customers to enter the retail establishment to pick up their food and beverage order. However, this can expose customers to germs and diseases. Also, this layout requires the retail establishment to build or lease an interior commercial space for customer use, which can result in inefficient use of real estate and increased overhead expenses.

SUMMARY

In general terms, the present disclosure relates to a storefront pickup system. In one possible configuration, the storefront pickup system is installed into an exterior wall opening providing a thermal break between an exterior and an interior of a building, allowing food items to travel through a storefront of the building. In another possible configuration, the storefront pickup system conditions one or more storage compartments to maintain optimal temperature of food and beverage products held therein. Various aspects are described in this disclosure, which include, but are not limited to, the following aspects.

In one aspect, a storefront pickup system comprises: a support structure configured for installation into a storefront of a building; at least one storage compartment defined by the support structure, the at least one storage compartment including: a rear door assembly providing access from an interior of the building to the at least one storage compartment; a front door assembly providing access from an exterior of the building to the at least one storage compartment; and an exterior faceplate attached to the support structure, the exterior faceplate surrounding the at least one storage compartment and being made of a weather-resistant material; wherein the storefront pickup system provides a thermal break between the exterior and the interior of the building to allow ordered items to travel through the storefront.

In another aspect, a storage compartment for a storefront pick up system comprises: a housing defining an internal cavity; a rear door assembly attached to the housing, the rear door assembly providing access to the internal cavity from an interior of a building; a front door assembly attached to the housing, the front door assembly providing access to the internal cavity from an exterior of the building; a sensor to detect when ordered items are placed inside the internal cavity and to detect when the ordered items are removed from the internal cavity; and a sterilization assembly automated to sanitize the internal cavity after the sensor detects that the ordered items are removed from the internal cavity, wherein the sterilization assembly includes at least one light source configured to emit ultraviolet light to sanitize the internal cavity, and wherein the front door assembly includes a window coated with a protective film to block the ultraviolet light from exiting the internal cavity during sanitization.

In another aspect, a method of sanitizing a storefront pickup system comprises: detecting removal of an ordered item from a storage compartment; detecting a rear door assembly is closed, the rear door assembly providing access from an interior of a building to the storage compartment; detecting a front door assembly is closed, the front door assembly providing access from an exterior of the building to the storage compartment; and operating a sterilization assembly to sanitize the storage compartment.

In another aspect, a method of installing a storefront pickup system comprises: determining a size for the storefront pickup system; removing a segment of a building storefront to create an opening having the size; framing the opening to structurally shore up the building storefront; installing the storefront pickup system inside the opening; and insulating gaps between the storefront pickup system and the opening to create a thermal break between an exterior of the building and an interior of the building to allow ordered items to travel through the building storefront via the storefront pickup system.

In another aspect, a method of operating a storefront pickup system comprises: receiving an order from a customer for one or more items; confirming availability of a storage compartment; changing a status of the storage compartment from available to reserved when availability of the storage compartment is confirmed; changing the status of the storage compartment from reserved to confirmed when payment for the order is received from the customer; sanitizing the storage compartment using ultraviolet light; unlocking a rear door assembly of the storage compartment allowing placement of the one or more items into the storage compartment from an interior of a building; receiving a signal that the customer is ready to pick up the one or more items; and unlocking a front door assembly of the storage compartment allowing the customer to remove the one or more times from the storage compartment from an exterior of the building.

A variety of additional aspects will be set forth in the description that follows. The aspects can relate to individual features and to combination of features. It is to be understood that both the foregoing general description and the following detailed description are exemplary and explanatory only and are not restrictive of the broad inventive concepts upon which the embodiments disclosed herein are based.

DESCRIPTION OF THE FIGURES

The following drawing figures, which form a part of this application, are illustrative of the described technology and are not meant to limit the scope of the disclosure in any manner.

FIG. 10 is a cross-sectional view of a pivot rod and motor assembly of the storage compartment taken along line B of FIG. 8.

FIG. 11 is a cross-sectional view of a lock casing of the storage compartment taken along line C of FIG. 8, with a spring-loaded latch shown in a locked position.

FIG. 12 is a view of the lock casing of FIG. 11, with the spring-loaded latch shown in an unlocked position.

FIG. 21C is a cross-sectional view of another example of a heating, ventilation, and air conditioning system for the storefront pickup system of FIG. 1.

DETAILED DESCRIPTION

Figure 1:
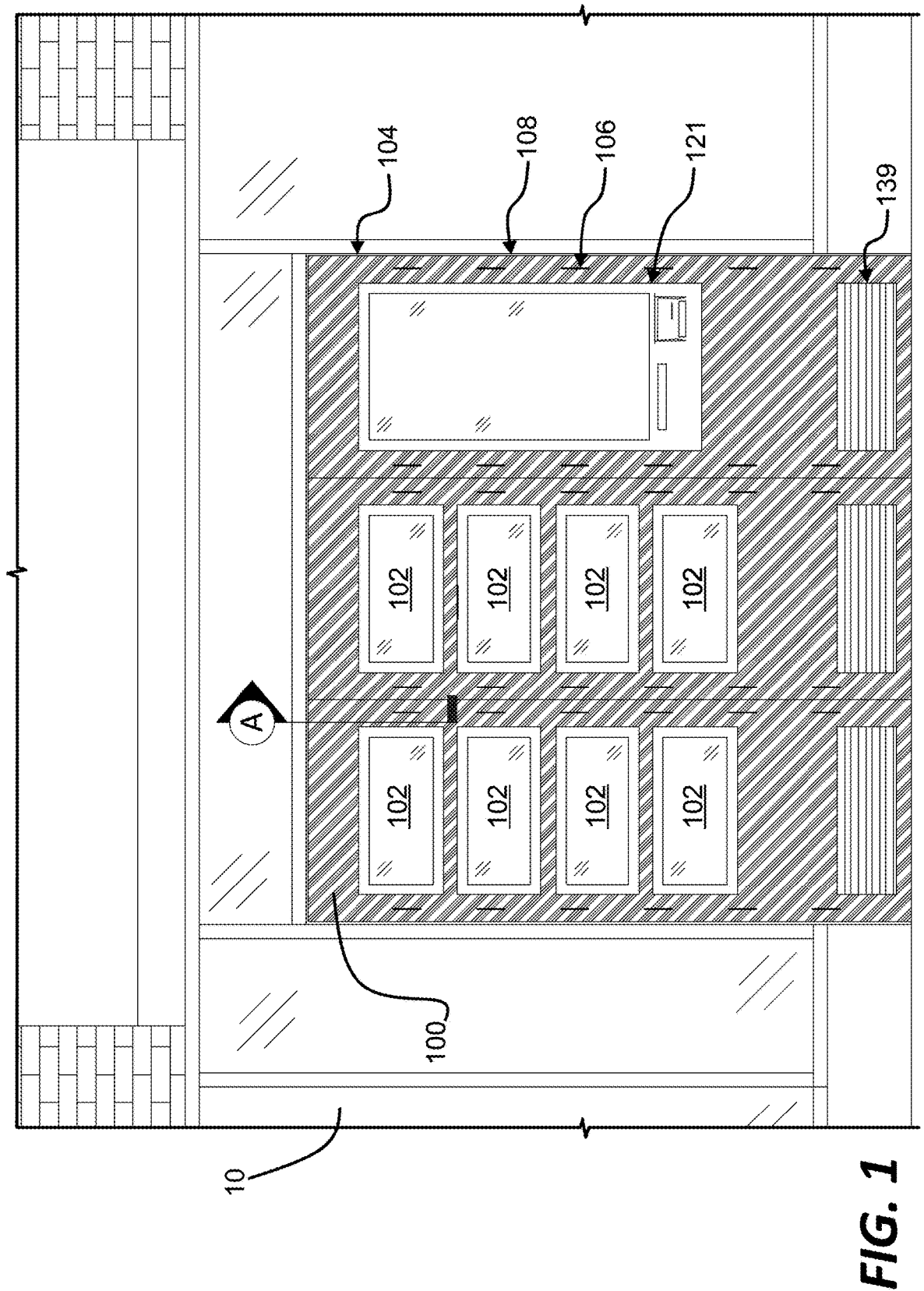
FIG. 1 is an exterior elevation view of an example of a storefront pickup system.

FIG. 1 is an exterior elevation view of an example of a storefront pickup system 100. The storefront pickup system 100 is a contact-less product conveyance system that can hygienically protect both customers and retail employees. Additionally, the storefront pickup system 100 can reduce square footage requirements for retail establishments (see FIG. 46), can eliminate customer queuing, and can thermally isolate an interior of the retail establishment to reduce energy consumption and heating, ventilation, and air conditioning (HVAC) loads.

As shown in FIG. 1, the storefront pickup system 100 includes a plurality of storage compartments 102. Each of the storage compartments 102 is temperature controlled for preserving food and beverage items for pickup by a customer. Also, each of the storage compartments 102 is automatically sanitized after a customer completes pickup of an order.

In the example shown in FIG. 1, the storefront pickup system 100 includes three columns of storage compartments, and each column includes four storage compartments providing a total of twelve storage compartments. It is contemplated that the number of columns and the number of storage compartments included in each column may vary. Accordingly, the number of storage compartments and the size of the storefront pickup system 100 are customizable based on the needs of the retail establishment. Also, the size of each storage compartment 102 may vary as well.

The storefront pickup system 100 can further include a point of sale (POS) system 121. The POS system 121 is positioned externally on the storefront pickup system 100 such that it is customer-facing. The POS system 121 can take orders via touch screen and accept payment through cash, coins, credit cards, or contactless payment (e.g., Apple Pay™, Google Pay™, and similar electronic payment systems). When payment is received via cash and/or coins, the POS system 121 can issue appropriate change as required. The POS system 121 can be integrated into the storefront pickup system 100 and is thermally broken with non-shrink caulk 108.

Figure 2:
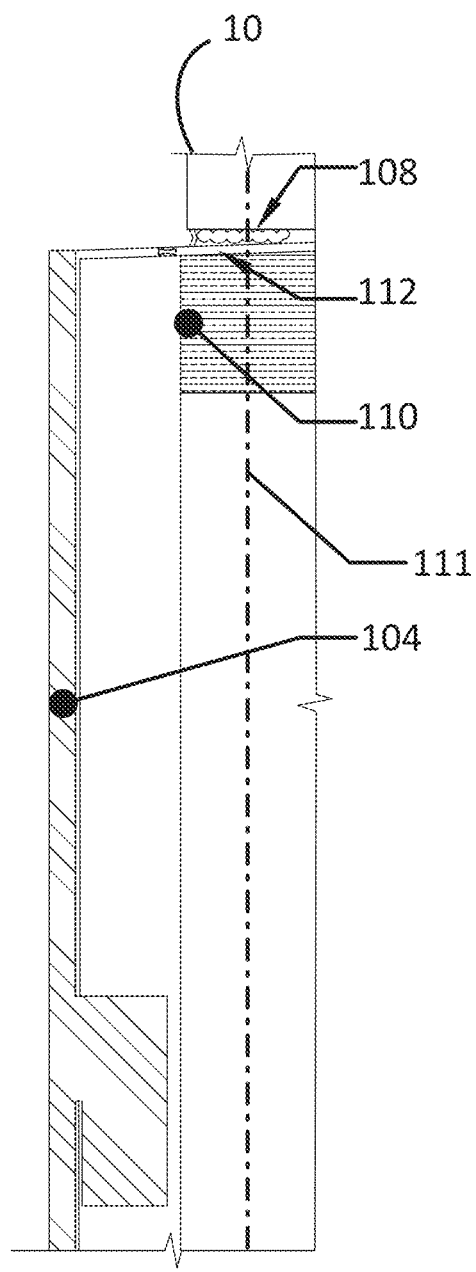
FIG. 2 is a cross-sectional side view of the storefront pickup system taken along line A of FIG. 1.

FIG. 2 is a cross-sectional side view of the storefront pickup system 100 taken along line A of FIG. 1. Referring now to FIGS. 1 and 2, the storefront pickup system 100 is designed for integration into an existing building façade or into a new building construction. For example, the storefront pickup system 100 is shown in FIGS. 1 and 2 as integrated into a building 10. In this example, the building 10 includes a storefront that is accessible by customers from a street or a sidewalk. As will be described in more detail, the storefront pickup system 100 is configured as a thermally broken storefront system for retail establishments.

A retail establishment can request a manufacturer of the storefront pickup system 100 to build the storefront pickup system 100 to have dimensions that are customizable based on the business needs of the retail establishment. Examples of the dimensions of the storefront pickup system 100 that are customizable include, for example, total height, total width, total depth, number of storage compartments, size of the storage compartments, and the like.

The manufacturer of the storefront pickup system 100 can then provide size requirements for the framed opening where the storefront pickup system 100 is to be installed, and electrical requirements for the storefront pickup system 100. Also, the manufacturer can provide customizable graphics or cladding for covering an exterior of the system. A licensed architect or professional engineer can then design the framed opening based on the size of the storefront pickup system 100 and site conditions. The storefront pickup system 100 can then be delivered to the site of the retail establishment and installed by a contractor.

As shown in FIGS. 1 and 2, the storefront pickup system 100 includes an exterior faceplate 104 that is made of a weather-resistant material that can withstand outside elements such as rain, snow, wind, sunlight, extreme temperatures (e.g., temperatures below freezing point during winter, and high temperatures during the summer), and the like. In some examples, the exterior faceplate 104 is made from 16-gauge aluminum sheet metal or similar material.

As shown in FIG. 1, the exterior faceplate 104 can include a plurality of slots 106. The slots 106 allow for cladding material (that can include customized graphics) to attach to the exterior faceplate 104. The cladding material can cover gaps between the storage compartments 102 and thereby provide a continuous, more clean surface appearance. The slots 106 and the cladding are optional depending on retail establishment needs.

As further shown in FIGS. 1 and 2, the storefront pickup system 100 includes filler spray foam insulation 103 and non-shrink caulk 108 to fill gaps between the storefront pickup system 100 and the opening of the building 10. The storefront pickup system 100 further includes rigid insulation 110 contained within a support structure of the storefront pickup system 100. The rigid insulation 110 can be installed between the storage compartments 102 (see also FIG. 4) and around the top, bottom, and left and right sides of the storefront pickup system 100. The filler insulation and non-shrink caulk 108 and the rigid insulation 110 can provide a thermal break 111 and waterproofing barrier between an exterior of the building and an interior of the building (e.g., see FIG. 2) to allow food items to travel through a storefront of the building 10.

As shown in FIG. 2, the storefront pickup system 100 includes a top plate 112 that is sloped in a direction toward the exterior of the building for runoff of moisture. In some examples the top plate 112 has at least a 2% minimum slope to runoff moisture. In some further examples the top plate 112 has at least a 1% minimum slope to runoff moisture. Advantageously, the top plate 112 can runoff moisture such as rain, snow, ice, sleet, and the like to prevent buildup of the moisture on top of the storefront pickup system 100 that can cause damage to the building and/or the storefront pickup system 100 such as due to water leaks, corrosion, and/or erosion.

Figure 3:
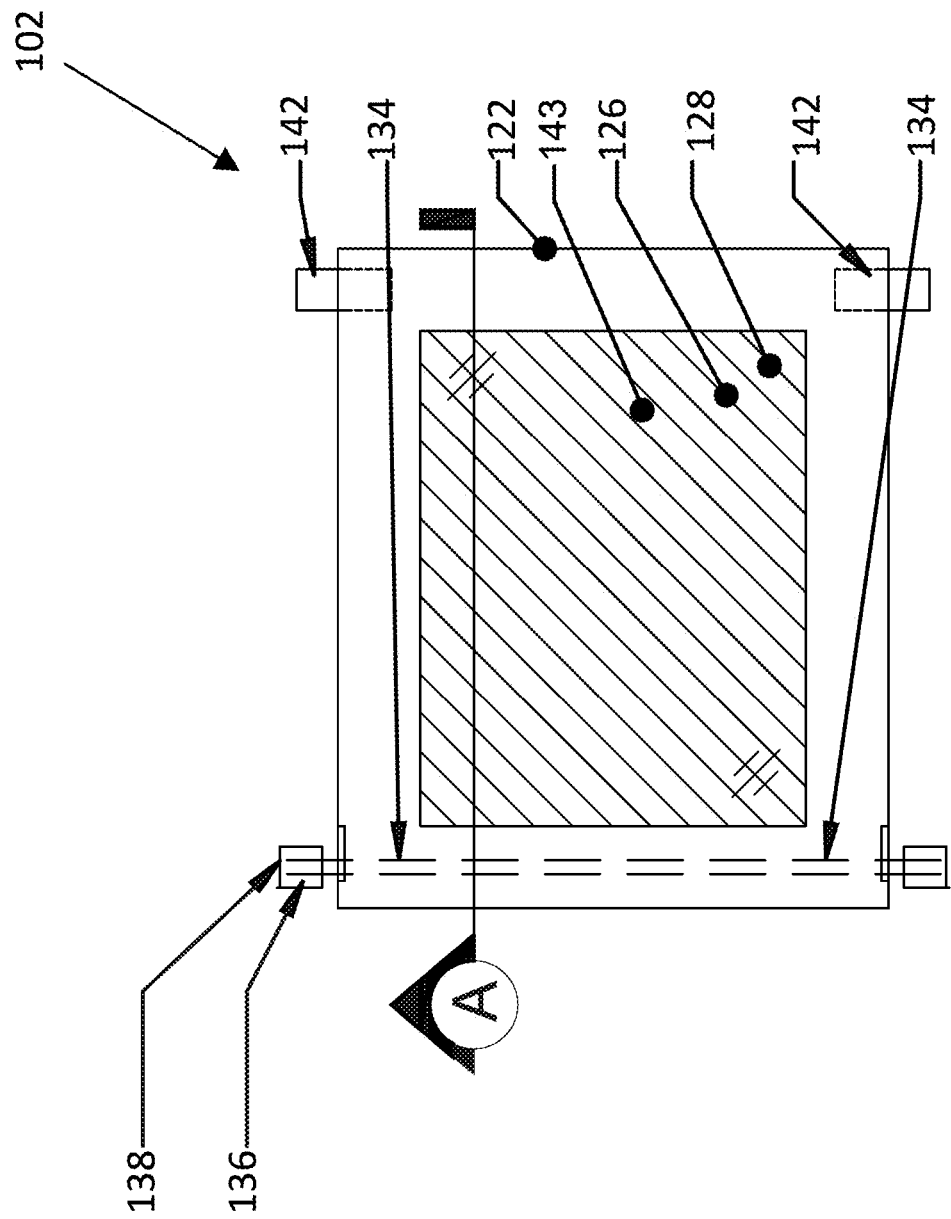
FIG. 3 is a front elevation view of a storage compartment of the storefront pickup system of FIG. 1.
Figure 4:
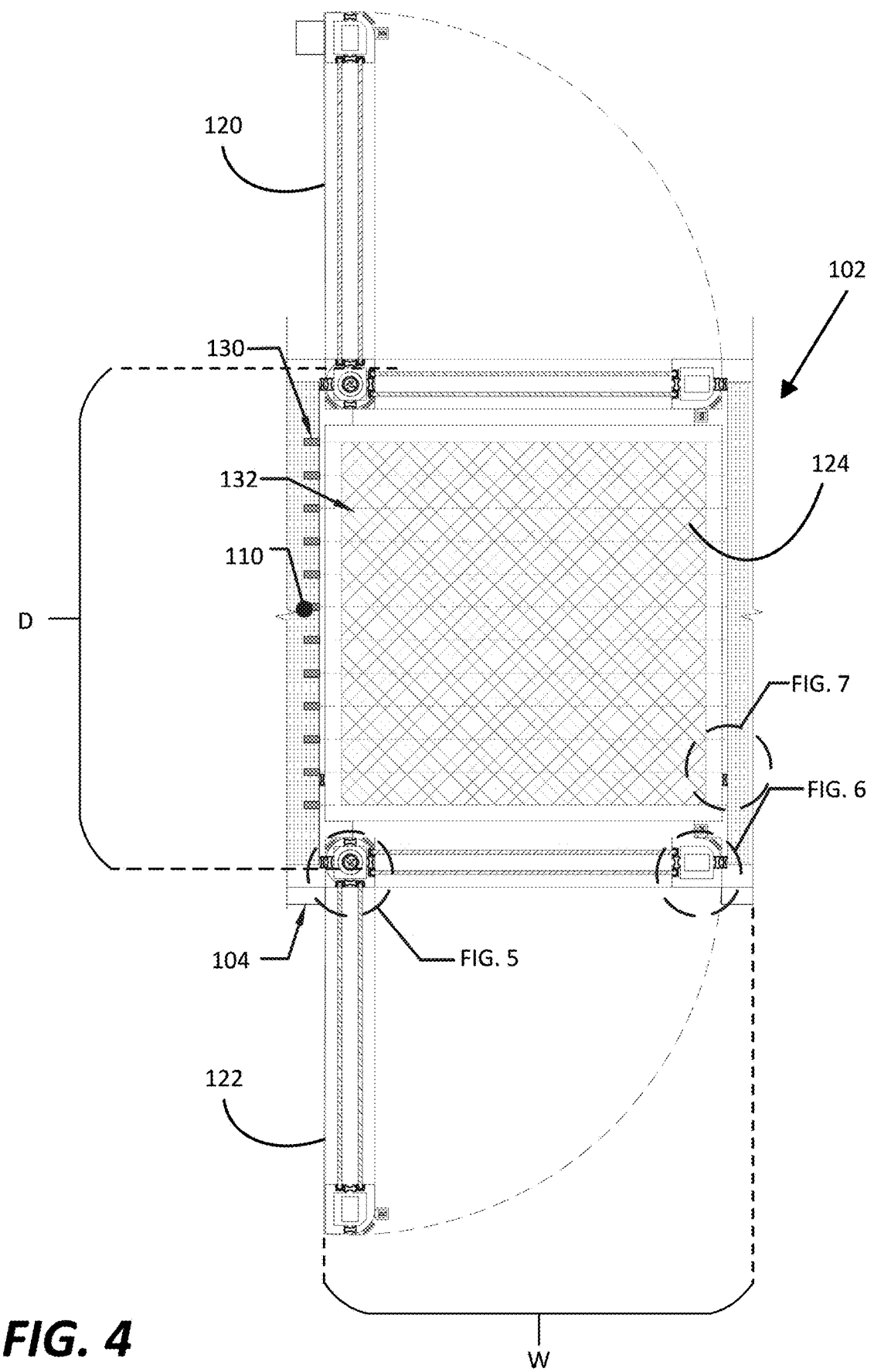
FIG. 4 is a cross-sectional top view of the storage compartment taken along line A of FIG. 3.

FIG. 3 is a front elevation view of a storage compartment 102 in a closed position. FIG. 4 is a cross-sectional top view of the storage compartment 102 taken along line A of FIG. 3. As shown in FIG. 4, the storage compartment 102 includes a width W and a depth D. The width W and the depth D of the storage compartment 102 are customizable based on the needs of the retail establishment. As shown in FIG. 4, the depth D of the storage compartment 102 extends through the depth of the building façade and into the interior of the building.

The storage compartment 102 includes a rear door assembly 120 providing access from an interior of the building 10 to an internal cavity 124 of the storage compartment 102, and a front door assembly 122 providing access from an exterior of the building 10 to the internal cavity 124 of the storage compartment 102. The rear and front door assemblies 120, 122 are each thermally insulated to maintain a desired temperature inside the internal cavity 124. In some instances, the rear and front door assemblies 120, 122 are each a thermal break assembly.

Each of the rear and front door assemblies 120, 122 includes a window 126. In some examples, the window 126 is made of tempered glass. In the example of FIG. 4, the windows 126 are double pane windows (e.g., two panes of glass separated by an air pocket).

As further shown in FIG. 3, the window 126 of the front door assembly 122 includes a protective film 128 to block ultraviolet (UV) light from exiting the internal cavity 124 while the storage compartment 102 is being sanitized by a sterilization assembly 176. The sterilization assembly 176 will be described in more detail below with reference to FIGS. 15 and 16. The protective film 128 can be applied to both the rear and front door assemblies 120, 122 to prevent the UV light from reaching employees and customers during the sanitization of the storage compartment 102. In some examples, the protective film 128 is a UV-C film.

As further shown in FIG. 3, the windows 126 of the rear and front door assemblies 120, 122 can each further include a hydrophobic glass coating 143. The hydrophobic glass coating 143 can mitigate excessive moisture accumulation, and can also facilitate proper draining of condensation by causing the condensation to slide down the windows 126 and into a drip pan 210 for draining through a condensation drain line 214 (see example shown in FIG. 21), or in another example, to slide down a divider 306 that directs the condensation toward a drain line 310 (see examples shown in FIGS. 21B and 21C).

Figure 5:
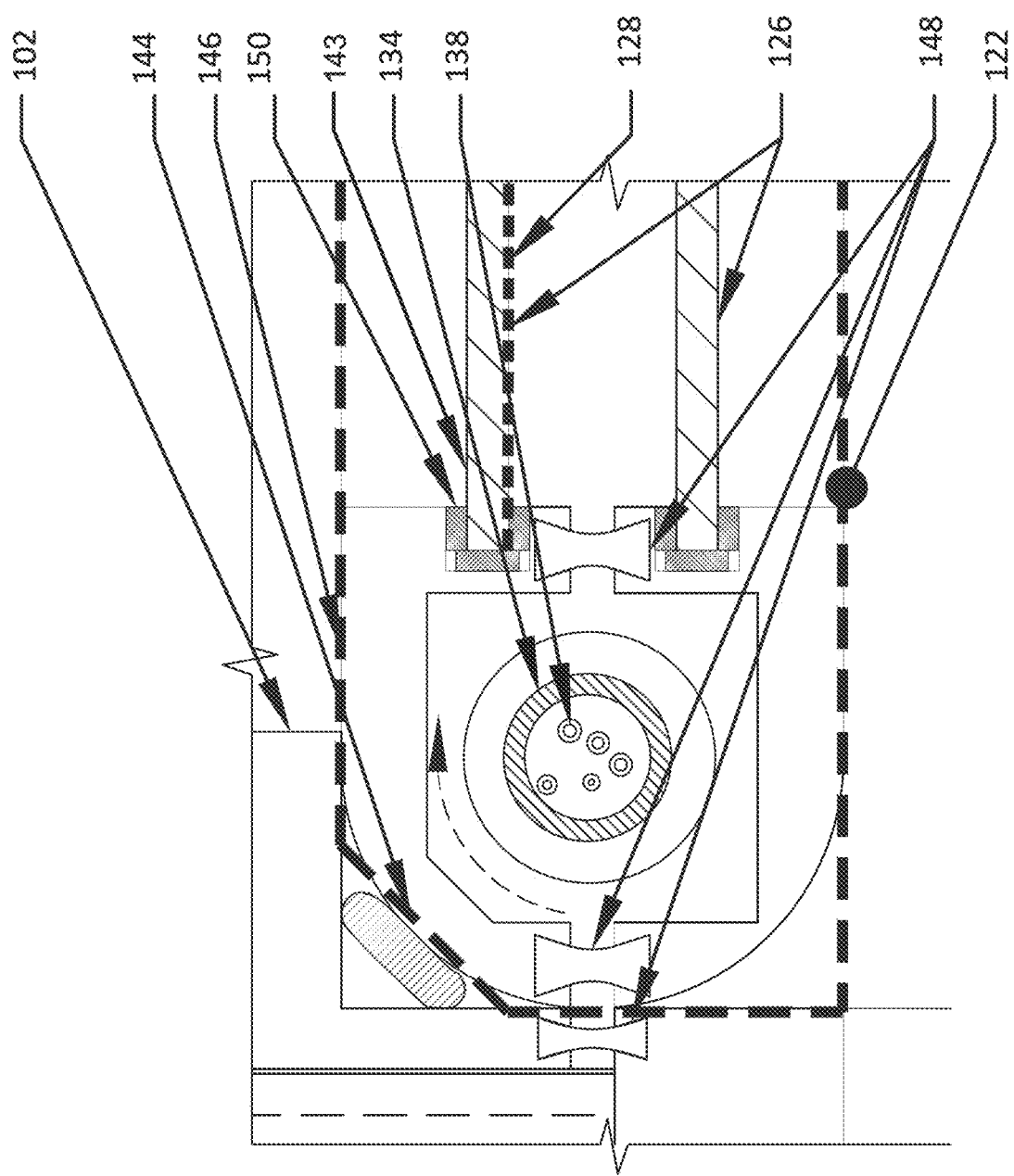
FIG. 5 is a detailed view of a pivot end of a storage compartment door assembly of the storage compartment shown in FIG. 4.
Figure 6:
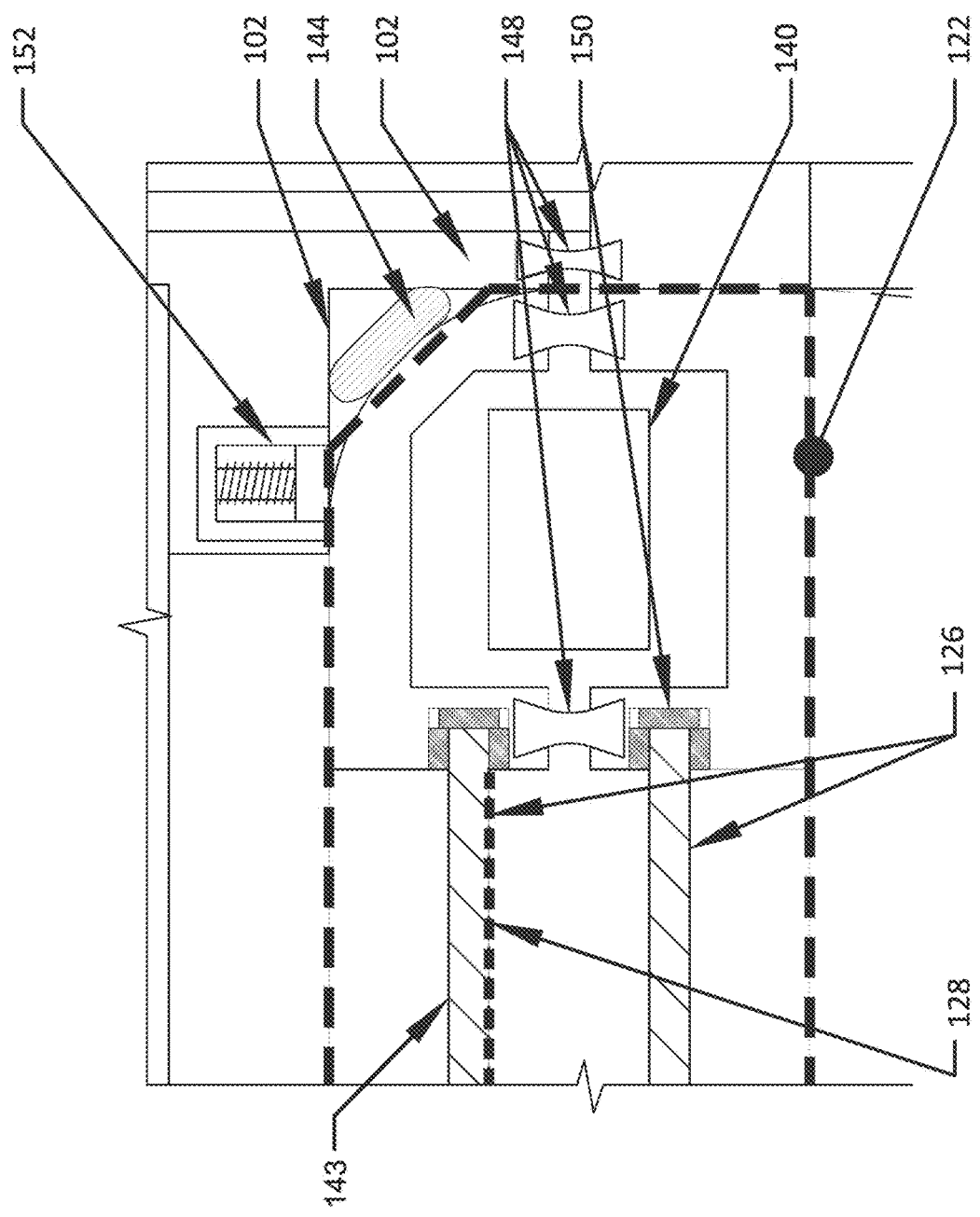
FIG. 6 is a detailed view of a receiving end of the storage compartment door assembly of the storage compartment shown in FIG. 4.

FIGS. 5 and 6 are detailed cross-sectional views of respective pivot and receiving ends of the front door assembly 122. As shown in FIGS. 5 and 6, the protective film 128 is applied to an interior surface of at least one pane of the double pane window of the front door assembly 122. Additionally, glass rubber spacers and/or non-shrink caulk 150 is applied around each of the panes of the window 126 to thermally insulate the front door assembly 122. Additionally, the glass rubber spacers and/or non-shrink caulk 150 can help to protect an inset glazing from temperature changes inside the storage compartment 102. A similar construction may also be used for the rear door assembly 120 of the storage compartment 102.

Referring to FIG. 4, the storage compartment 102 includes a sensor 130 to detect when the food items are placed inside the internal cavity 124 and to detect when the food items are removed from the internal cavity 124. In some examples, the sensor 130 is a laser occupancy sensor that is wired to a controller 4700 (see FIG. 47) that controls operation of the storefront pickup system 100. The sensor 130 can be used to detect when a food item has been picked up by a customer to trigger sanitization of the internal cavity 124 for use by another customer to pick up food items prepared by the retail establishment.

As shown in FIG. 4, the storage compartment 102 includes a removable mesh screen 132, which allows for air that is conditioned by a heating, ventilation, and air conditioning (HVAC) system 188 to flow freely throughout all inner internal cavities of the storage compartments 102 in the storefront pickup system 100.

Referring now to FIGS. 3-6, the pivot end of the front door assembly 122 is connected to a pivot rod 134 that is powered by an electric motor 136 to rotate about an axis of rotation. The rear door assembly 120 can have a similar construction as the front door assembly 122 such that the following description may also apply to the rear door assembly 120.

When the electric motor 136 powers the pivot rod 134 to rotate about the axis of rotation, the front door assembly 122 can swing from the closed position (see FIG. 3) to an open position (see FIG. 4), and can swing from the open position to the closed position. As shown in FIGS. 3 and 5, the electric motor 136 is connected to the controller 4700 via wiring 138. In some examples, the pivot rod 134 is hollow and the wiring 138 can run through the pivot rod. The electric motor 136 rotates the pivot rod 134 such that the front door assembly 122 and the rear door assembly 120 open and close with less than 5 pounds of force to prevent injury. If the controller 4700 detects that there is an obstruction, the electric motor 136 will stop rotating.

In FIG. 6, the receiving end of the front door assembly 122 includes a spring-loaded latch 140 that engages a lock casing 142 (see FIG. 3) on the storage compartment 102. In this example, the receiving end of the front door assembly 122 includes a spring-loaded latch 140 on both a top portion and a bottom portion of the receiving end of the door, and the storage compartment 102 includes lock casings 142 that are positioned to lock with the spring-loaded latches of the front door assembly 122. Alternatively, the front door assembly 122 can include a single spring-loaded latch, and the storage compartment 102 can include a single lock casing.

In some examples, the storage compartment 102 is automated to disengage the spring-loaded latches 140 from the lock casings 142, and to power the electric motor 136 for rotating the pivot rod 134 in a first direction (e.g., clockwise) to swing the front door assembly 122 from the closed position into the open position when a signal is received that a customer is ready to pick up an order held inside the internal cavity 124. In further examples, the storage compartment 102 is automated to power the electric motor 136 to rotate the pivot rod 134 in a second direction (e.g., counterclockwise) to swing the front door assembly 122 from the open position into the closed position and to engage the spring-loaded latches 140 onto the lock casings 142 to lock the storage compartment 102 when a signal is received that the order has been removed from the internal cavity 124.

In other examples, the front door assembly 122 can be manually opened and closed by a customer or an employee. In such examples, the rear door assembly 120 and the front door assembly 122 can each include a handle. When a signal is received that a customer is ready to pick up an order held inside the internal cavity 124, the storage compartment 102 is automated to disengage the spring-loaded latches 140 from the lock casings 142 causing the front door assembly 122 to unlock, which allows the customer to open and/or close the front door assembly 122 using the handle. In further examples, when a signal is received that the order has been removed from the internal cavity 124 and that the front door assembly 122 has been manually moved into the closed position, the storage compartment 102 is automated to engage the spring-loaded latches 140 onto the lock casings 142 to lock the storage compartment 102. In such examples, the electric motor 136 can be omitted from the storage compartment 102.

The storage compartment 102 includes a sensor 152 to detect whether the front door assembly 122 is open or closed. In some examples, the sensor 152 is a push button switch. The sensor 152 is connected to the controller 4700 of the storefront pickup system 100 such that it can send signals to controller 4700 identifying whether the door is open or closed.

Figure 7:
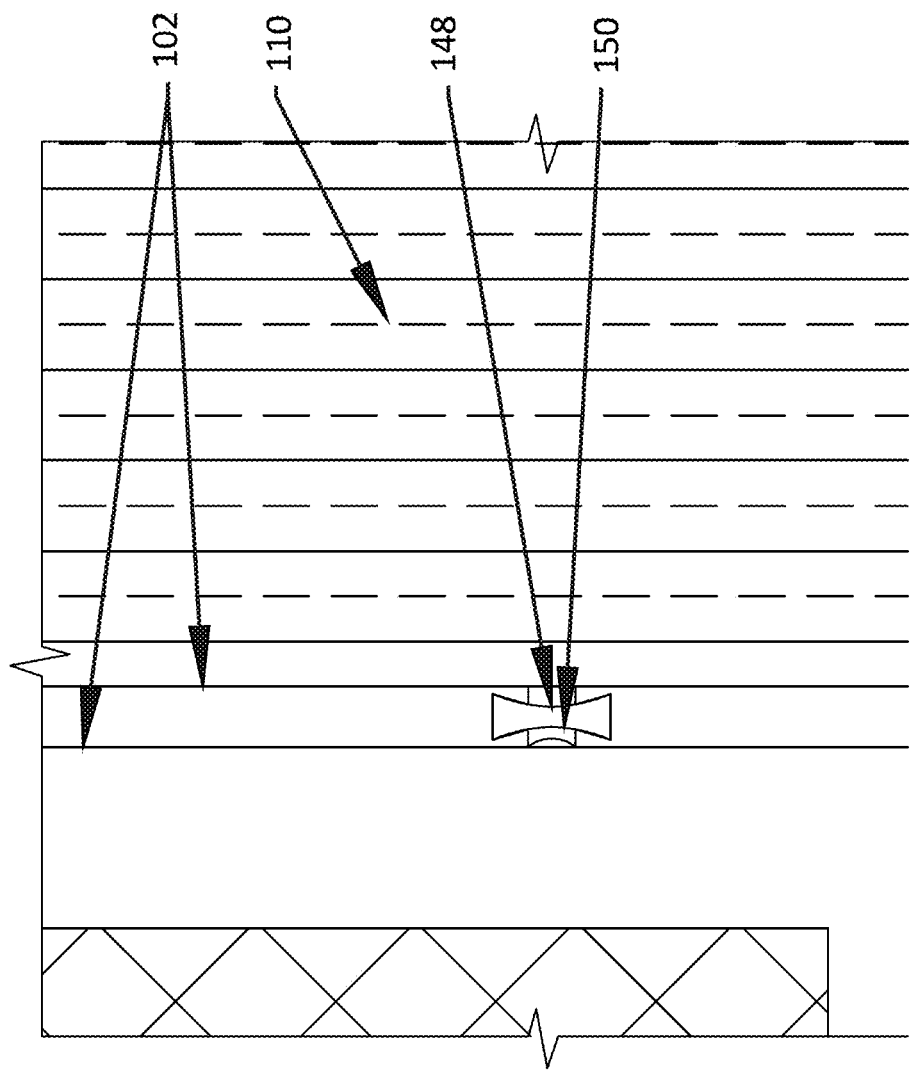
FIG. 7 is another detailed view of the storage compartment door assembly of the storage compartment shown in FIG. 4.

FIG. 7 is another detailed cross-sectional view of the storage compartment 102. As shown in FIG. 7, the rigid insulation 110 can provide a thermal break between the internal cavity 124 of the storage compartment 102 and the façade of the building 10. Additionally, as shown in FIGS. 5-7, rubber gaskets 144 can be installed on either the storage compartment 102 or the front door assembly 122 to create a tight seal between an internal surface 146 of the front door assembly 122 and the storage compartment 102 when the front door assembly 122 is in the closed position. Additionally, corresponding rubber spacers 148 can be positioned on the pivot and receiving ends of the front door assembly 122 to further enhance the tight seal between the storage compartment 102 and the front door assembly 122 when in the closed position.

Figure 8:
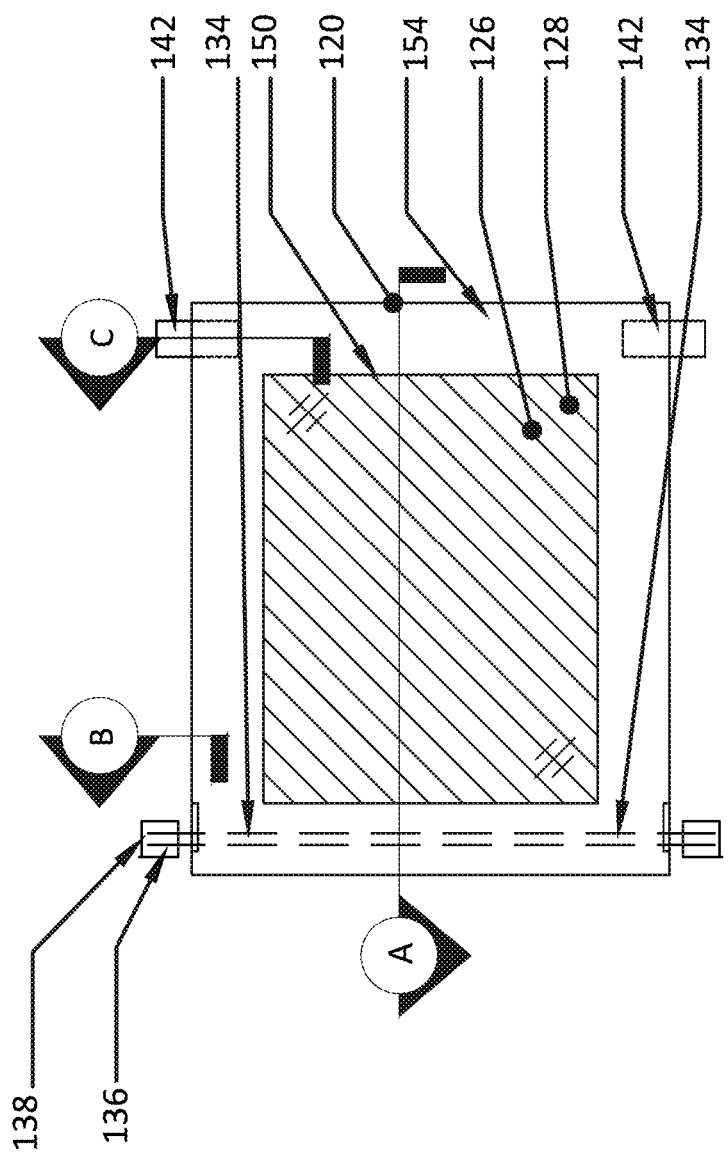
FIG. 8 is another front elevation view of a storage compartment of the storefront pickup system of FIG. 1.
Figure 9:
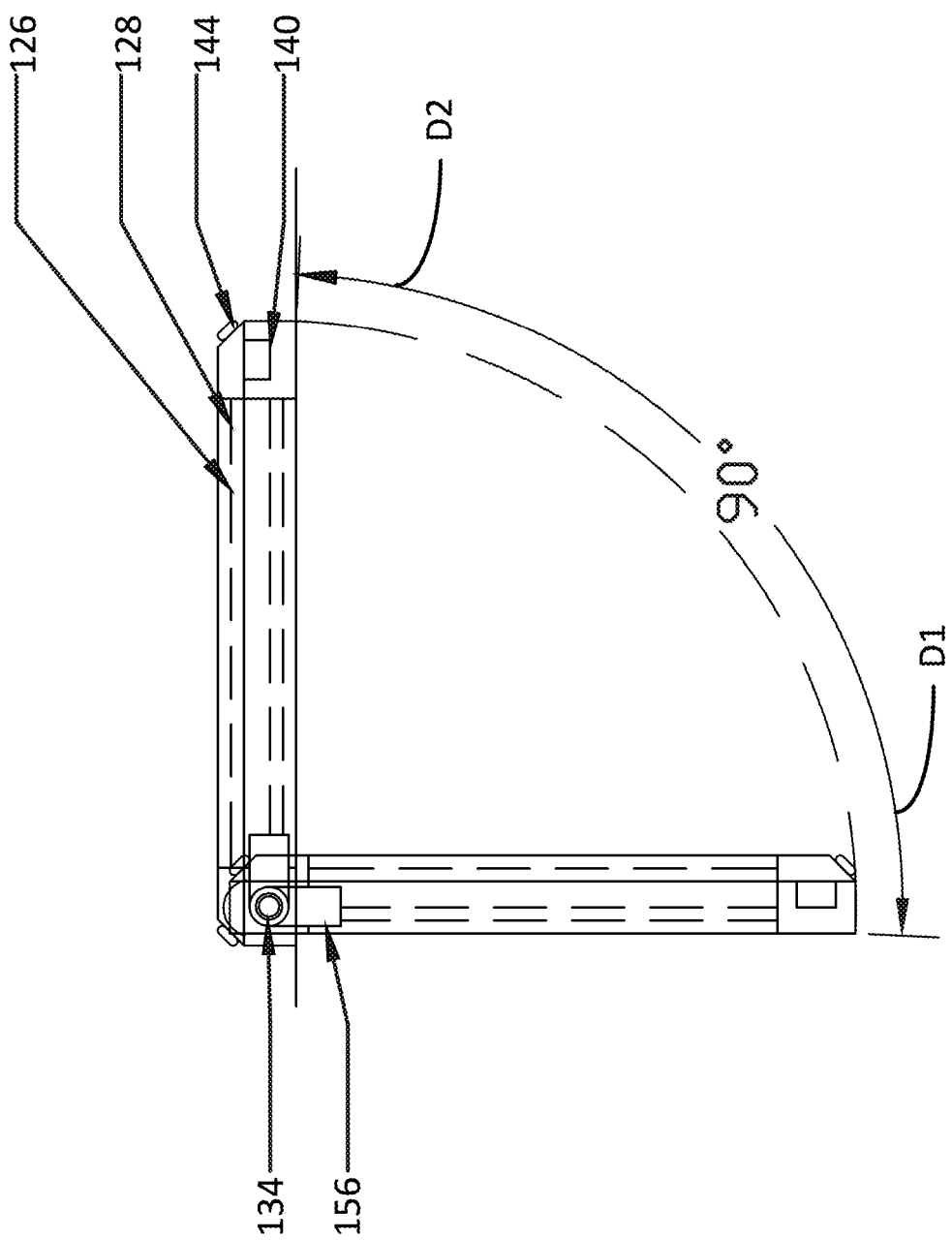
FIG. 9 is a cross-sectional top view of a front door assembly of the storage compartment taken along line A of FIG. 8.

FIG. 8 is another front elevation view of a storage compartment 102 of the storefront pickup system 100. FIG. 9 is a cross-sectional top view of the front door assembly 122 of the storage compartment 102 taken along line A of FIG. 8. FIG. 10 is a cross-sectional view of the pivot rod 134 and the electric motor 136 of the storage compartment 102 taken along line B of FIG. 8. FIG. 11 is a cross-sectional view of the lock casing 142 of the storage compartment 102 taken along line C of FIG. 8, the lock casing 142 shown in a locked position. FIG. 12 is a view of the lock casing 142 in an unlocked position.

While the following description refers to the front door assembly 122, a similar construction may also be used for the rear door assembly 120 of the storage compartment 102. In certain examples, the rear door assembly 120 may also include a door handle 154 to allow employees of the retail establishment to open and close the rear door assembly 120 from the interior of the retail establishment.

As shown in FIG. 9, the front door assembly 122 is secured to the pivot rod 134 by a plate 156. The pivot rod 134 when actuated by the electric motor 136 causes the front door assembly 122 to swing in opposite first and second directions D1, D2. In the example shown in FIG. 9, the pivot rod 134 when actuated by the electric motor 136 causes the front door assembly 122 to swing in the first direction D1 which is clockwise movement of the front door assembly 122 from the closed position to the open position, and to swing in the second direction D2 which is counterclockwise movement of the front door assembly 122 from the open position to the closed position. In alternative examples, the first direction D1 is counterclockwise, and the second direction is clockwise. The pivot rod 134 can allow the front door assembly 122 to swing by at least 90 degrees between the closed and open positions.

As shown in FIGS. 11 and 12, the lock casing 142 includes a piston 158 connected to the controller 4700 of the storefront pickup system 100 via wiring 160. When the controller 4700 receives a signal that a customer is ready to pick up their order from the storage compartment 102, the controller 4700 actuates the piston 158 to push down on the spring-loaded latch 140 to disengage the spring-loaded latch 140 from the lock casing 142, which unlocks the front door assembly 122 enabling the pivot rod 134 to swing the front door assembly 122 from the closed position to open position. The spring-loaded latch 140 is biased by a spring 162 toward the lock casing 142, and the piston 158 pushes down on the spring-loaded latch 140 to compress the spring 162 and thereby disengage the spring-loaded latch 140 from the lock casing 142.

Figure 13:
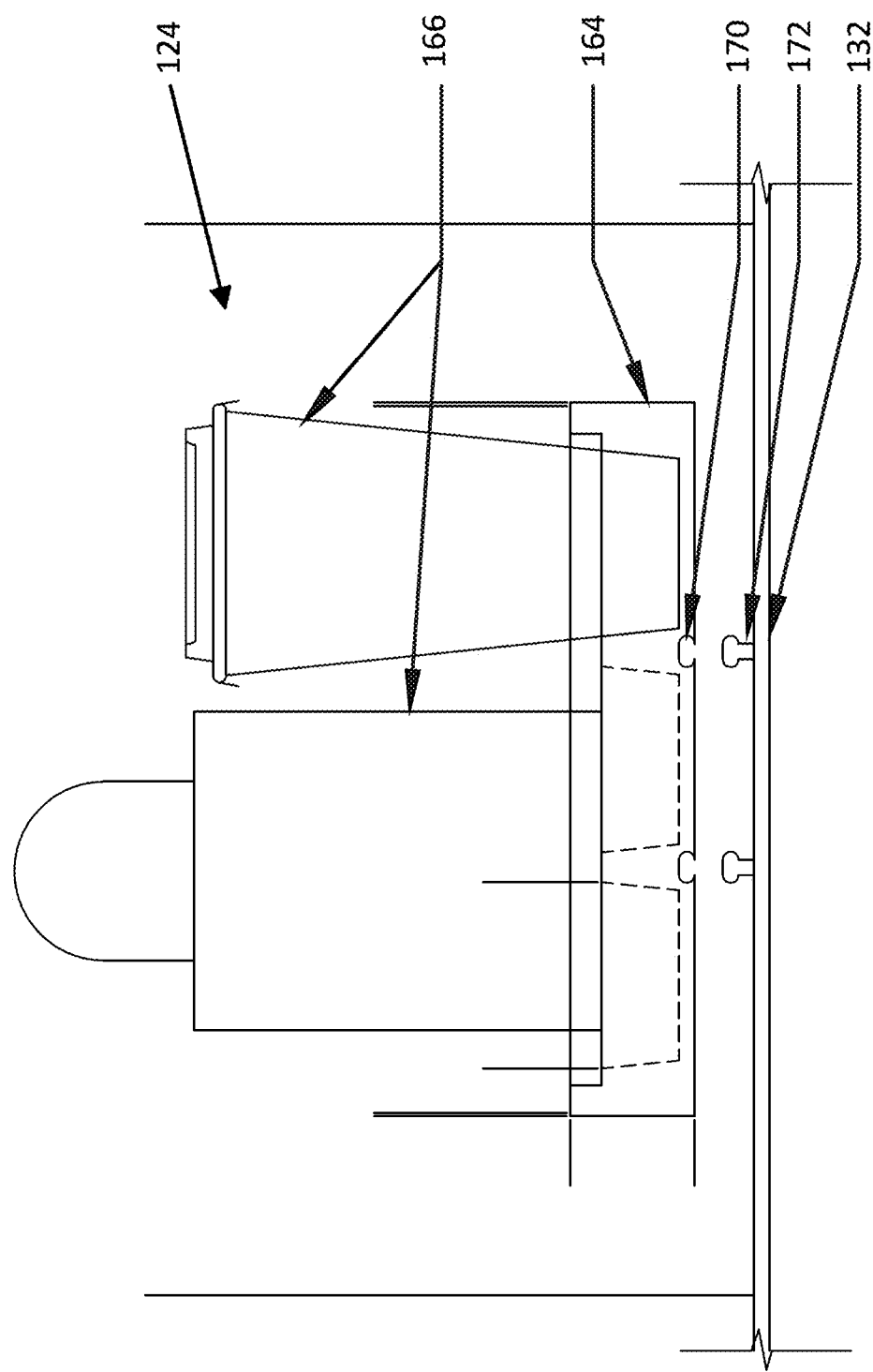
FIG. 13 is a cross-sectional view of the storage compartment of FIG. 8 showing a washable tray and food items stored inside an internal cavity of the storage compartment.

FIG. 13 is a cross-sectional view of a storage compartment 102 showing food items 166 held by a washable tray 164 inside the internal cavity 124. The components of the storage compartment 102, including the internal cavity 124 and the washable tray 164, are made of materials that are food-grade, and that are cleanable and washable.

Figure 14:
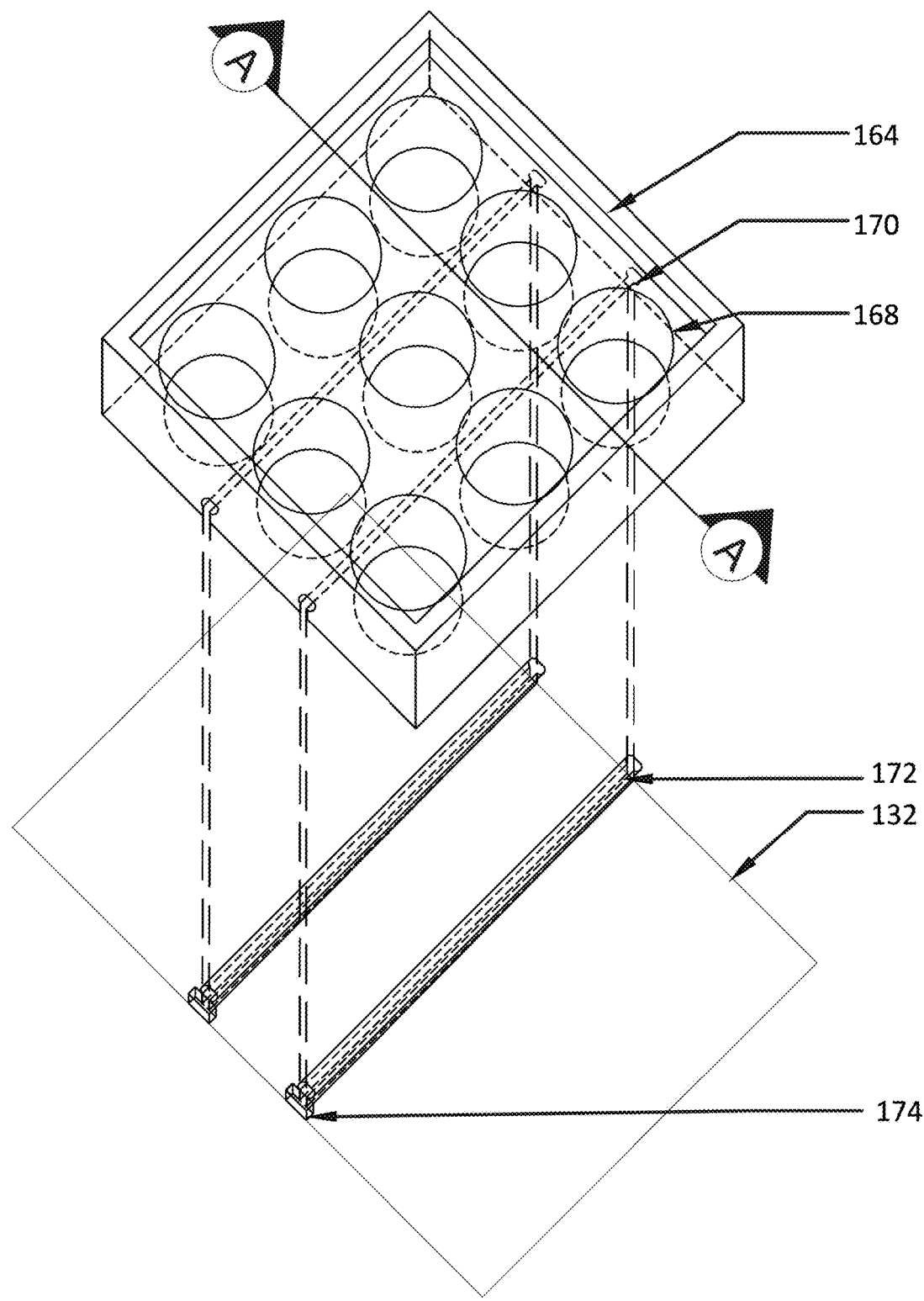
FIG. 14 is an exploded isometric view of the washable tray of FIG. 13 positioned relative to the internal cavity of the storage compartment.

FIG. 14 is an exploded isometric view of the washable tray 164 positioned relative to the internal cavity 124 of the storage compartment 102. As shown in FIG. 14, the washable tray 164 includes structures 168 for holding food items. The shape, size, and configuration of the washable tray 164 may vary for holding various types and quantities of food items inside the storage compartments 102. Additionally, the example of the washable tray 164 shown in FIGS. 13 and 14 is in a configuration that allows it to hold both food and beverages, however, the design of the washable tray 164 can vary to hold various non-food or beverage related items.

As shown in FIGS. 13 and 14, a bottom surface of the washable tray 164 includes track channels 170 that are configured to slide on tracks 172 positioned over the removable mesh screen 132 inside the internal cavity 124 of the storage compartment 102. As shown in FIG. 14, the washable tray 164 is removable only from the interior of the building 10. For example, the tracks 172 can each include a stopper 174 that prevents a customer from sliding the washable tray 164 from the exterior of the building 10. Thus, only employees of the retail establishment can remove the washable tray 164 from the storage compartment 102. Also, the tracks 172 are removable allowing the storage compartment 102 to have a flat base platform.

Figure 15:
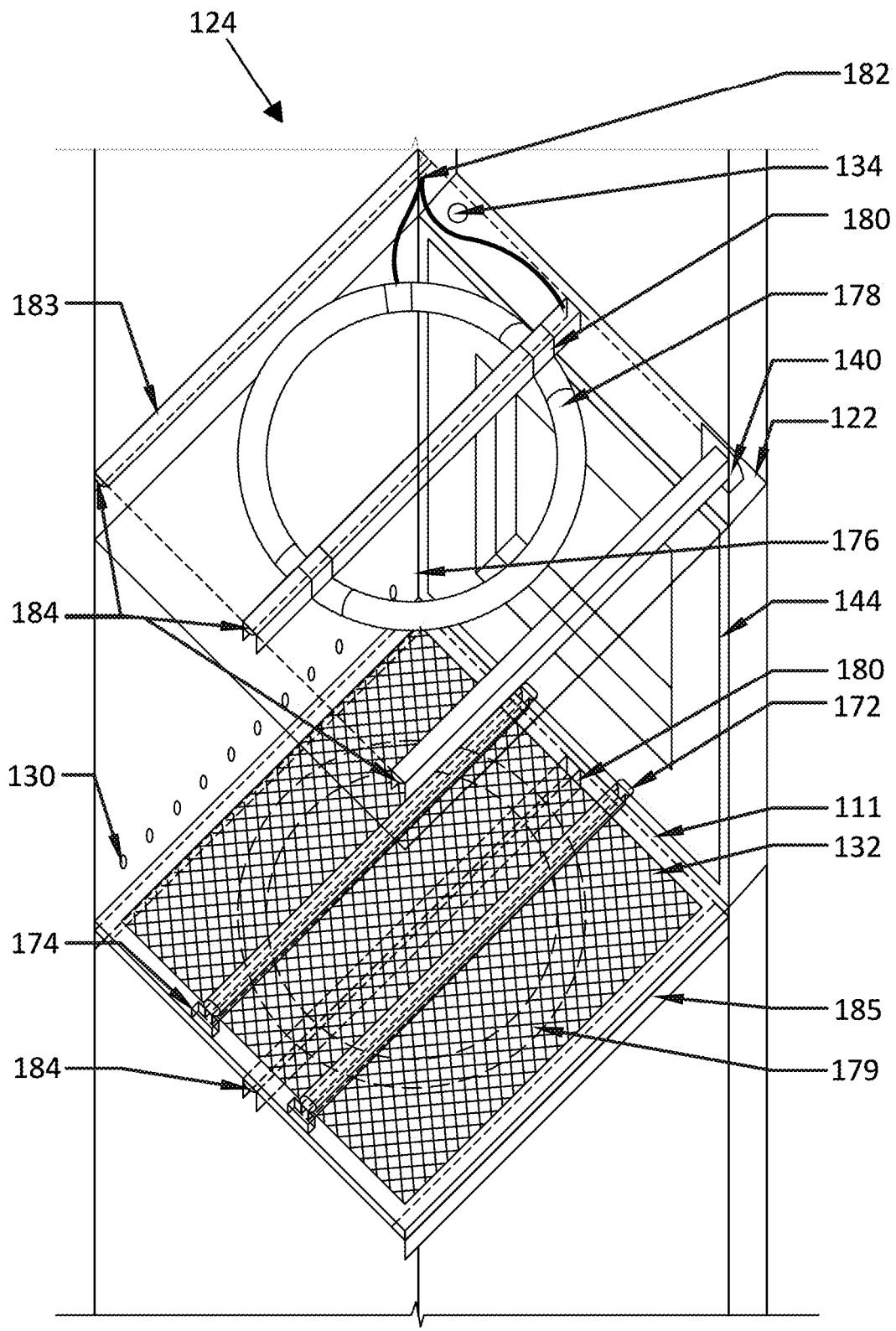
FIG. 15 is an isometric view of a sterilization assembly inside the internal cavity of the storage compartment of FIG. 8.

FIG. 15 is an isometric view of a sterilization assembly 176 inside the internal cavity 124 of the storage compartment 102. The sterilization assembly 176 is automated via the controller 4700 of the storefront pickup system 100 to sterilize the internal cavity 124 of the storage compartment 102 after detection by the sensor 130 that the food items 166 have been removed from the storage compartment 102. Additionally, all interior surfaces of the internal cavity 124 are washable such as by an employee during routine maintenance.

In the example shown in FIG. 15, the sterilization assembly 176 includes a first UV light source 178 mounted to a bracket 180 attached to a top frame 183 of the storage compartment 102, and a second UV light source 179 mounted to a bracket 180 attached to a bottom frame 185 of the storage compartment 102. The top and bottom frames 183, 185 are each anchored to a support structure 137 of the storefront pickup system 100. The second UV light source 179 is mounted underneath the removable mesh screen 132. The first and second UV light sources 178, 179 are each connected to the controller 4700 via wiring 182.

Figure 16:
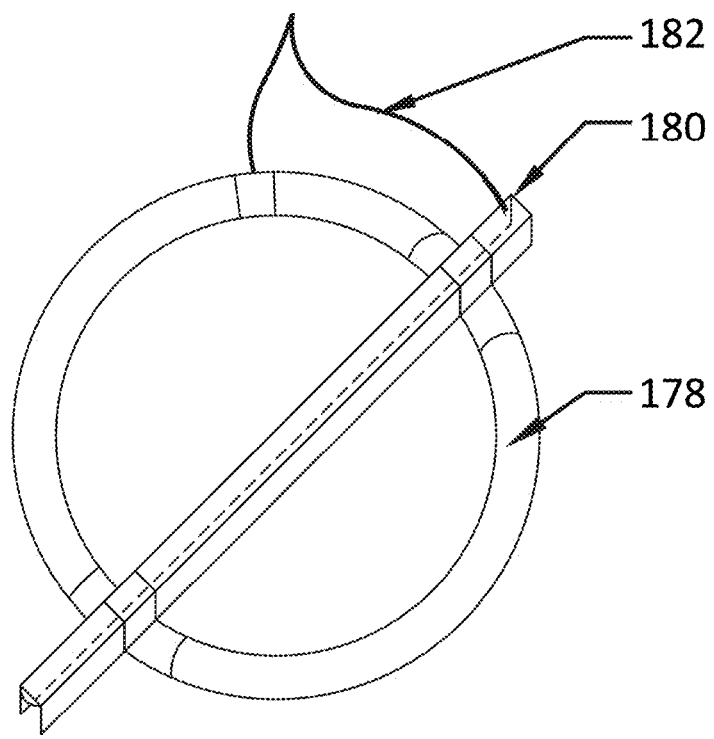
FIG. 16 is an isometric view of a UV light source and a mounting bracket that are included in the sterilization assembly of FIG. 15.

FIG. 16 is an isometric view of the first UV light source 178. Referring now to FIGS. 15 and 16, the first and second UV light sources 178, 179 are circular lamps. The circular shape of the first and second UV light sources 178, 179 ensures that the UV light covers all surface areas inside the internal cavity 124 for improved sanitization. In alternative examples, the first and second UV light sources 178, 179 may have different shapes and sizes.

Figure 17:
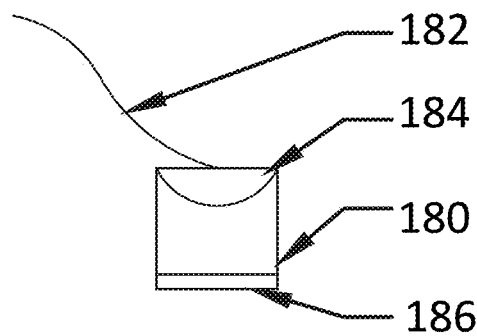
FIG. 17 is a cross-sectional view showing a light-emitting diode (LED) integrated into a channel for illuminating the storage compartment of FIG. 8.

FIG. 17 is a cross-sectional view showing light-emitting diodes (LED) 184 integrated into the bracket 180 for illuminating the storage compartment 102. As shown In FIGS. 15-17, the bracket 180 is a channel that houses a strip of the LEDs 184. In some examples, the bracket 180 is made of aluminum or similar material. The LEDs 184 are connected to the controller 4700 of the storefront pickup system 100 via the wiring 182. The LEDs 184 are automated for illuminating the internal cavity 124 when the sensor 152 detects that the front door assembly 122 is open such as when a customer is picking up their order, thus allowing the customer to see the food items 166 stored more easily inside the storage compartment 102. Also, the LEDs 184 are automated for illuminating the internal cavity 124 when a similar sensor detects that the rear door assembly 120 is open such as when an employee slides the washable tray 164 holding the food items 166 onto the tracks 172 for storage inside the internal cavity 124.

As further shown in FIG. 17, the bracket 180 can include a cover 186 that protects the LEDs 184 from food particles and other debris inside the internal cavity 124. In some examples, the cover 186 is washable plexiglass or similar type of material. The cover 186 can be transparent and/or translucent to allow light emitted from the LEDs 184 to pass through.

Figure 18:
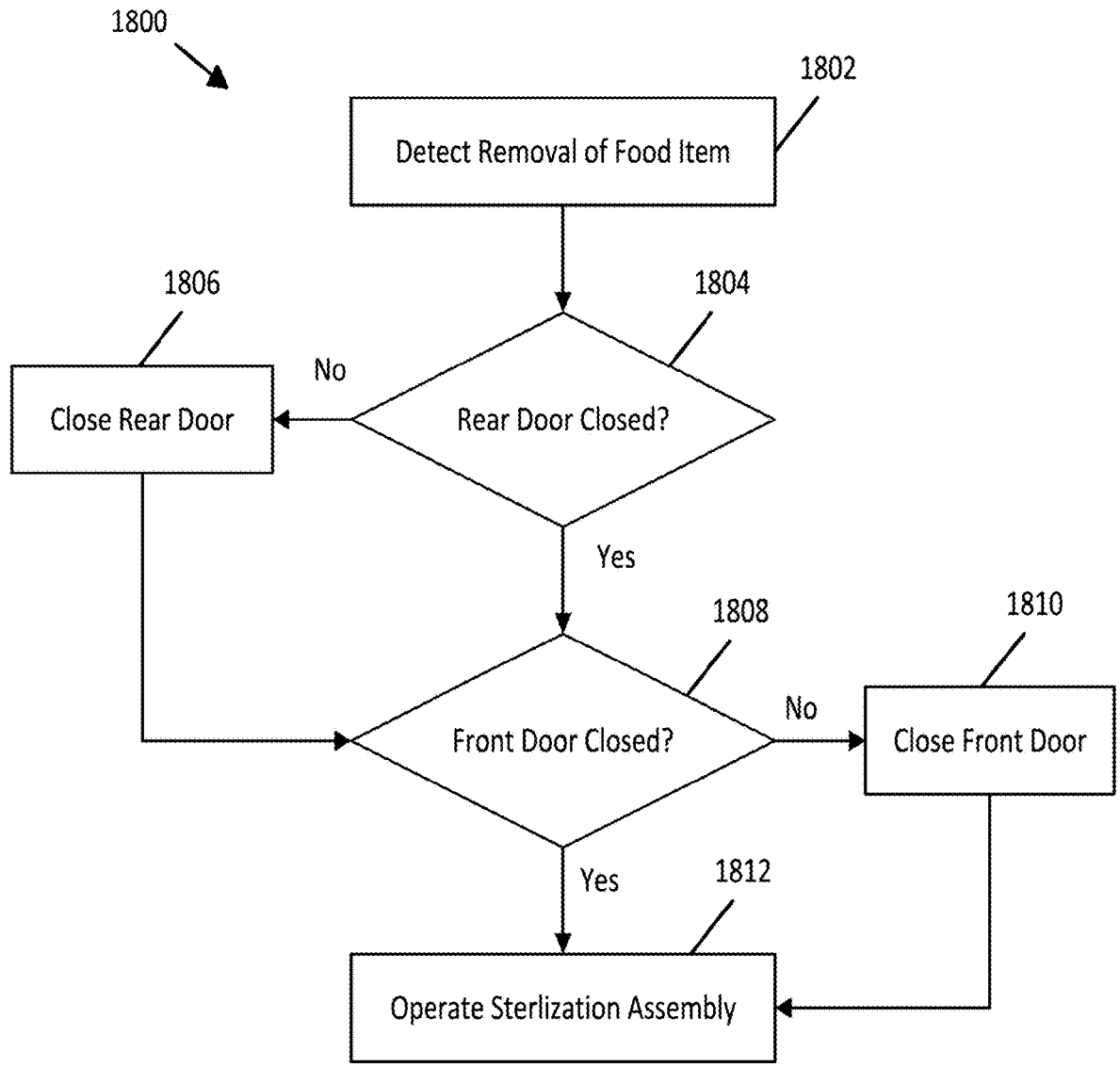
FIG. 18 schematically illustrates an example of a method of sanitizing the storage compartment using the sterilization assembly of FIG. 15.

FIG. 18 schematically illustrates an example of a method 1800 of sanitizing the storage compartment 102. The method 1800 can be performed automatically by the controller 4700 of the storefront pickup system 100. As shown in FIG. 18, the method 1800 includes an operation 1802 of detecting removal of the food items 166 from the storage compartment 102. Operation 1802 can be performed by using the sensor 130 to detect when the food items 166 have been removed by a customer from the internal cavity 124. Operation 1802 can be performed after a short delay to allow the customer to remove the food items 166 from the internal cavity 124 and to move away from the storefront pickup system 100.

Next, the method 1800 includes an operation 1804 of determining whether the rear door assembly 120 (that provides access from the interior of the building 10 to the storage compartment 102) is closed. Advantageously, operation 1804 ensures that the rear door assembly 120 is not open when the storage compartment 102 is being sanitized to prevent potential harm to employees from the UV light emitted from the sterilization assembly 176.

In some examples, when the rear door assembly 120 is determined in operation 1804 to be open (i.e., "No" in operation 1804), the method 1800 proceeds to an operation 1806 of closing the rear door assembly 120. For example, the controller 4700 of the storefront pickup system 100 can actuate an electric motor to rotate a pivot rod to rotate about an axis of rotation to swing the rear door assembly 120 from the open position to the closed position.

When the rear door assembly 120 is determined in operation 1804 to be closed (i.e., "Yes" in operation 1804), the method 1800 proceeds to an operation 1808 of determining whether the front door assembly 122 (that provides access from the exterior of the building 10 to the storage compartment 102) is closed. Advantageously, operation 1808 ensures that the front door assembly 122 is not open when the storage compartment 102 is being sanitized to prevent potential harm to customers from the UV light emitted from the sterilization assembly 176.

In some examples, when the front door assembly 122 is determined in operation 1808 to be open (i.e., "No" in operation 1808), the method 1800 can proceed to an operation 1810 of closing the front door assembly 122. For example, the controller 4700 of the storefront pickup system 100 can actuate the electric motor 136 to rotate the pivot rod 134 to rotate about an axis of rotation to swing the front door assembly 122 from the open position to the closed position.

When the front door assembly 122 is determined in operation 1808 to be closed (i.e., "Yes" in operation 1808), the method 1800 proceeds to an operation 1812 of operating the sterilization assembly 176 to sanitize the storage compartment 102.

Figures 19, 20, 21:
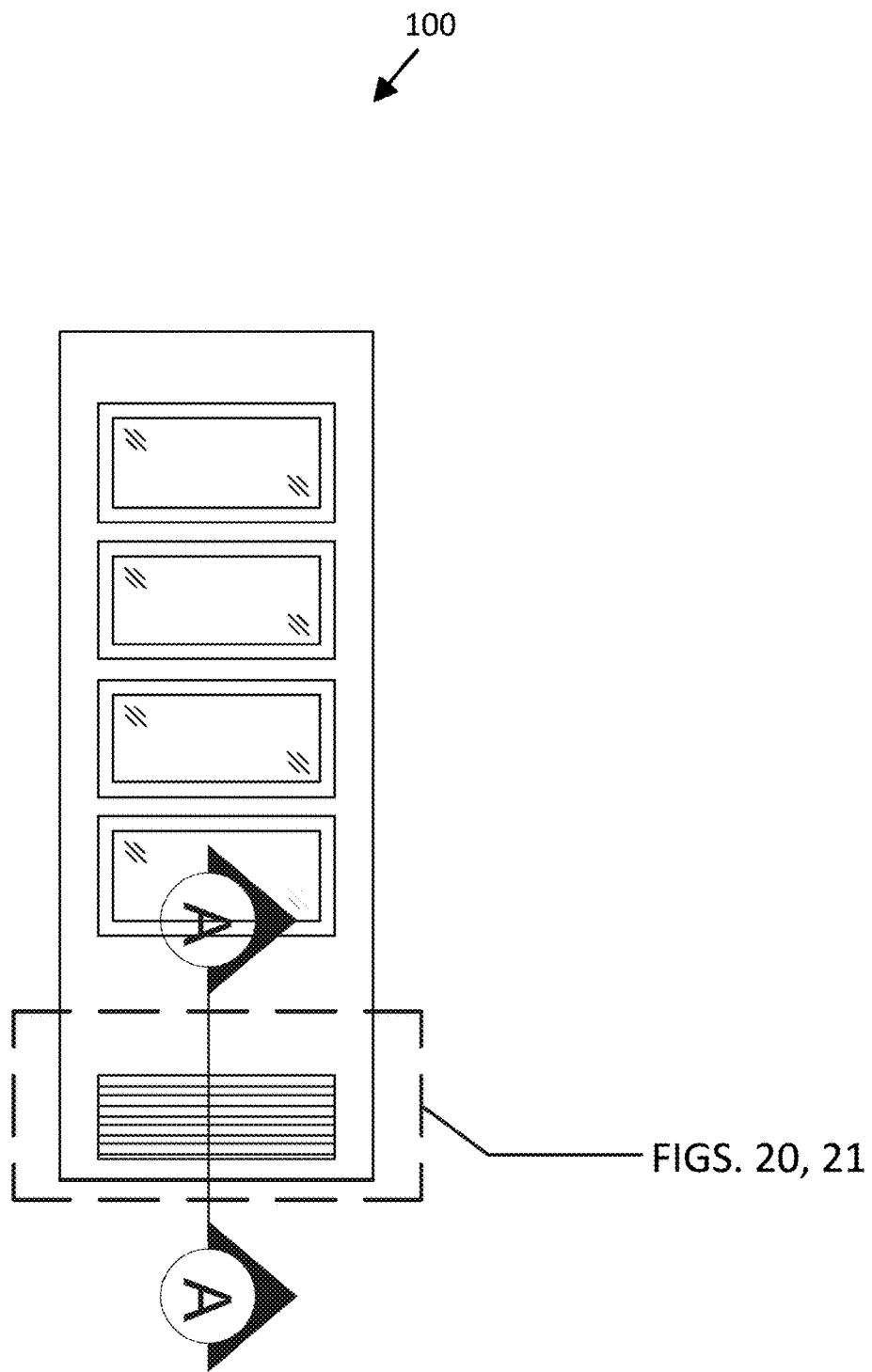
FIG. 19 is an exterior elevation view of an example of the storefront pickup system of FIG. 1.
FIG. 20 is an exploded isometric view of a bottom portion of the storefront pickup system encircled in broken lines in FIG. 19.
FIG. 21 is a cross-sectional view of an example of a heating, ventilation, and air conditioning system taken along line A-A of FIG. 19.
Figure 20:
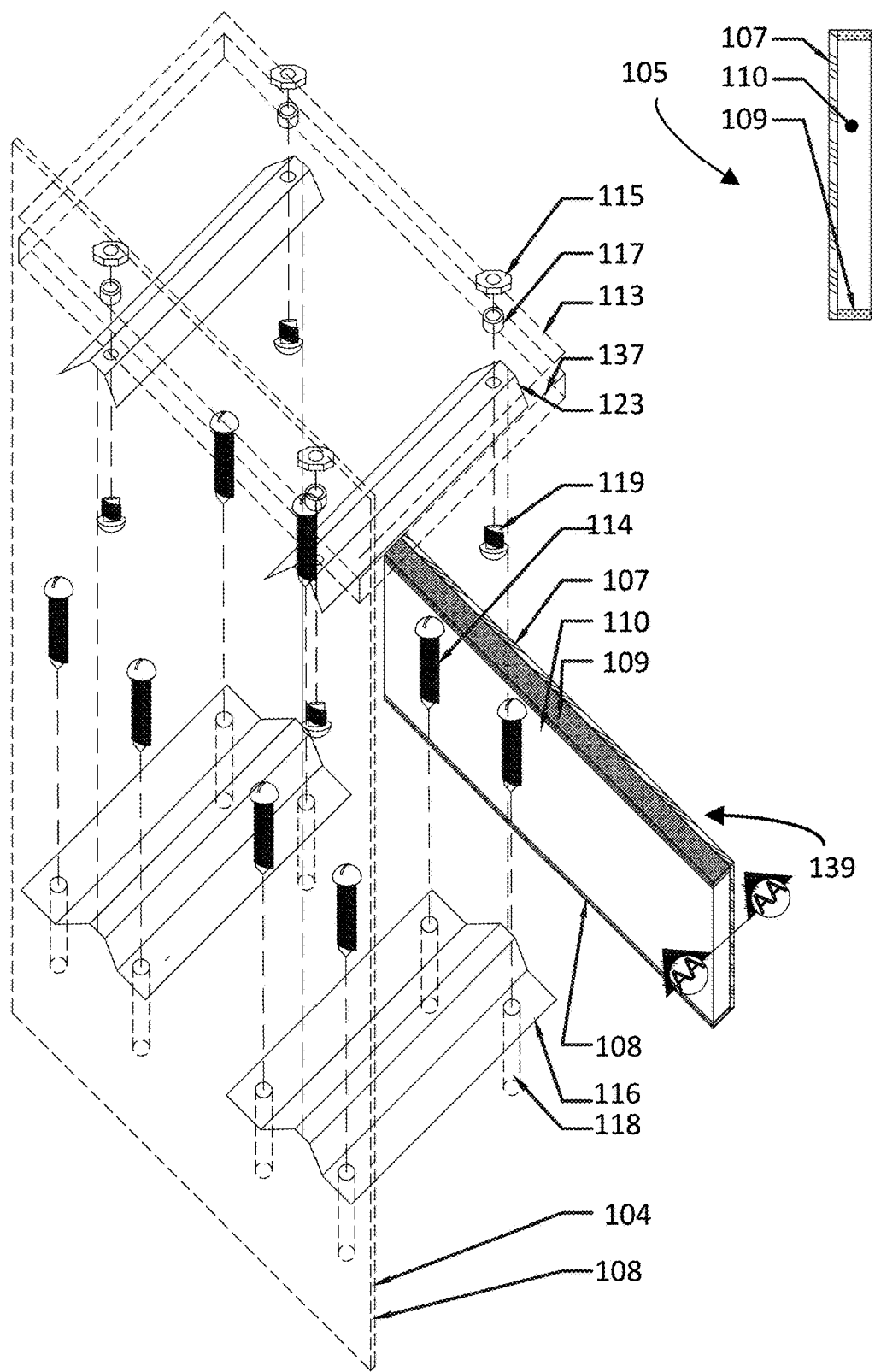

FIG. 19 is an exterior elevation view of an example of the storefront pickup system 100 having a bottom portion of the storefront pickup system 100 encircled in broken lines. As will be described in more detail, the bottom portion can house the HVAC system 188.

FIG. 20 is an exploded isometric view of the bottom portion of the storefront pickup system 100 that is encircled in broken lines in FIG. 19. As shown in FIG. 20, the storefront pickup system 100 includes a support structure 137 such as a metal frame that supports the storage compartments 102, the HVAC system 188, and other components. Both the exterior faceplate 104 (see also FIG. 21) and the support structure 137 extend to meet the existing ground, and can be sealed with non-shrink caulk and/or filler spray foam insulation.

As shown in FIG. 20, the exterior faceplate 104 attaches to the support structure 137, and the exterior faceplate 104 protects an interior of the storefront pickup system 100 from outside elements (e.g., wind, rain, snow, etc.) that may occur outside of the building 10. Any gaps between the exterior faceplate 104 can be filled with the non-shrink caulk 108.

In the example shown in FIG. 20, the storefront pickup system 100 is anchored to the ground or floor surface within a fenestration of the building by fasteners 114. The floor surface can include masonry slab, wood flooring, steel decking/substrate, or any other material.

In some examples, the fasteners 114 are concrete anchors that screw through a base track 116 and into holes 118 that are pre-drilled into a concrete ground or flooring. In some examples, the holes 118 can include non-shrink epoxy filling to strengthen the anchoring of the storefront pickup system 100 to the ground or floor. The fasteners 114 can vary based on the ground or flooring material, and are not limited to the examples provided herein.

The base track 116 can be mounted to a base plate 113 by using fasteners such as base plate nuts 115, rubber spacers 117, and base plate bolts 119. In some examples, a top track 123 is bolted to the base track 116 by using one or more of the fasteners.

FIG. 21 is a cross-sectional view of the HVAC system 188 taken along line A-A of FIG. 19. As shown in FIGS. 20 and 21, the storefront pickup system 100 includes a louver 139 that faces the interior of the building 10. The louver 139 can have a height of at least 6 inches. The louver 139 can be removed to have access to the HVAC system 188. Additionally, a filter 141 can be installed at an interior face of the louver 139 to block particulates from entering the storefront pickup system 100 that can potentially contaminate food and beverage items held in the storage compartments 102. In some further examples, such as shown in FIG. 21B, a mesh screen 145 made of metal, fabric, or plastic with 1/16-inch gaps or smaller can be installed to block pests and debris from entering the storefront pickup system 100.

The HVAC system 188 is positioned at the bottom of the storefront pickup system 100. The HVAC system 188 is used to control the temperatures inside the storage compartments 102. In some examples, the storefront pickup system 100 includes a single HVAC system such that all the storage compartments 102 within the storefront pickup system 100 have the same temperature. In other examples, the storefront pickup system 100 can include multiple HVAC systems allowing each storage compartment 102 to have its own customizable temperature.

As shown in FIG. 21, the HVAC system 188 includes cables 190 for connection to the controller 4700 of the storefront pickup system 100 and to a power supply. The HVAC system 188 further includes an access panel 192 that allows access from the interior of the building 10 for personnel to perform maintenance and repairs on the HVAC system 188.

As shown in FIG. 21, the HVAC system 188 includes a motor 194, a blower fan 196, and a condenser 198. The components of the HVAC system 188 are supported inside the support structure 137 of the storefront pickup system 100 by supporting rods 200.

The HVAC system 188 includes a refrigerant line 202 and evaporator coils 204 that can be used to refrigerate the storage compartments 102 to maintain the food items 166 cool. The HVAC system 188 also includes electric heating coils 206 that can be used to heat the storage compartments 102 to maintain the food items 166 temperature. In some examples, the storage compartments 102 in the storefront pickup system 100 are individually controllable to maintain a desired temperature to preserve the food items 166 that are stored therein. The HVAC system 188 can further include the rigid insulation 110 to prevent temperature losses such as heat losses from the electric heating coils 206 or refrigeration losses from the refrigerant line 202 and evaporator coils 204. Thus, the rigid insulation 110 can reduce the energy consumption of the HVAC system 188 that is needed to heat or cool the storage compartments 102.

As shown in FIG. 21, the HVAC system 188 can include a condensation pump 208, a drip pan 210, a drip hole 212, and a condensation drain line 214. These components can ensure that condensation and moisture such as from the refrigerant line 202 and evaporator coils 204 does not build up on the bottom of the storefront pickup system 100, and thereby prevent damage such as from leaks, corrosion, and/or erosion due to the buildup of condensation and moisture.

Figure 21:
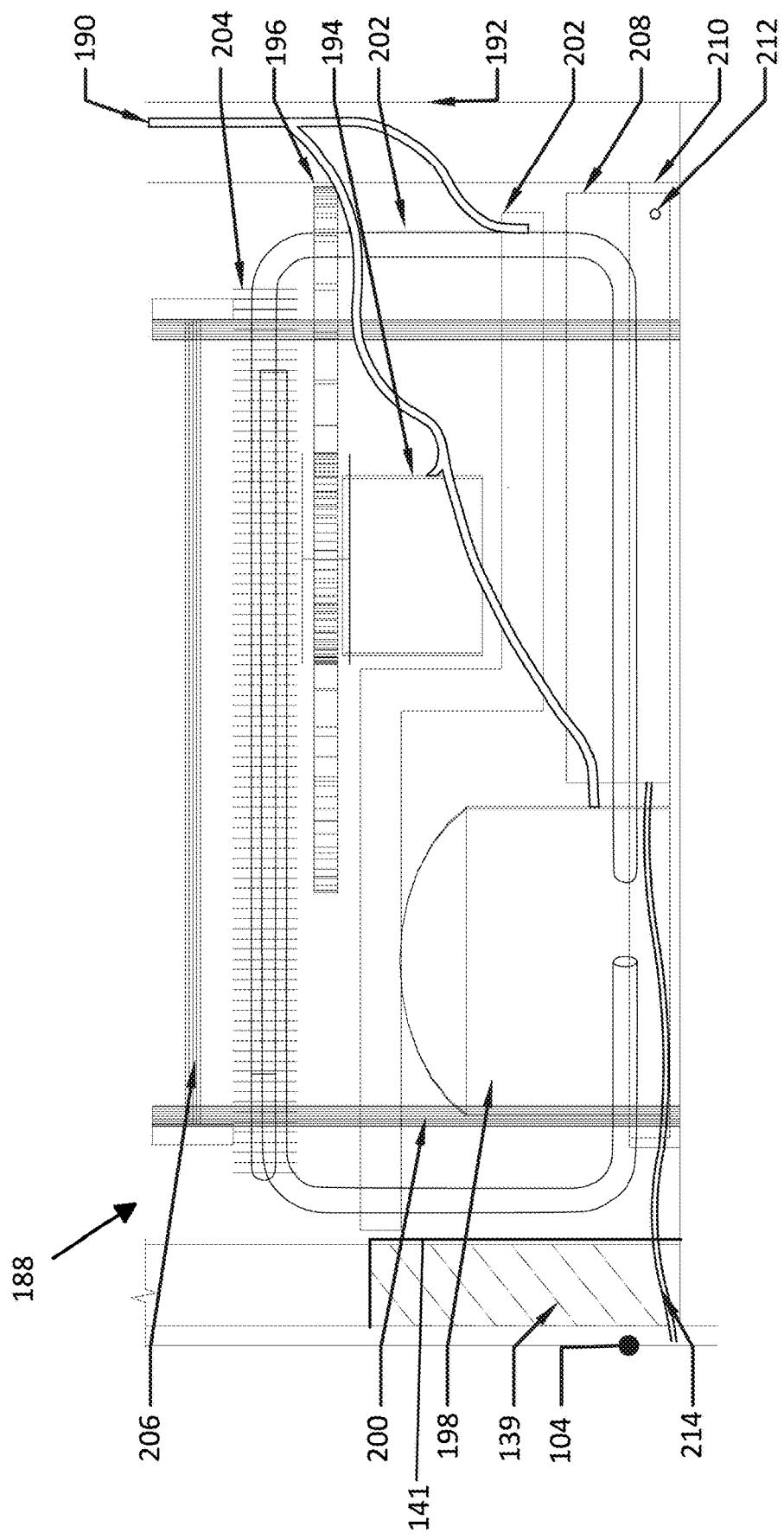
Figure 21A:
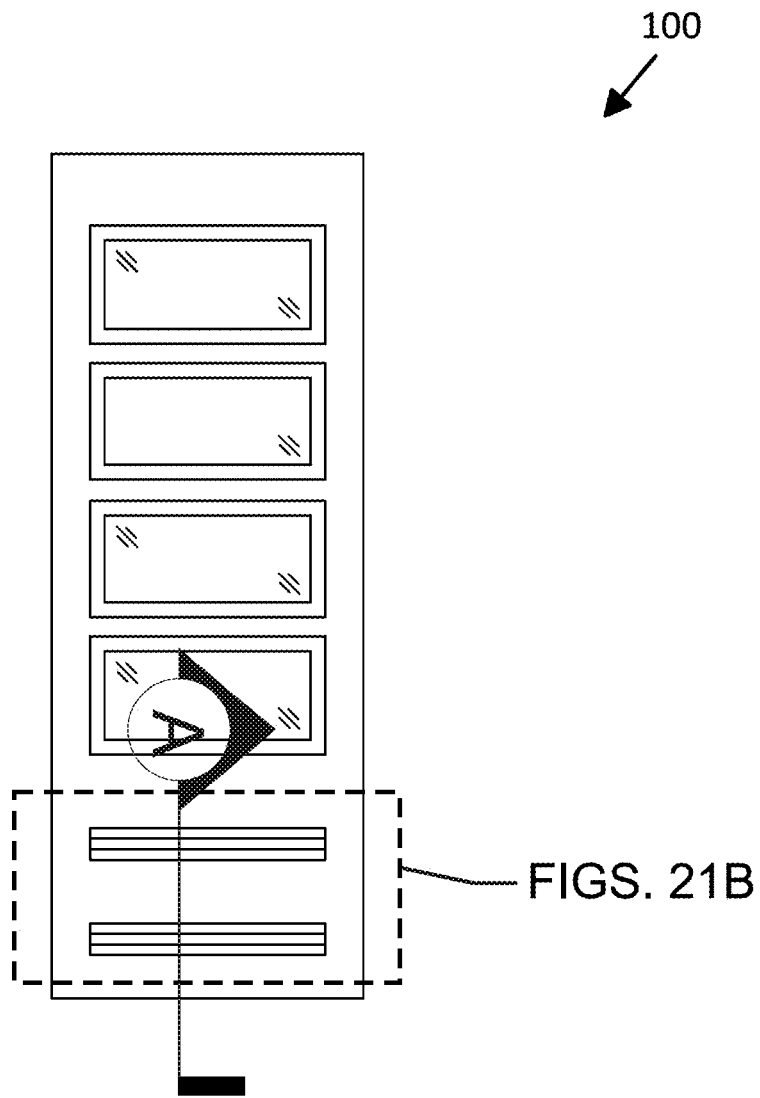
FIG. 21A is an exterior elevation view of another example of the storefront pickup system of FIG. 1.
Figure 21B:
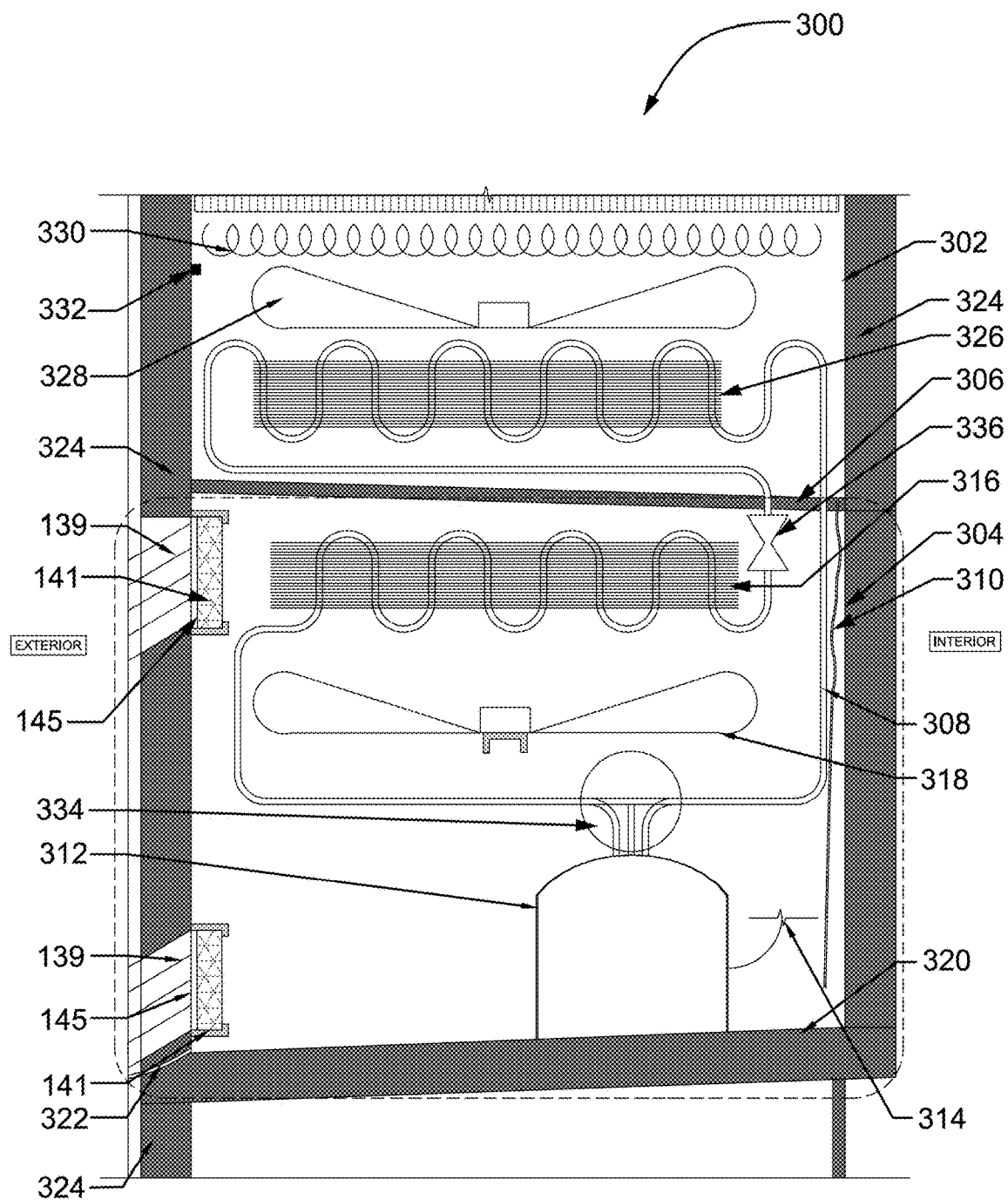
FIG. 21B is a cross-sectional view of an example of a heating, ventilation, and air conditioning system taken along line A-A of FIG. 21A.

FIG. 21A is an exterior elevation view of another example of the storefront pickup system 100. FIG. 21B is a cross-sectional view of an example of a HVAC system 300 taken along line A-A of FIG. 21A. In this example, the HVAC system 300 includes first and second enclosures 302, 304 that operate together as a heat pump/heat exchange system. For example, the first enclosure 302 includes components that operate to direct heating or cooling to the storage compartments 102, whereas the second enclosure includes components that operate to provide exhaust and intake functions for the components of the first enclosure 302.

In the example shown in FIG. 21B, the first and second enclosures 302, 304 are both positioned in the same location as the storefront pickup system 100. The first and second enclosures 302, 304 are separated by a divider 306. The divider 306 is sloped providing gravity drainage of condensation in the first enclosure 302. For example, the slope of the divider 306 can direct the condensation toward a drain line 310. In some examples, the divider 306 is insulated.

FIG. 21C is a cross-sectional view of another example of the HVAC system 300 taken along line A-A of FIG. 21A. In this example, the first and second enclosures 302, 304 are separately located with respect to one another. For example, the first enclosure 302 is shown positioned in the same location as the storefront pickup system 100, whereas the second enclosure 304 is positioned in a different location than that of the storefront pickup system 100. In this example, the first and second enclosures 302, 304 are connected by refrigerant lines 308.

The configuration shown in FIG. 21C can prevent the exhaust and intake functions performed by the second enclosure 304 from affecting a building's existing HVAC system because the second enclosure 304 can be installed externally from the location of storefront pickup system 100. This allows installation of the storefront pickup system 100 into a storefront located within an airconditioned building such as a storefront of a store located within an enclosed shopping mall. This configuration can also be used in external storefront applications where floods are likely, allowing the intake and exhaust functions of the storefront pickup system 100 to be performed away from locations of a building that are prone to flooding.

As shown in FIGS. 21B and 21C, the second enclosure 304 includes a compressor 312 that is connected via cables 314 to the controller 4700 and power supply. The second enclosure 304 further includes second refrigerant coils 316 and a blower fan 318. The blower fan 318 operates to ventilate the second enclosure 304 by moving air in and out of the louvers 139, and allowing air to flow through the second refrigerant coils 316. The operation of the blower fan 318 can be controlled by the controller 4700, and the blower fan 318 can operate at variable speeds as needed for providing efficient and effective ventilation of the second enclosure 304.

In the example shown in FIG. 21B, the second enclosure 304 includes a bottom panel 320 that is sloped toward a drain line 322. In such examples, the bottom panel 320 directs condensation for drainage outside of the second enclosure 304. In the example where the first and second enclosures 302, 304 are positioned in the same location as the storefront pickup system 100 (as shown in FIG. 21B), the bottom panel 320 can also direct condensation from the first enclosure 302 (received via the drain line 310) for drainage outside of the second enclosure 304. The slope of the bottom panel 320 for directing condensation toward the drain line 322 can eliminate the need for the drip pan 210 shown in FIGS. 21 and 21C such that the drip pan 210 is optional. In some examples, the bottom panel 320 is insulated to provide a thermal break 324 between the HVAC system 300 and an exterior and interior of the storefront. Both the exterior faceplate 104 (see also FIG. 21) and the thermal break 324 extend to meet the existing ground, and can be sealed with non-shrink caulk and/or filler spray foam insulation.

As shown in FIGS. 21B and 21C, the first enclosure 302 includes first refrigerant coils 326, a circulation fan 328, and supplemental electric heating coils 330. The circulation fan 328 operates to mitigate condensation within the first enclosure 302 and circulates conditioned air uniformly throughout the first enclosure 302 and toward the storage compartments 102. As the conditioned air is circulated within the first enclosure 302, a temperature sensor 332 positioned inside the first enclosure 302 communicates with the controller 4700 to regulate the HVAC system 300 and achieve a desired temperature for the storage compartments 102. The supplemental electric heating coils 330 can be used to heat the storage compartments 102 in lieu of, or in conjunction with the heat pump system of the first and second enclosures 302, 304.

As shown in FIGS. 21B and 21C, the HVAC system 300 includes a reversing valve 334 and an expansion valve 336. The reversing valve 334 enables the HVAC system 300 to be reversible and capable of operating in a cooling mode, or alternatively, in a heating mode. For example, one of the first and second refrigerant coils 316, 326 can operate as an evaporator and the other of the first and second refrigerant coils 316, 326 can operate as a condenser. The flow of the refrigerant in the refrigerant lines 308 can be reversed using the reversing valve 334 which can switch each of the first and second enclosures 302, 304 from heating to cooling, and vice versa. The expansion valve 336 can be used to control the amount of refrigerant running through the refrigerant lines 308 between the first and second refrigerant coils 316, 326. Operation of the reversing valve 334 and the expansion valve 336 is controlled by the controller 4700 to fine-tune the temperature of the chambers. Thus, the first refrigerant coils 326 are separated from the second refrigerant coils 316 to prevent heat from transferring between the first and second enclosures because otherwise the HVAC system 300 will not operate properly and will exchange heat unless the first and second enclosures 302, 304 are thermally isolated from one another.

Figure 22:
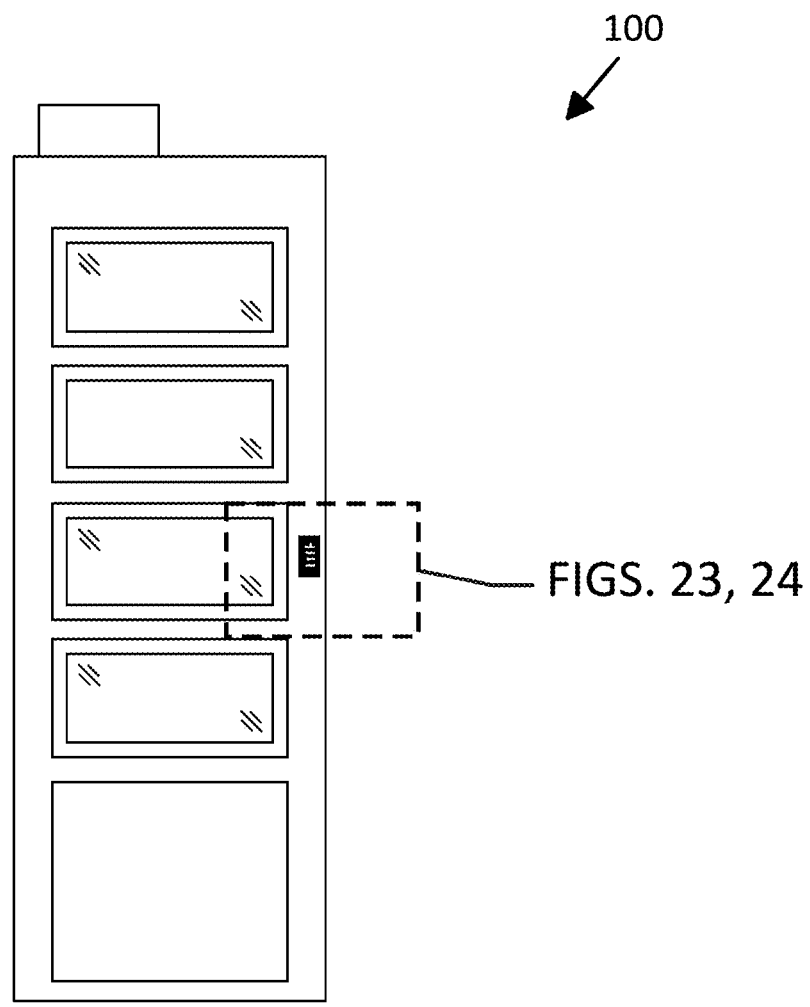
FIG. 22 is an interior elevation view of an example of the storefront pickup system.
Figure 23:
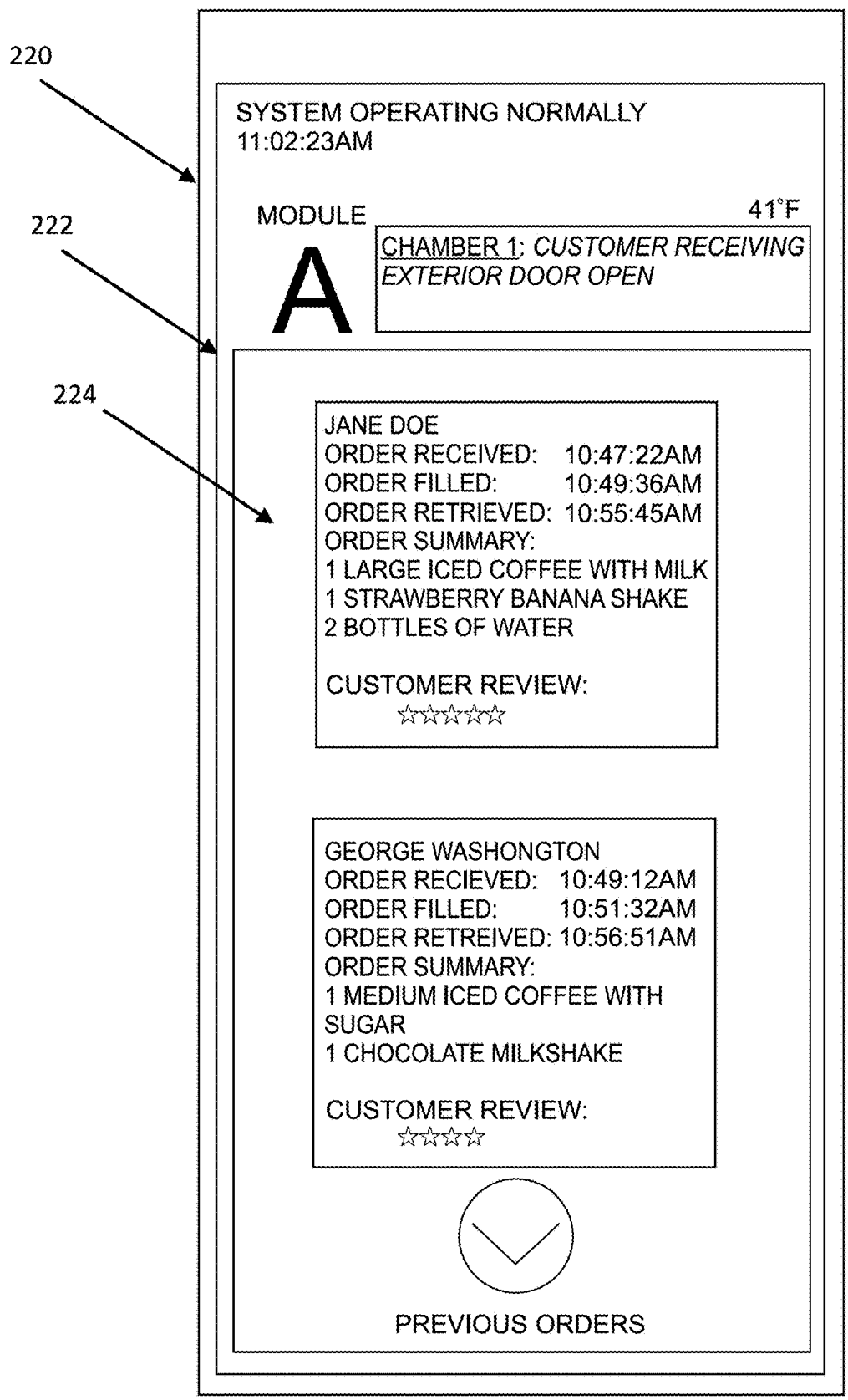
FIG. 23 illustrates an example of a user interface for the storefront pickup system of FIG. 22.
Figure 24:
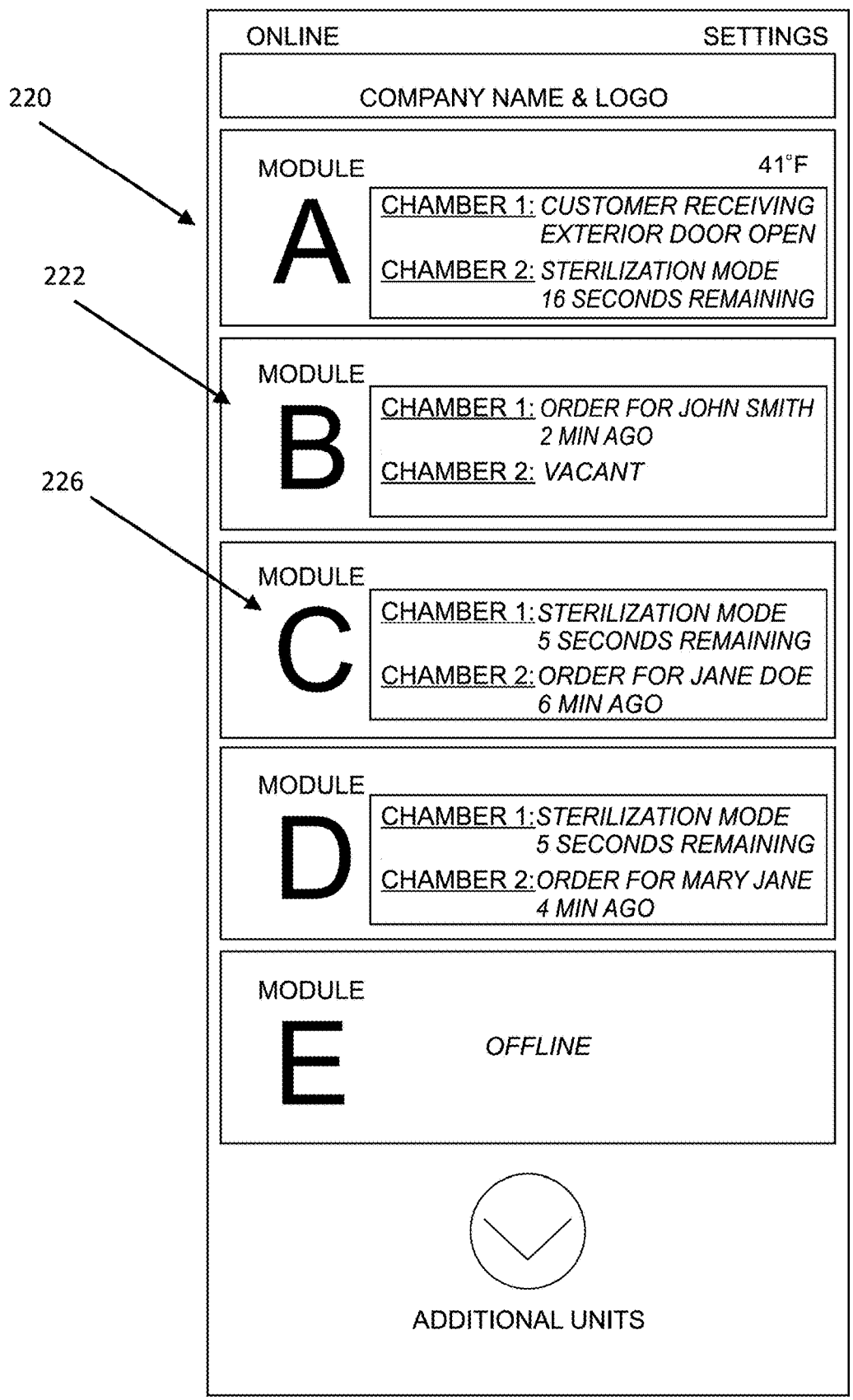
FIG. 24 illustrates another example of a user interface for the storefront pickup system of FIG. 22.

FIG. 22 is an interior elevation view of an example of the storefront pickup system 100. FIGS. 23 and 24 are views of a control panel 220 on the storefront pickup system 100. The control panel 220 can be used by employees to control the storage compartments 102 such as to maintain a desired temperature. In some examples, the control panel 220 includes a touchscreen display 222 that both displays information regarding the status of the storage compartments 102, and that receives inputs from employees to control operation of the storage compartments 102. In some examples, the control panel 220 is washable.

FIGS. 23 and 24 show examples of user interfaces 224, 226 that can be displayed on the touchscreen display 222. Additionally, the user interfaces 224, 226 can be displayed on a separate smartphone, tablet, or computer operated by an employee of the retail establishment for controlling the operation of the storefront pickup system 100.

Figure 25:
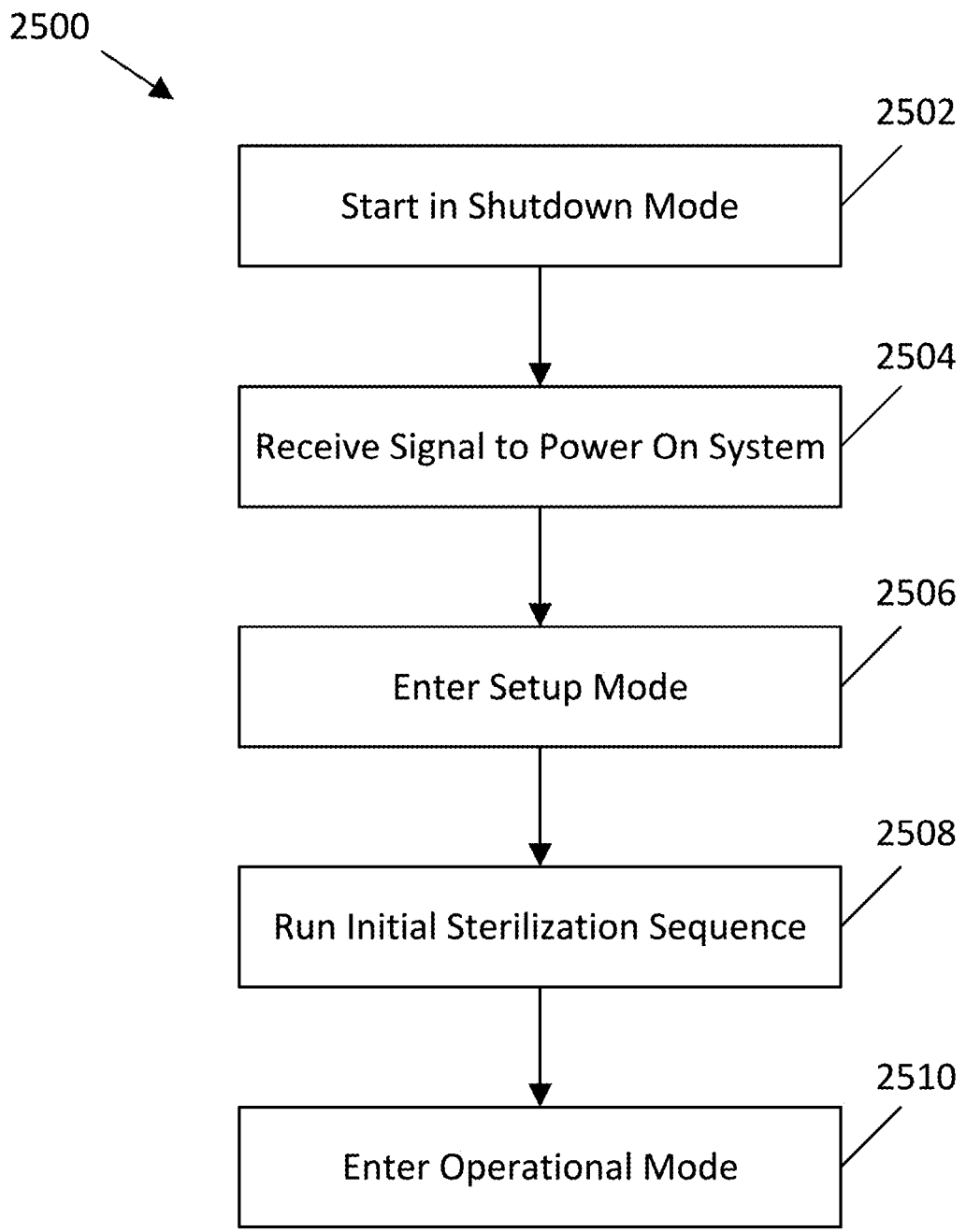
FIG. 25 schematically illustrates an example of a method of initializing the storefront pickup system of FIG. 22.

FIG. 25 schematically illustrates an example of a method 2500 of initializing the storefront pickup system 100. In some examples, the method 2500 is performed by the controller 4700 of the storefront pickup system 100. As shown in FIG. 25, the method 2500 includes an operation 2502 of starting in a shutdown mode. In the shutdown mode, the rear and front door assemblies 120, 122 are each locked, and the storefront pickup system 100 is powered off.

Next, the method 2500 includes an operation 2504 of receiving a signal to power on the storefront pickup system 100. In some examples, the signal is received from an employee operating the control panel 220 (see FIGS. 22-24) such as by selecting a power button on the touchscreen display 222 provided on the storefront pickup system 100. In another example, the signal is received from an employee selecting a power button on a touchscreen display of their mobile device (e.g., smartphone, tablet computer) provided by a downloaded application. In another example, the signal is received from a programmable internal timeclock set based on the hours of operation of the retail establishment such that the storefront pickup system 100 is automatically powered without requiring an input from an employee of the retail establishment.

Next, the method 2500 proceeds to an operation 2506 of exiting the shutdown mode and entering a setup mode. During the setup mode, the storefront pickup system 100 can run a check and testing sequence to make sure all components of the storefront pickup system 100 (e.g., sterilization assembly 176, HVAC system 188, etc.) are connected and operational.

Next, the method 2500 proceeds to an operation 2508 of running an initial sterilization sequence to sterilize the storage compartments 102. The initial sterilization sequence can include operating the sterilization assembly 176 to turn on the first and second UV light sources 178, 179 inside each of the storage compartments 102 for a predetermined period of time. Advantageously, operation 2508 does not require an employee of the retail establishment to manually sterilize each of the storage compartments 102 which can save time allowing the employee to perform other tasks inside the retail establishment.

Next, the method 2500 proceeds to an operation 2510 of exiting the setup mode and entering an operational mode. During the operational mode, the desired temperatures for the storage compartments 102 can be set by an employee such as by using the touchscreen display 222 provided on the storefront pickup system 100 or by using the application downloaded on their mobile device. In some examples, the storefront pickup system 100 can automatically return the storage compartments 102 to a previously set temperature without requiring input from an employee to further save time. In such examples, the controller can communicate with the HVAC system 188 to either heat or cool the storage compartments 102 and to thereby regulate the temperatures inside the storage compartments 102.

Figure 26:
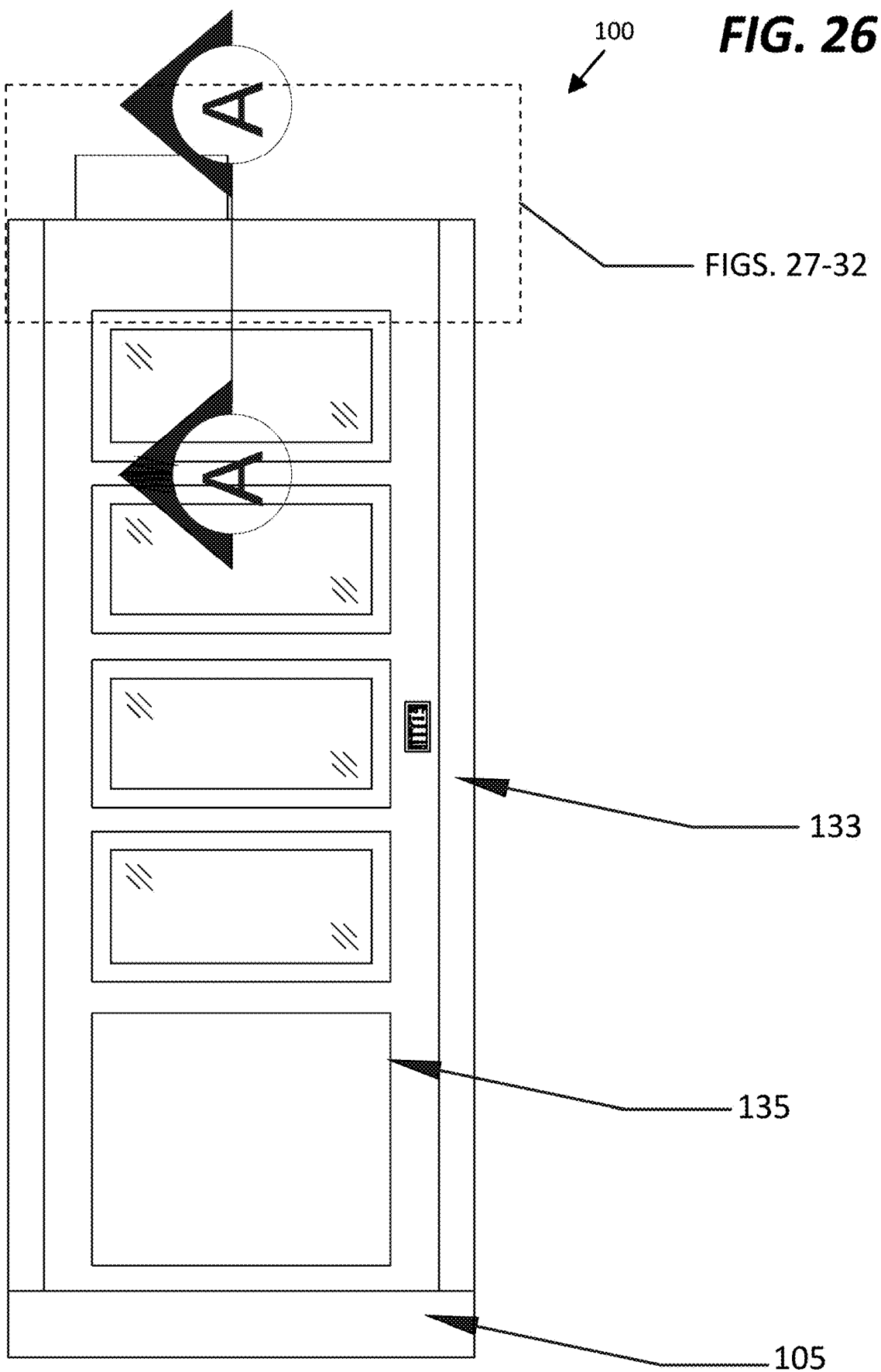
FIG. 26 is an elevation view of an example of the interior side of the storefront pickup system within a retail establishment.

FIG. 26 is an elevation view of an example of the interior side (i.e., employee facing) of the storefront pickup system 100 within the retail establishment. As shown in FIG. 26, the storefront pickup system 100 includes a filler panel 133 that covers over the rigid insulation 110, an employee side insulated access panel 135, and the kickplate 105. The kickplate 105 (see FIG. 20) can include a washable exterior surface 107 (e.g., a washable metal wall base plate) and the rigid insulation 110. The non-shrink caulk 108 can be used to fill any gaps around the kickplate 105 and the exterior faceplate 104, and an adhesive strip 109 can be used to attach the kickplate 105 to the base plate 113 and/or finish floor of the building 10 (see FIG. 20).

Figure 27:
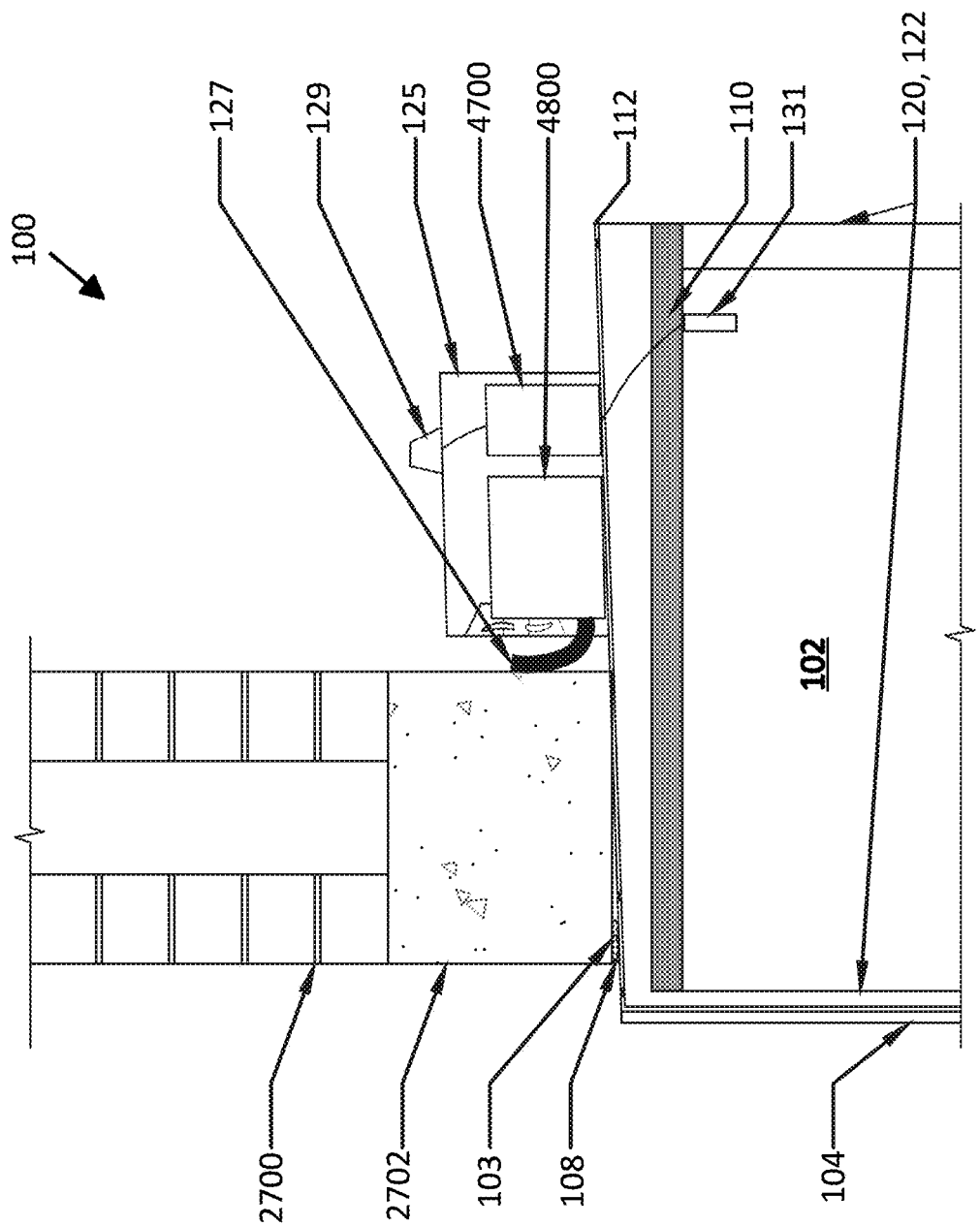
FIG. 27 is a cross-sectional view of an integration of the storefront pickup system into a brick masonry façade taken along line A-A in FIG. 26.

FIG. 27 is a cross-sectional view of an integration of the storefront pickup system 100 into a brick masonry façade 2700 taken along line A-A in FIG. 26. As shown in FIG. 27, a structural lintel 2702 has been added to a top portion of the opening in the brick masonry façade 2700. The structural lintel 2702 can be added by an architect of record or a professional engineer. The storefront pickup system 100 is positioned inside the opening in the brick masonry façade 2700, and underneath the structural lintel 2702. Filler spray foam insulation 103 and non-shrink caulk 108 are installed between the storefront pickup system 100 and the structural lintel 2702 to create a thermal break and moisture barrier between the exterior and interior of the building.

As further shown in FIG. 27, the storefront pickup system 100 includes a housing 125 that is mounted on the top plate 112. As described above, at least an exterior portion of the top plate 112 is sloped in a direction toward the exterior of the building for runoff of moisture. The housing 125 stores the controller 4700 and a system power supply 4800. The housing 125 can include a cooling fan for cooling the controller 4700 and the system power supply 4800.

The controller 4700 can include a memory device (such as Random Access Memory (RAM)), a processing device (such as central processing unit (CPU)), a system bus (such as motherboard), and data storage devices (such as solid-state drive (SSD)). In some instances, the controller 4700 can further include a graphics card as well. As shown in FIG. 27, the controller 4700 is connected to a temperature sensor 131 positioned inside a storage compartment 102. The controller 4700 will be described in more detail with regard to FIG. 47.

The system power supply 4800 is connected to the electrical power supply of the building 10 via a flexible conduit 127. For example, the flexible conduit 127 can carry a power cord that is terminated by a plug that can be plugged into a power outlet or junction box. The system power supply 4800 powers the components of the storefront pickup system 100 such as the controller 4700, the sterilization assembly 176, the HVAC system 188, and the like.

As further shown in FIG. 27, a wireless antenna 129 is attached to the housing 125. The wireless antenna 129 is used for communication between the controller 4700 and applications that are downloadable on the mobile devices of both customers and employees of the retail establishment. For example, the wireless antenna 129 can receive food orders from an application downloaded on a mobile device of a customer. The wireless antenna 129 can also receive commands from an application downloaded on a mobile device of an employee such as to power on the storefront pickup system 100 (e.g., operation 2504 of the method 2500), and regulate the temperature inside the storage compartments 102 (e.g., during operation 2510).

Figure 28:
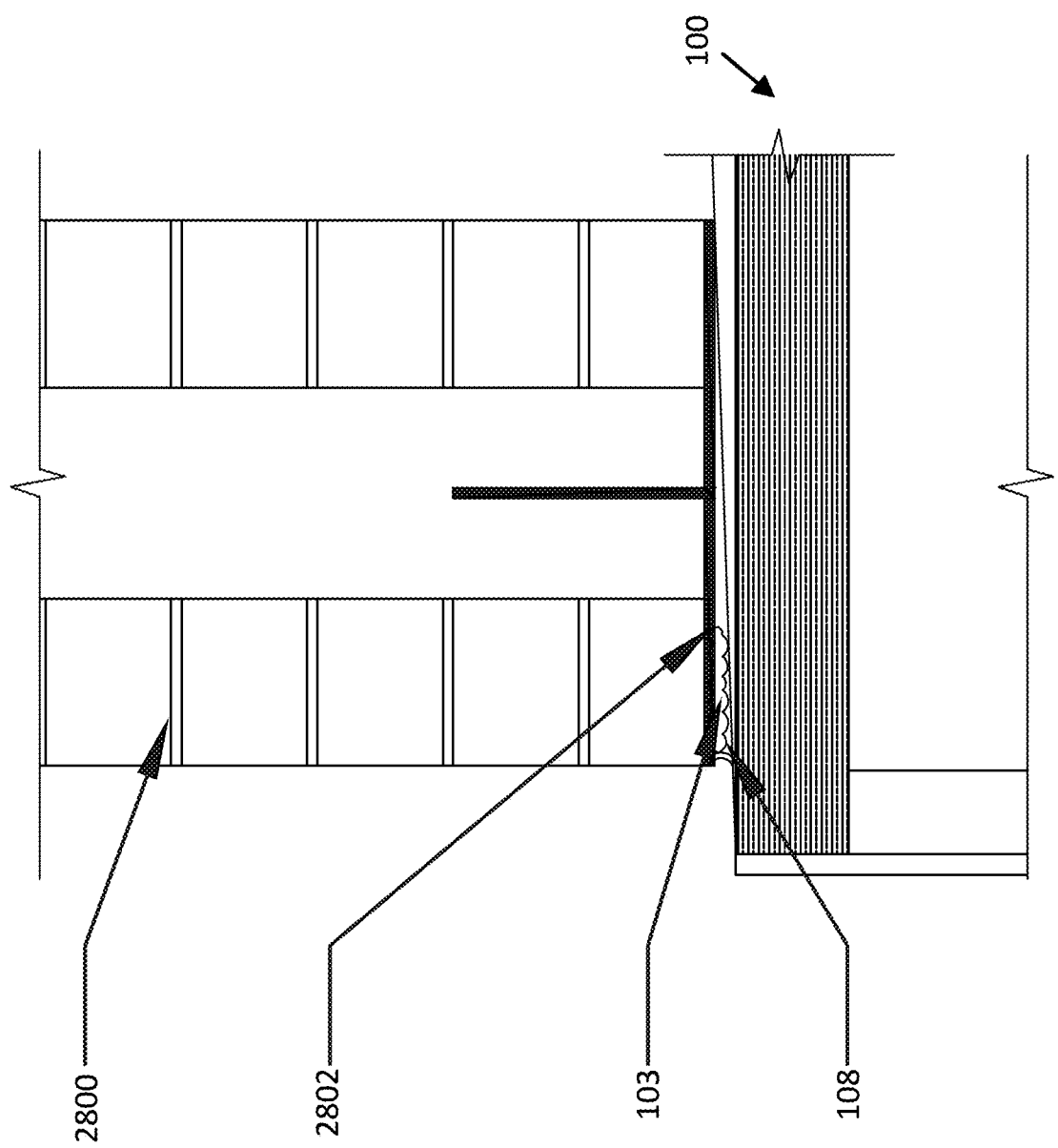
FIG. 28 is another cross-sectional view of an integration of the storefront pickup system into a brick masonry façade taken along line A-A in FIG. 26.

FIG. 28 is another cross-sectional view of an integration of the storefront pickup system 100 into a brick masonry façade 2800 taken along line A-A in FIG. 26. In this example, the opening in the brick masonry façade 2800 has a structural lintel 2802 of a reduced thickness compared to the structural lintel 2702 shown in the example provided in FIG. 27.

Figure 29:
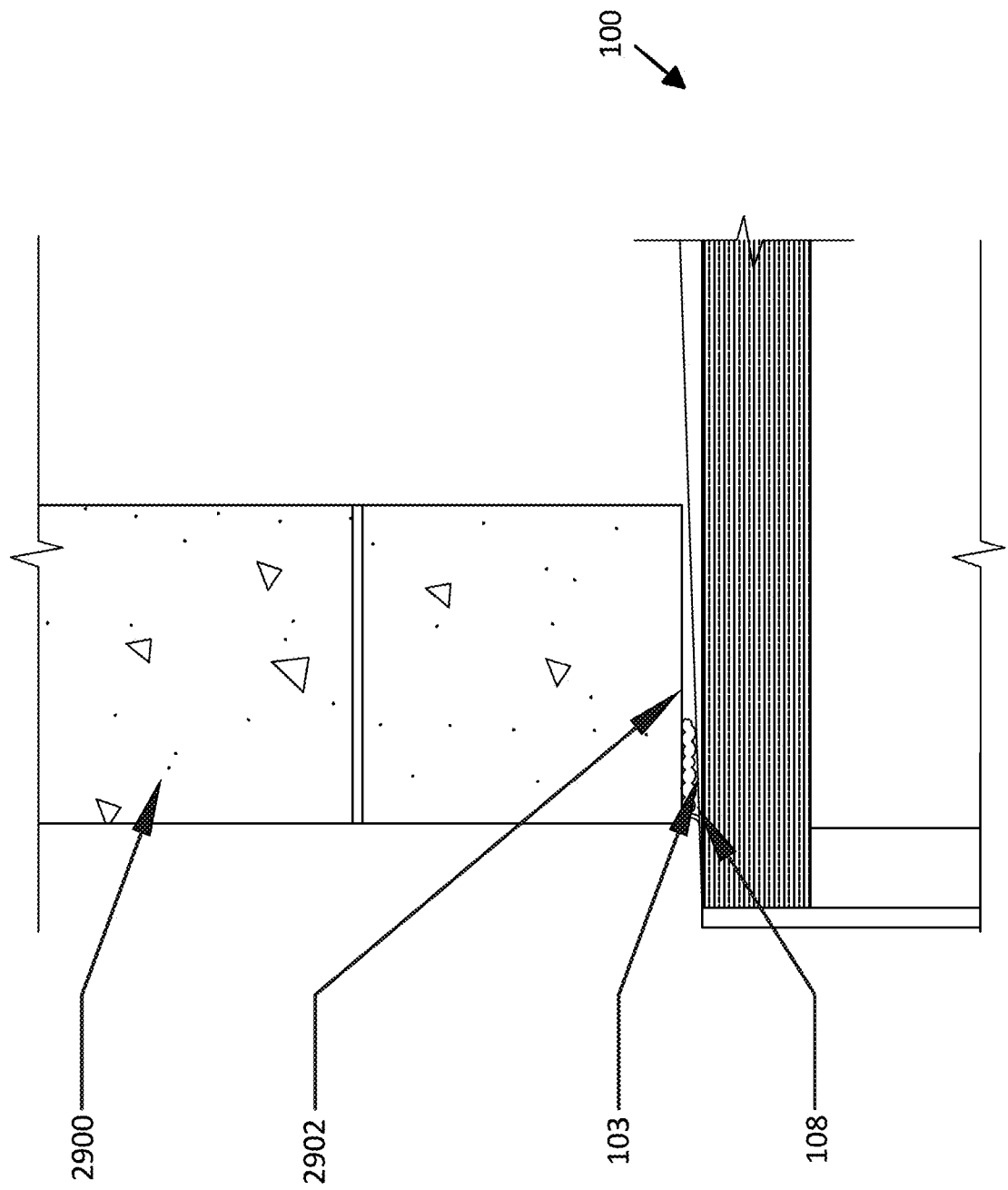
FIG. 29 is another cross-sectional view of an integration of the storefront pickup system into a masonry façade taken along line A-A in FIG. 26.

FIG. 29 is another cross-sectional view of an integration of the storefront pickup system 100 into a masonry façade 2900 taken along line A-A in FIG. 26. In this example, the storefront pickup system 100 is positioned underneath the structural lintel 2902 inside an opening in the masonry façade 2900.

Figure 30:
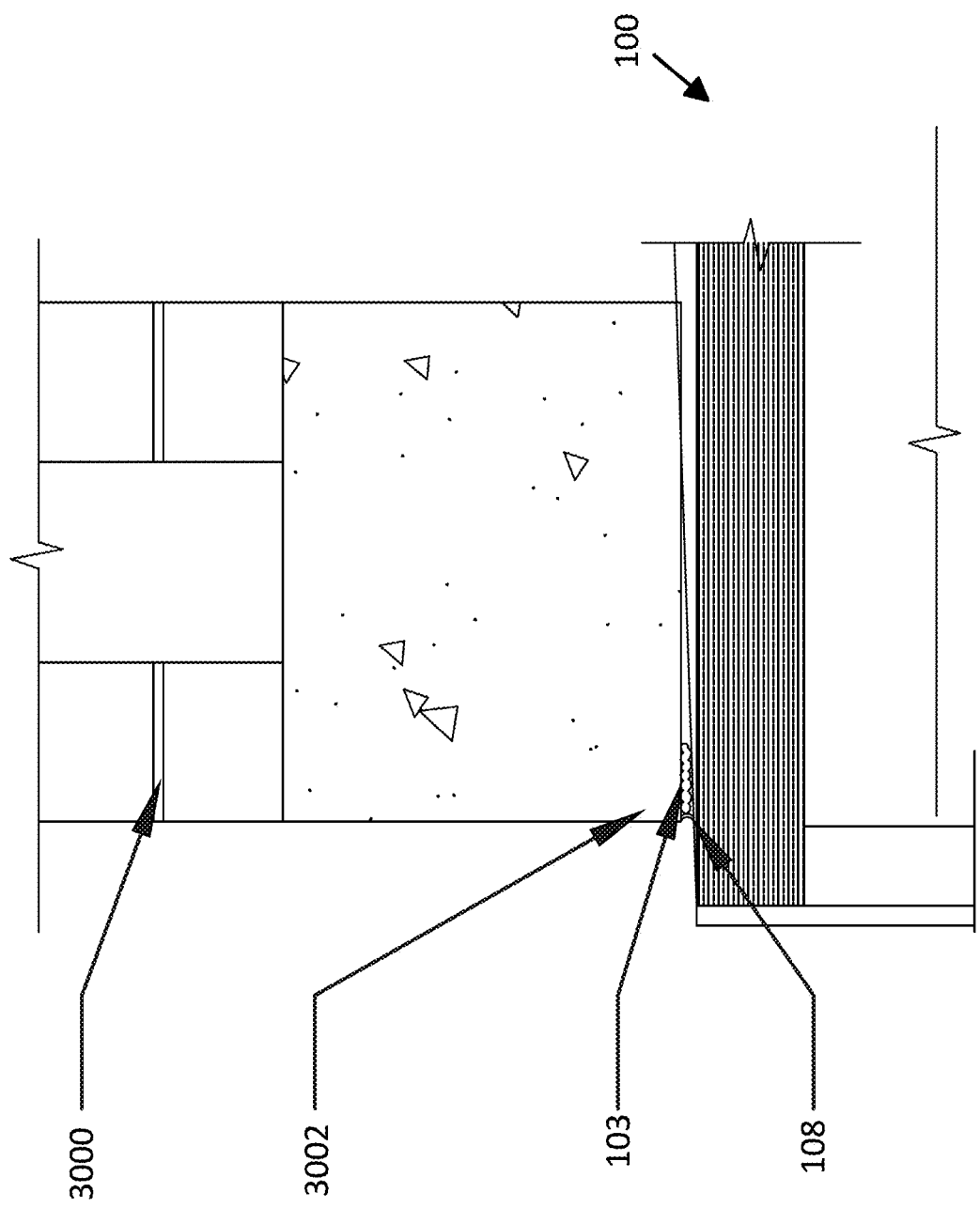
FIG. 30 is another cross-sectional view of an integration of the storefront pickup system into a brick masonry façade taken along line A-A in FIG. 26.

FIG. 30 is another cross-sectional view of an integration of the storefront pickup system 100 into a brick masonry façade 3000 taken along line A-A in FIG. 26. In this example, the storefront pickup system 100 is positioned underneath the structural lintel 3002 inside an opening in the brick masonry façade 3000.

Figure 31:
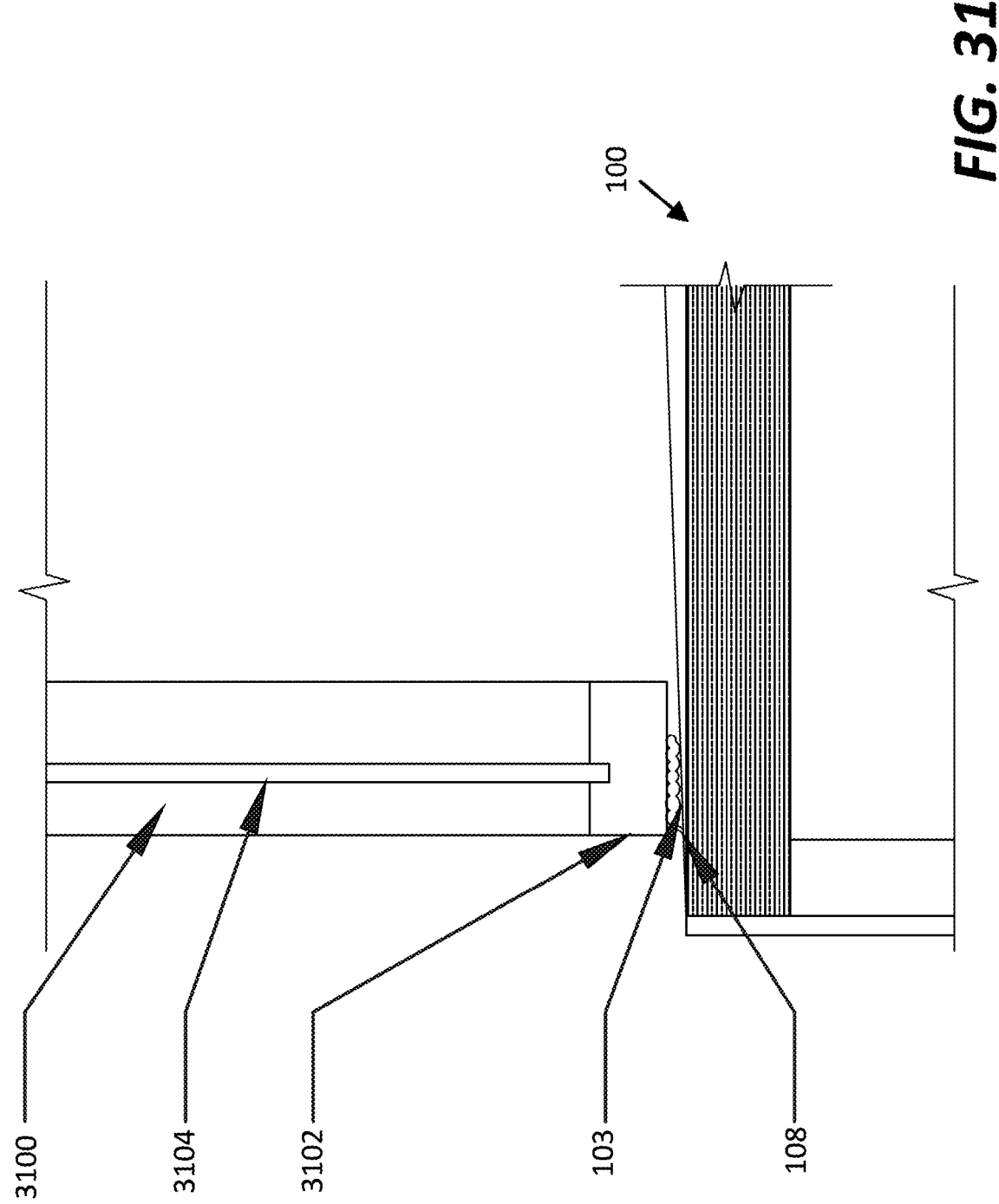
FIG. 31 is a cross-sectional view of an integration of the storefront pickup system into a storefront or curtain wall system taken along line A-A in FIG. 26.

FIG. 31 is a cross-sectional view of an integration of the storefront pickup system 100 into a curtain wall system 3100 taken along line A-A in FIG. 26. In this example, the curtain wall system 3100 includes a single panel 3104, and the storefront pickup system 100 is positioned underneath the structural lintel 3102 inside an opening in the curtain wall system 3100.

Figure 32:
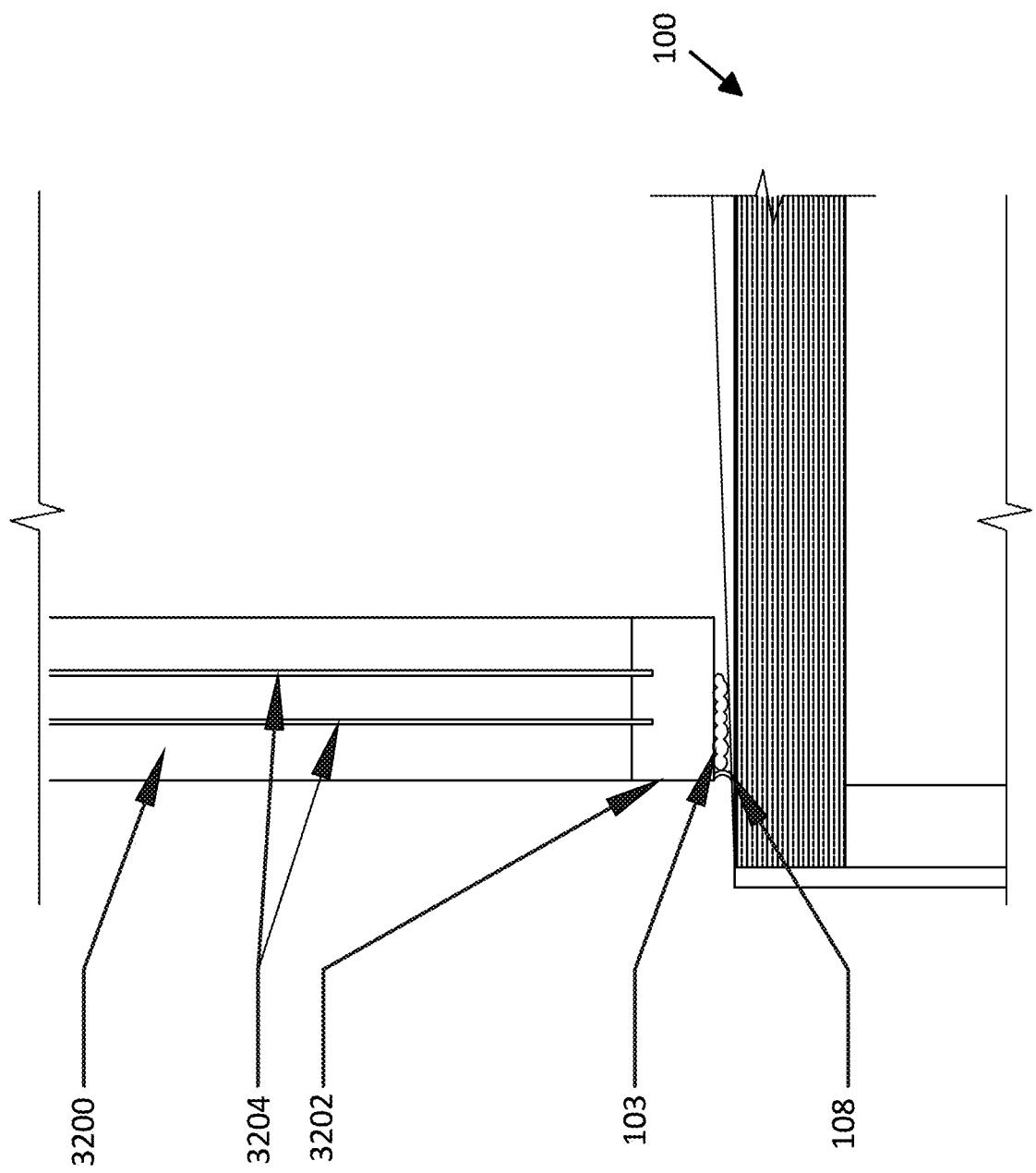
FIG. 32 is another cross-sectional view of an integration of the storefront pickup system into a storefront or curtain wall system taken along line A-A in FIG. 26.

FIG. 32 is a cross-sectional view of an integration of the storefront pickup system 100 into a curtain wall system 3200 taken along line A-A in FIG. 26. In this example, the curtain wall system 3200 includes double panels 3204, and the storefront pickup system 100 is positioned underneath the structural lintel 3202 inside an opening in the curtain wall system 3200.

Figure 33:
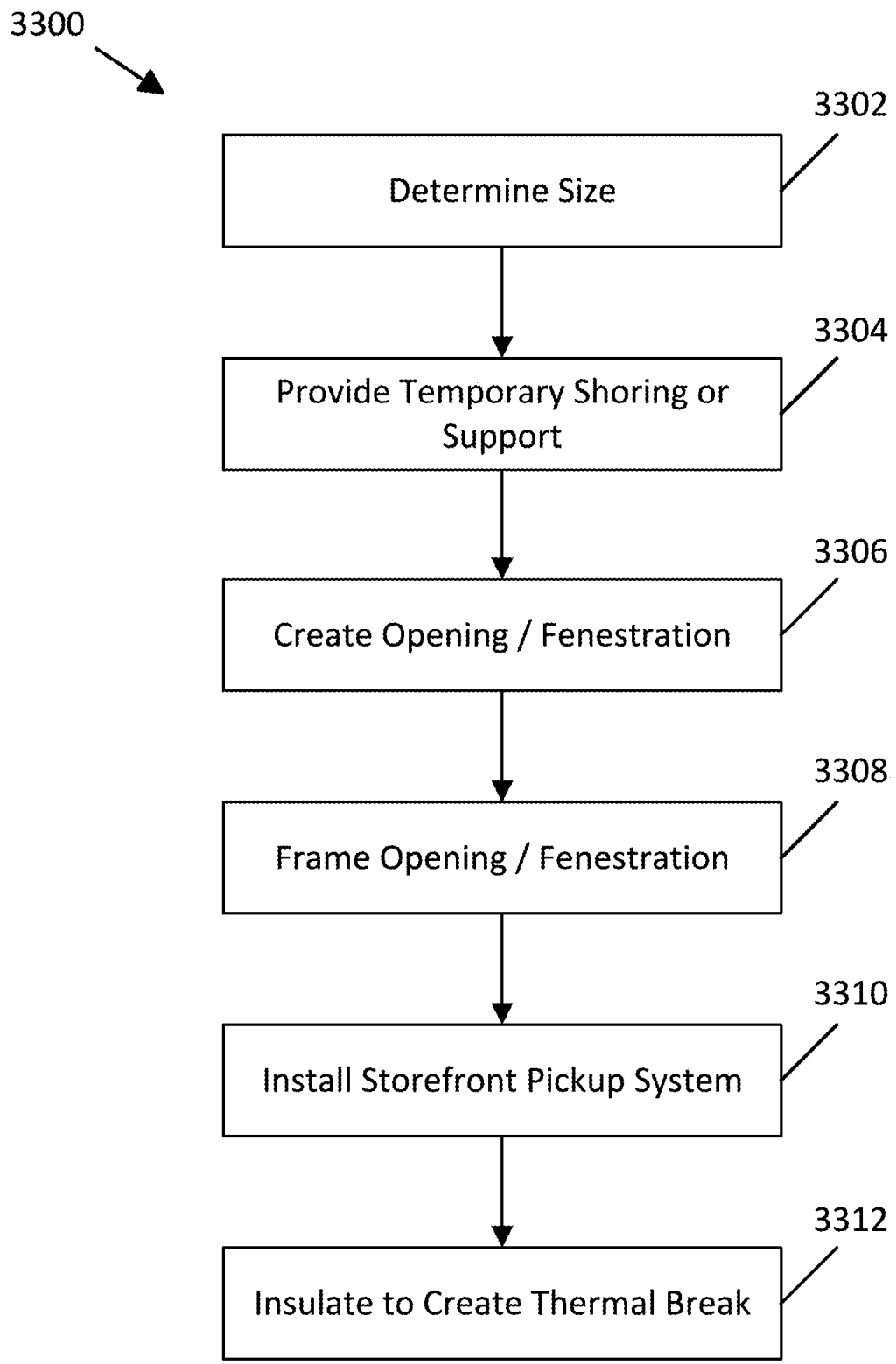
FIG. 33 schematically illustrates an example of a method of installing the storefront pickup system of FIG. 1.

FIG. 33 schematically illustrates an example of a method 3300 of installing the storefront pickup system 100. In certain examples, the method 3300 can be performed by a licensed architect or professional engineer. The method 3300 includes an operation 3302 of determining a size for the storefront pickup system 100 based on a quantity of storage compartments 102. For example, a width W and a height H for the storefront pickup system 100 is based on the number of columns and rows of the storage compartments 102. The method 3300 can further include an operation 3304 of providing temporary shoring or support for the façade and/or curtain wall system of the building 10 to ensure that the integrity of the façade and/or curtain wall system is not damaged during installation of the storefront pickup system 100.

Next, the method 3300 includes an operation 3306 of creating an opening or fenestration on the façade and/or curtain wall system of the building 10 that is slightly larger than the size for the storefront pickup system 100 determined in operation 3302. In certain examples, operation 3306 can include removing a portion of the façade and/or curtain wall system of the building 10 to create the opening or fenestration.

Figure 34:
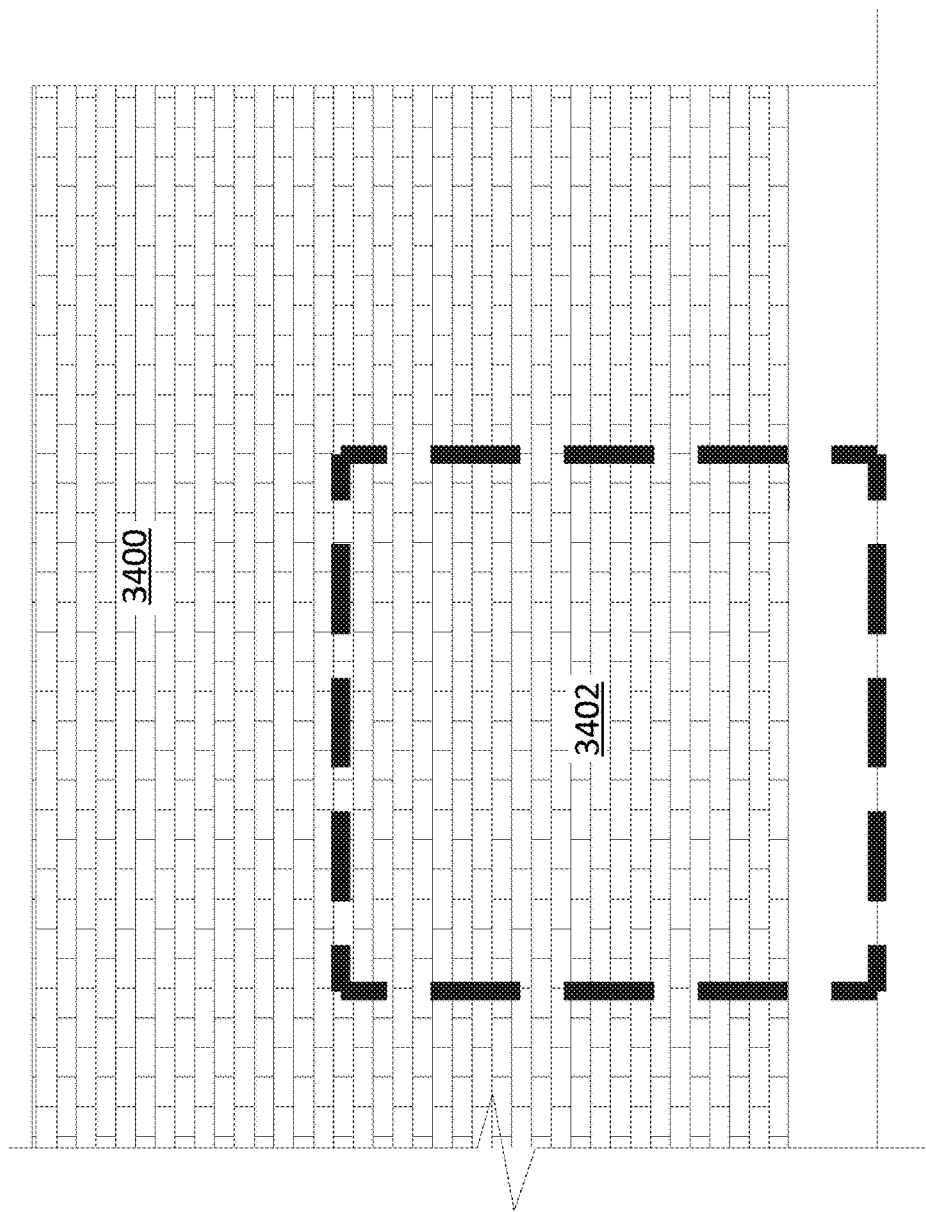
FIG. 34 illustrates an example of a wall segment measured for removal from a brick façade of a building to create an opening or fenestration in the method of FIG. 33.
Figure 35:
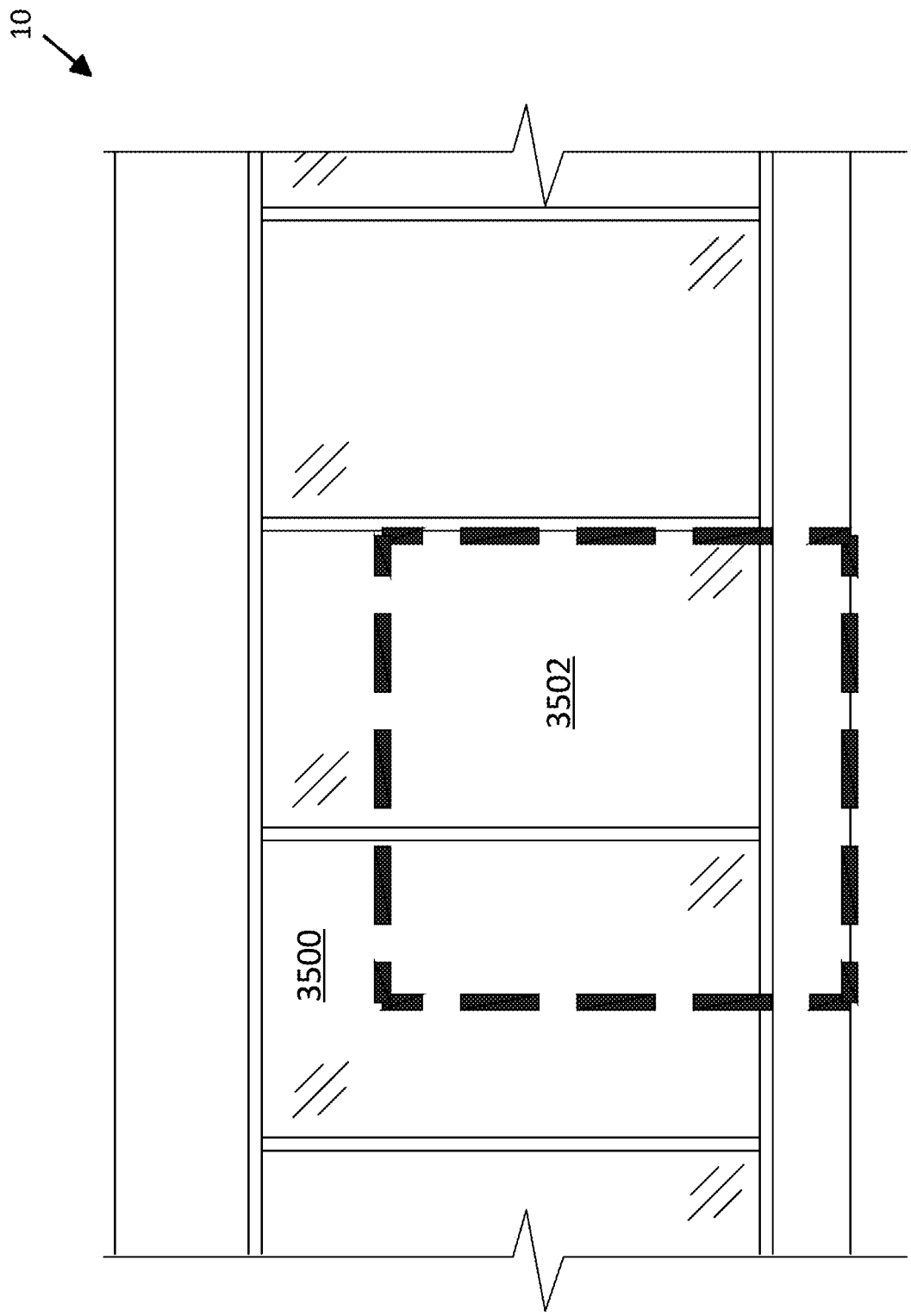
FIG. 35 illustrates another example of a wall segment measured for removal from a storefront or curtain wall system of a building to create the opening or fenestration in the method of FIG. 33.

FIG. 34 shows an example of a wall segment 3402 that is measured for removal from a brick façade 3400 of a building 10 to create the opening or fenestration in operation 3306 of the method 3300. FIG. 35 shows another example of a wall segment 3502 that is measured for removal from a storefront or curtain wall system 3500 of a building 10 to create the opening or fenestration in operation 3306 of the method 3300.

Next, the method 3300 includes an operation 3308 of framing the opening or fenestration to structurally shore up the façade of the building. In some examples, operation 3308 includes adding a lintel to a top boundary of the opening or fenestration, and adding one or more framing members to the side and bottom boundaries of the opening or fenestration.

Figure 36:
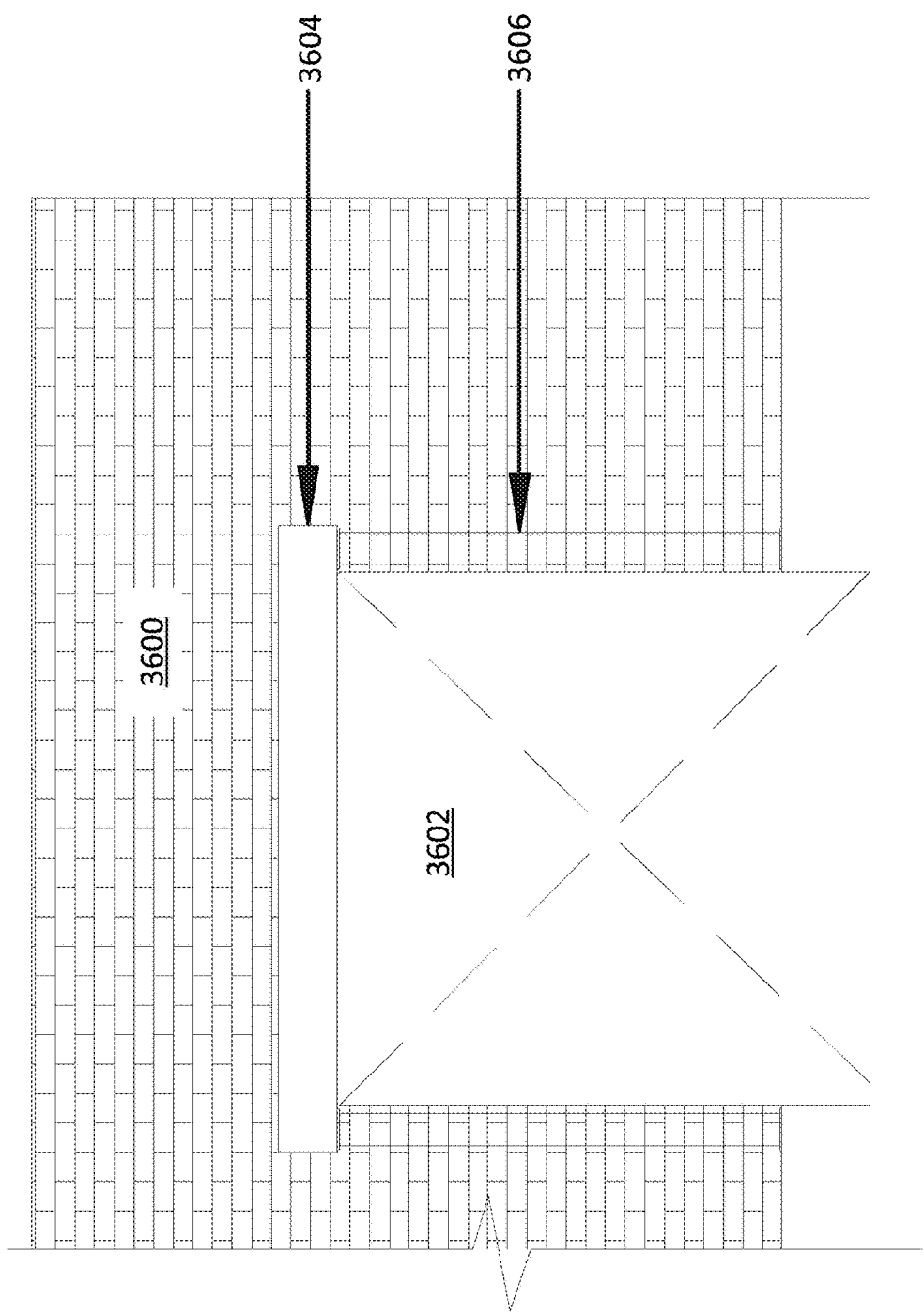
FIG. 36 illustrates an example of a lintel and framing members shoring up an opening or fenestration in a brick façade of a building in the method of FIG. 33.
Figure 37:
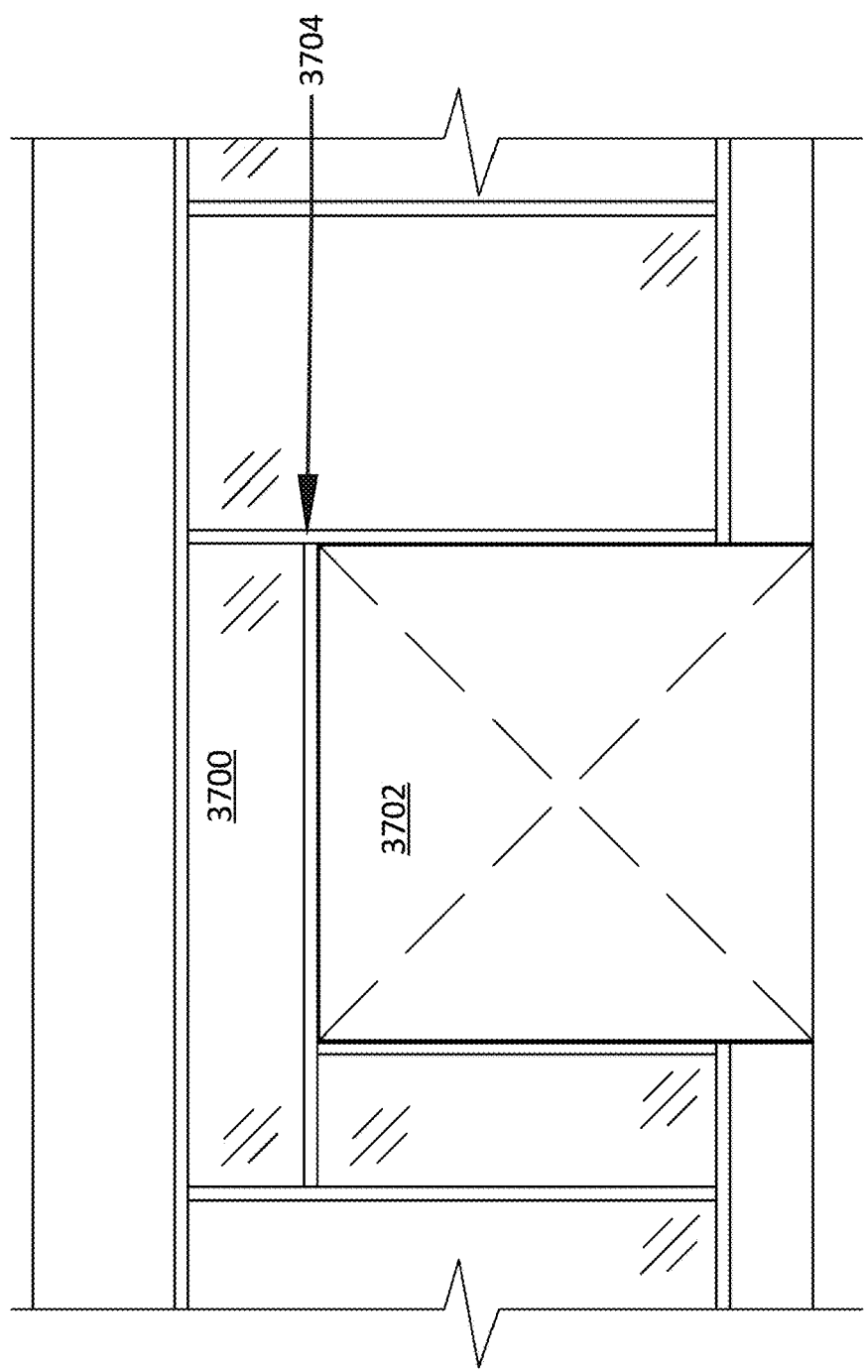
FIG. 37 illustrates another example of framing members shoring up an opening or fenestration in a storefront or curtain wall system of a building in the method of FIG. 33.

FIG. 36 shows an example of a lintel 3604 and framing members 3606 added to shore up the opening or fenestration 3602 in a brick façade 3600 after completion of operation 3308. FIG. 37 shows an example of framing members 3704 added to shore up the opening or fenestration 3702 in a curtain wall system 3700 after completion of operation 3308.

Next, the method 3300 includes an operation 3310 of installing the storefront pickup system 100 inside the opening or fenestration. As an example, a contractor can be used to install the storefront pickup system 100 after delivery to the retail establishment by the manufacturer.

Next, the method 3300 includes an operation 3312 of insulating gaps between the storefront pickup system 100 and the opening or fenestration to create a thermal break between an exterior of a building and an interior of the building to allow food items to travel through the façade of the building via the storage compartments 102. As an example, the gaps can be insulated by applying the filler spray foam insulation 103 and non-shrink caulk 108 to fill gaps between the storefront pickup system 100 and the opening of the building 10.

Figure 38:
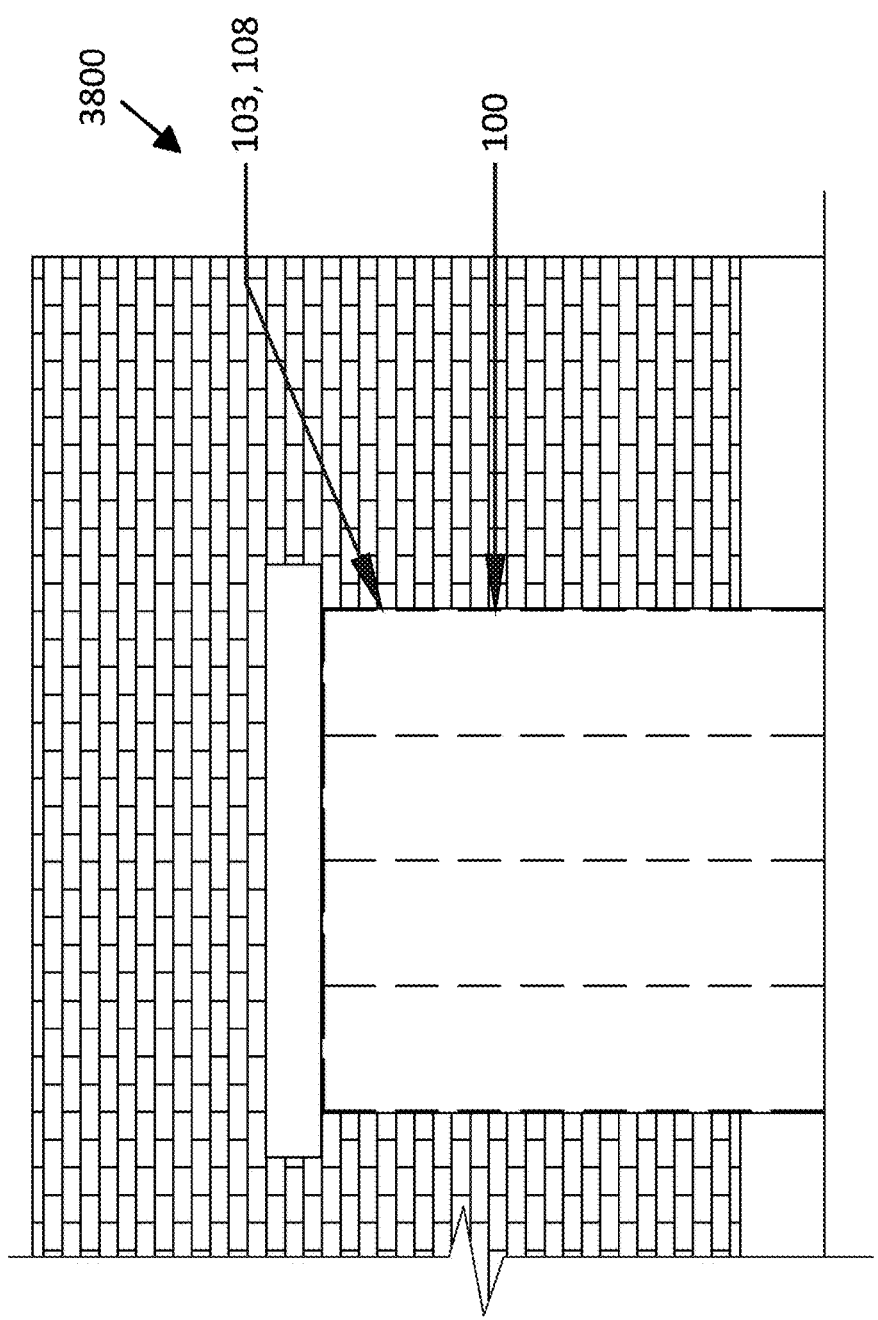
FIG. 38 illustrates an example of the storefront pickup system installed in a brick façade of a building in the method of FIG. 33.
Figure 39:
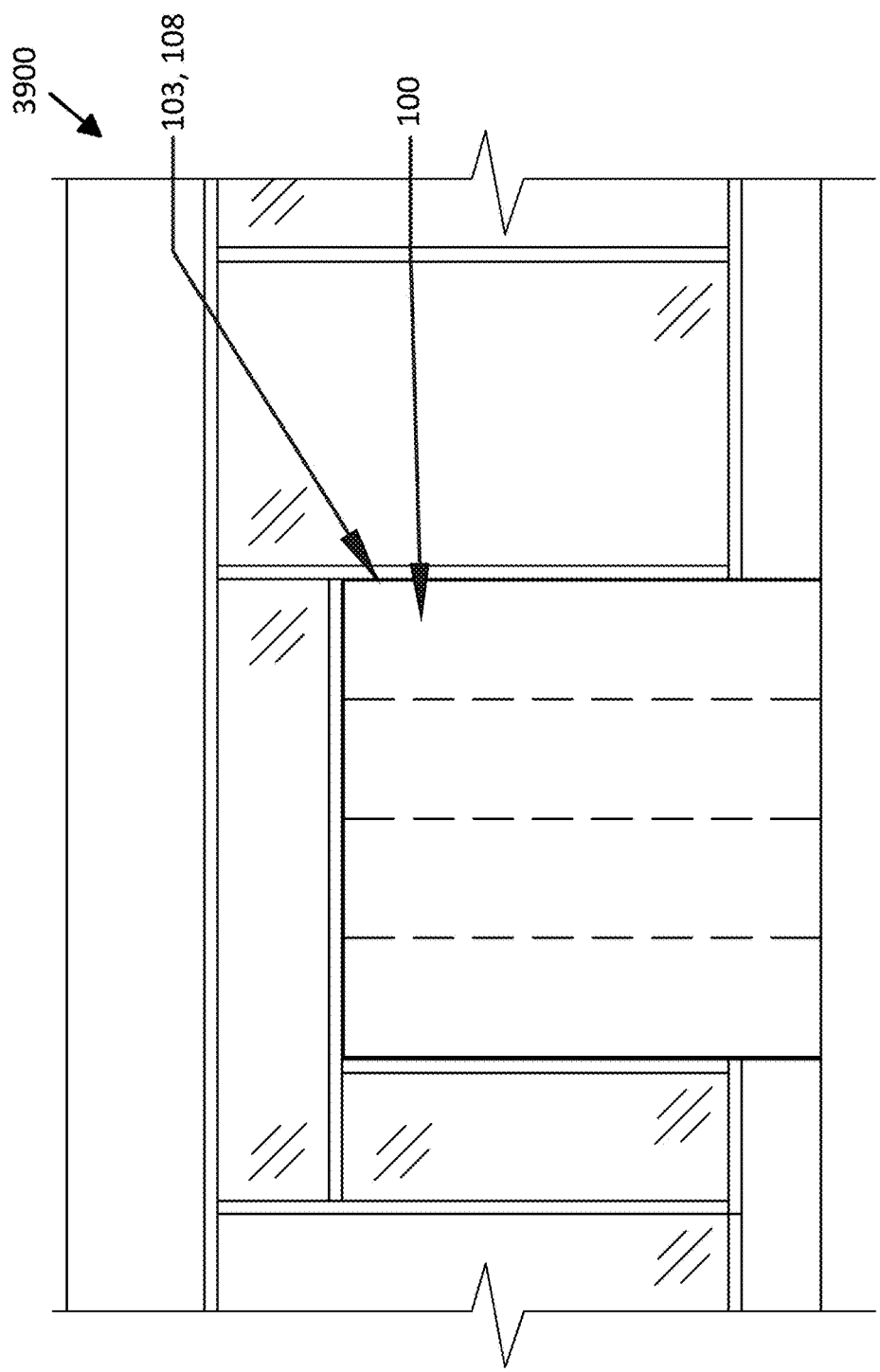
FIG. 39 illustrates an example of the storefront pickup system installed in a storefront or curtain wall system of a building in the method of FIG. 33.

FIG. 38 illustrates an example of the storefront pickup system 100 installed in a brick façade 3800 after completion of operation 3312. FIG. 39 illustrates an example of the storefront pickup system 100 installed in a curtain wall system 3900 after completion of operations 3312.

Figure 40:
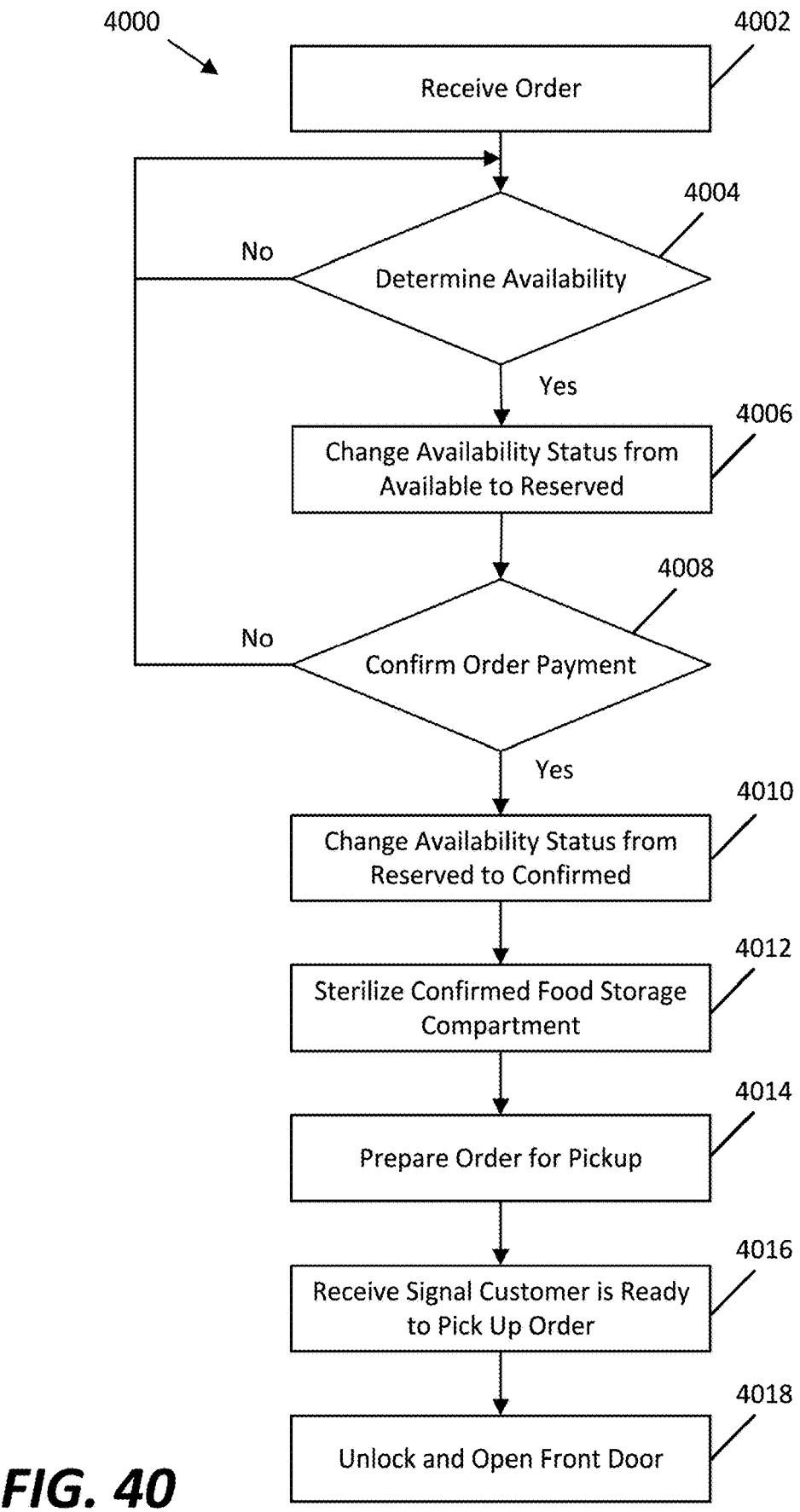
FIG. 40 schematically illustrates an example of a method of fulfilling an order received from a customer by the storefront pickup system of FIG. 1.

FIG. 40 schematically illustrates an example of a method of fulfilling an order received from a customer by the storefront pickup system 100. In some examples, the method 4000 is performed by the controller 4700 of the storefront pickup system 100.

The method 4000 includes an operation 4002 of receiving an order. The order can be received by the wireless antenna 129 (see FIG. 27) from a customer application operated by a customer. The customer application can be operated on a mobile device (e.g., smartphone) of the customer, or can otherwise be accessed online such as from the internet.

Figure 41:
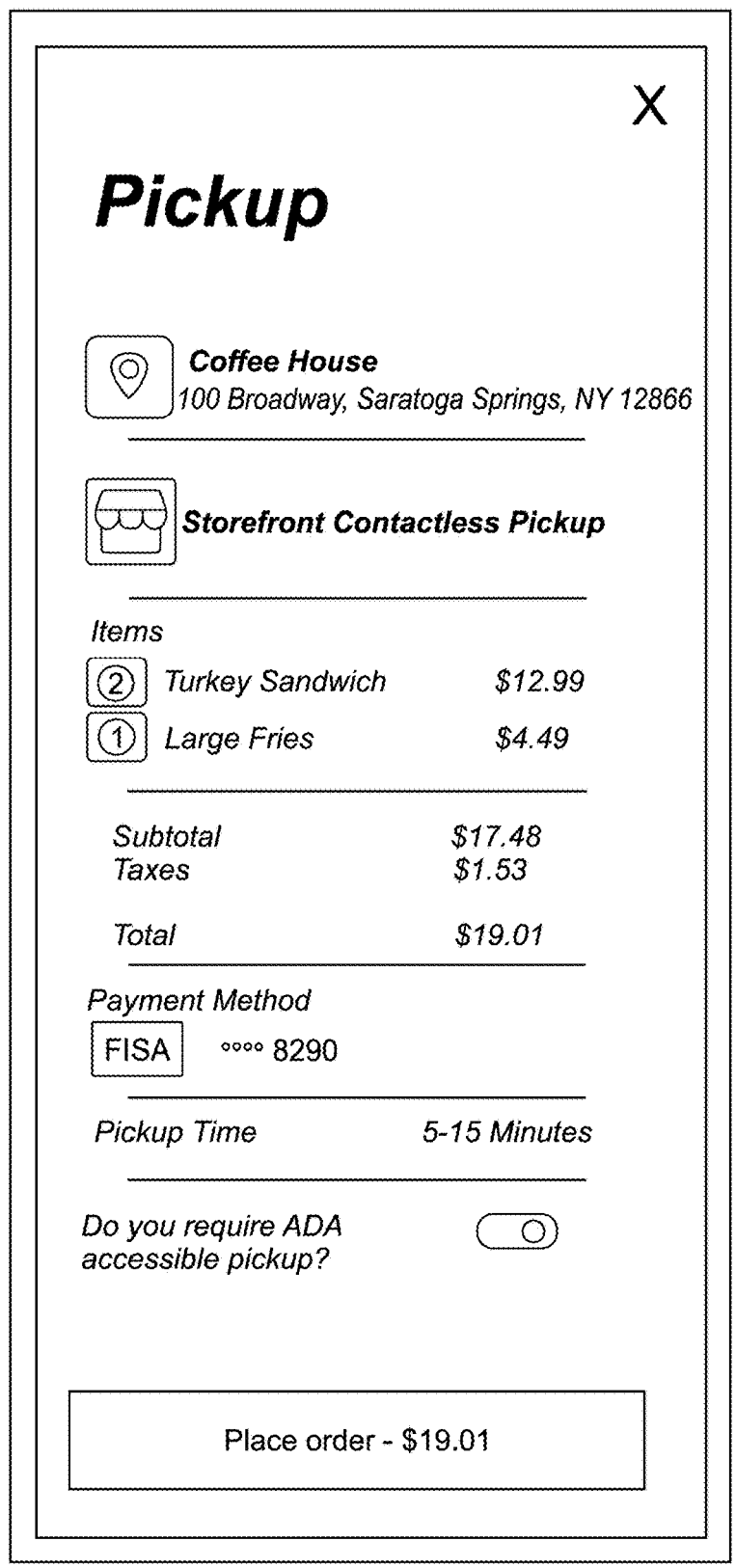
FIG. 41 illustrates an example of a user interface for a customer to place an order for fulfillment by the storefront pickup system of FIG. 1.

FIG. 41 illustrates an example of a user interface 4100 for a customer to place an order for fulfillment by the storefront pickup system 100. The order is created by the customer adding one or more items to a cart for purchase, choosing the storefront pickup system 100 as their preferred delivery/pickup method, entering a payment method, and then viewing the cart and confirming their order for fulfillment by the storefront pickup system 100. In some examples, the customer can indicate whether they would like a storage compartment 102 that is handicap accessible such as one that is accessible by wheelchair.

After the order is received, the method 4000 proceeds to an operation 4004 of determining whether a storage compartment 102 in the storefront pickup system 100 is available. When there is no availability (i.e., "No" at operation 4004), the storefront pickup system 100 notifies the customer application that wait times may be longer than usual. In such instances, the method 4000 can place the order in a queue and repeat the operation 4004 after a predetermined period to determine whether a storage compartment 102 became available.

When the storefront pickup system 100 is in the shutdown mode or is otherwise powered off (i.e., "No" at operation 4004), the storefront pickup system 100 can notify the customer application to either display that the storefront pickup system 100 is not available, or the storefront pickup system 100 can be removed as an option for pickup. In such examples, another pickup method must be chosen by the customer within the customer application.

When a storage compartment 102 is available (i.e., "Yes" at operation 4004), the method 4000 proceeds to an operation 4006 of changing a status of an available storage compartment from available to reserved. The reserved status prevents future orders by other customers from being assigned to the reserved storage compartment.

Still referring FIG. 40, the method 4000 proceeds to an operation 4008 of determining whether payment for the order is received. When payment is not received or otherwise confirmed (i.e., "No" at operation 4008), the method 4000 can send an error message to the customer application requesting the user enter another form of payment. In such examples, the method 4000 returns to repeat the operations 4004-4006 while the new payment method is being entered by the customer. This can cause the status of the storage compartment 102 to change from reserved to available, such that it can be selected to fulfill an order from another customer.

When payment for the food order is confirmed (i.e., "Yes" at operation 4008), the method 4000 proceeds to an operation 4010 of changing the availability status of the storage compartment from reserved to confirmed. Operation 4010 can also include sending a notification to the customer application that confirms that the order is being prepared. In some examples, the notification also identifies the reserved storage compartment.

Figure 42:
FIG. 42 illustrates an example of a user interface that can be generated based on data provided by the storefront pickup system of FIG. 1.

FIG. 42 illustrates an example of a user interface 4200 generated based on data provided by the storefront pickup system 100. In this example, the user interface 4200 displays a message that the order is being prepared, and additionally displays pickup information including the name and address of the retail establishment (e.g., "Coffee House, 100 Broadway, Saratoga Springs, NY 12866"), the method of pick up (e.g., "Storefront Contactless Pickup") including the number of the reserved storage compartment (e.g., "Cubby #14"), and the approximate pickup time (e.g., "4:32 PM EST"). Additional information can be displayed in further examples.

The method 4000 next proceeds to an operation 4012 of sterilizing the confirmed storage compartment. The confirmed storage compartment is sterilized by using the sterilization assembly 176. Operation 4012 can include sterilizing the confirmed storage compartment in accordance with the operations of the method 1800 described above.

Next, the method 4000 proceeds to an operation 4014 of preparing an order for pickup. Operation 4014 can include unlocking the rear door assembly 120 of the confirmed storage compartment allowing an employee to place one or more items of the order into the confirmed storage compartment. Advantageously, the employee does not need to leave the area where the one or more items are prepared (e.g., kitchen) to fulfill the order reducing exposure of the employee to customers. In some examples, operation 4014 can further include sensing an item placed into the storage compartment 102, and then sensing when the rear door assembly 120 is closed. Thereafter, operation 4014 can include designating the order is ready for pickup.

Figure 43:
FIG. 43 illustrates another example of a user interface that can be generated based on data provided by the storefront pickup system of FIG. 1.

In some examples, operation 4014 can include sending a notification to the customer application that the order is ready for pickup. FIG. 43 illustrates an example of a user interface 4300 generated based on data provided by the storefront pickup system 100. The user interface 4300 displays a message that the order is ready for pickup, and the pickup information.

Additionally, the user interface 4300 includes an icon 4302 that can be selected by the customer to unlock the front door assembly 122 of the storage compartment. For example, the customer can select the icon 4302 when the customer arrives at the location of the storefront pickup system 100 to unlock the front door assembly 122 and thereby retrieve their order.

Figure 44:
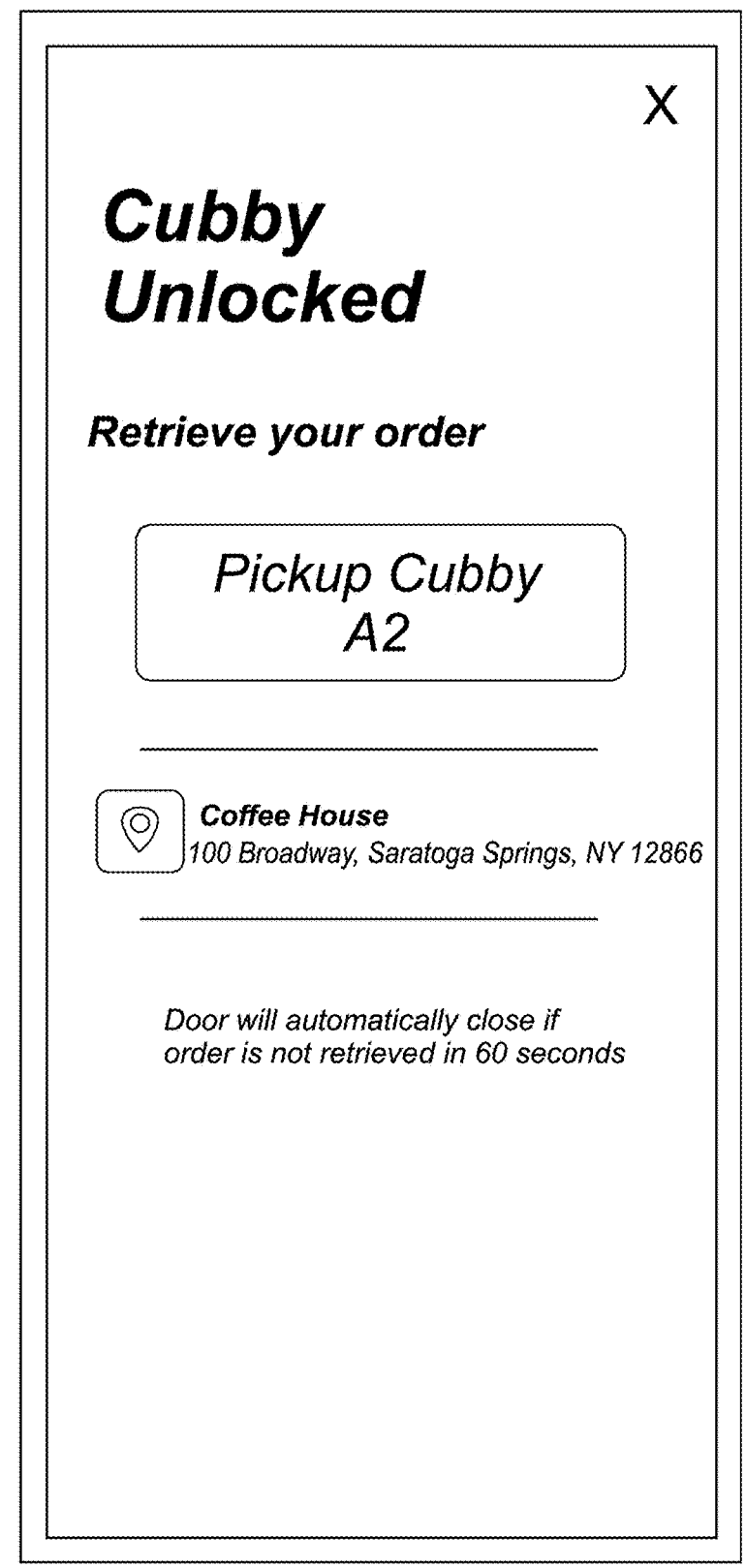
FIG. 44 illustrates another example of a user interface that can be generated following selection of an icon to unlock a storage compartment on the user interface of FIG. 43.

FIG. 44 illustrates an example of a user interface 4400 that can be generated following selection of the icon 4302 on the user interface 4300. In this example, the user interface 4400 displays a message that the confirmed storage compartment is unlocked and can include an instruction to pick up the order (e.g., "Pickup Cubby A2"). In some examples, the user interface 4400 can indicate that the front door assembly 122 will automatically close and lock if the order is not retrieved within a predetermined period of time (e.g., 60 seconds).

Referring back to FIG. 40, the method 4000 includes an operation 4016 of receiving a signal from a mobile device operated by the customer. The signal indicates that the customer is ready to pick up the order. As described above, the signal can be generated when the customer selects the icon 4302 to unlock the front door assembly 122 of the storage compartment 102.

Next, the method 4000 proceeds to an operation 4018 of unlocking and opening the front door assembly 122 following receipt of the signal from the mobile device of the customer. The front door assembly 122 is unlocked by disengaging the spring-loaded latches 140 from the lock casings 142, and the front door assembly 122 is opened by rotating the pivot rod 134 to swing the front door assembly 122 from the closed position into the open position. For example, FIG. 12 shows the piston 158 pushing the spring-loaded latch 140 to release from the lock casing 142. When the front door assembly 122 is opened, the customer can remove from an exterior of the building the order from the storage compartment without having to enter the interior of the building. Also, the front door assembly 122 can be automatically unlocked and opened without requiring the customer to physically touch the front door assembly 122, thereby reducing the customer's exposure to germs, bacteria, and other unsanitary conditions.

After retrieval of the order, the sensor 130 detects removal of the order from the storage compartment 102, and the controller 4700 can automatically close the front door assembly 122 by rotating the pivot rod 134 in a direction to swing the front door assembly 122 from the open position into the closed position, and then lock the front door assembly 122 by engaging the spring-loaded latches 140 with the lock casings 142. For example, FIG. 11 shows the piston 158 retracting to allow for the spring-loaded latch 140 to catch the lock casing 142, and thereby close and lock the front door assembly 122. The method 4000 can then proceed to sterilizing the storage compartment 102 using the sterilization assembly 176.

Figure 45:
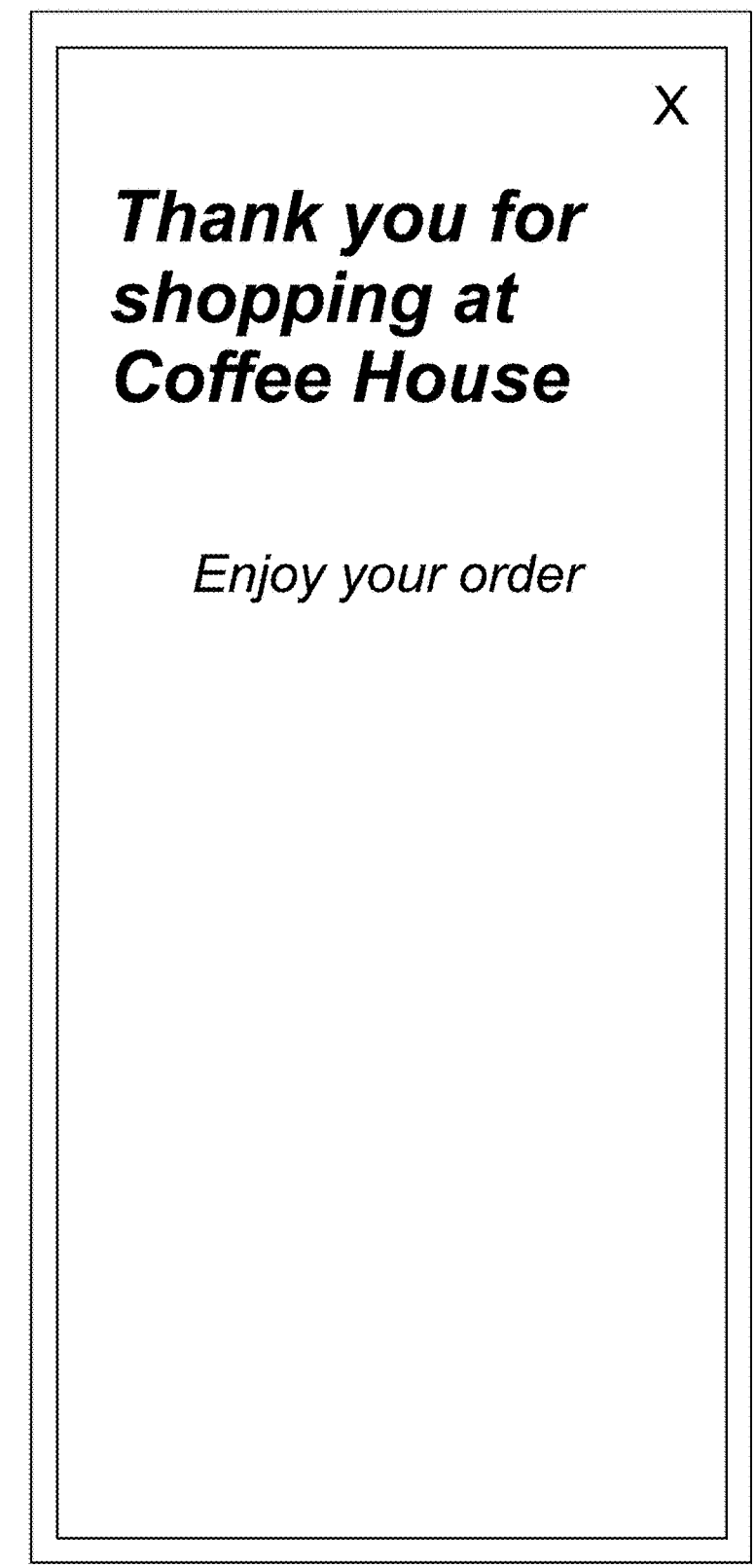
FIG. 45 illustrates another example of a user interface that can be generated following fulfillment of the order by the storefront pickup system of FIG. 1.

FIG. 45 illustrates another example of a user interface 4500 that can be generated following fulfillment of the order by the storefront pickup system 100, and pick up of the food order by the customer. As an illustrative example, the user interface 4500 can display one or more messages such as "Thank you for shopping at Coffee House" and/or "Enjoy your order".

Figure 46:
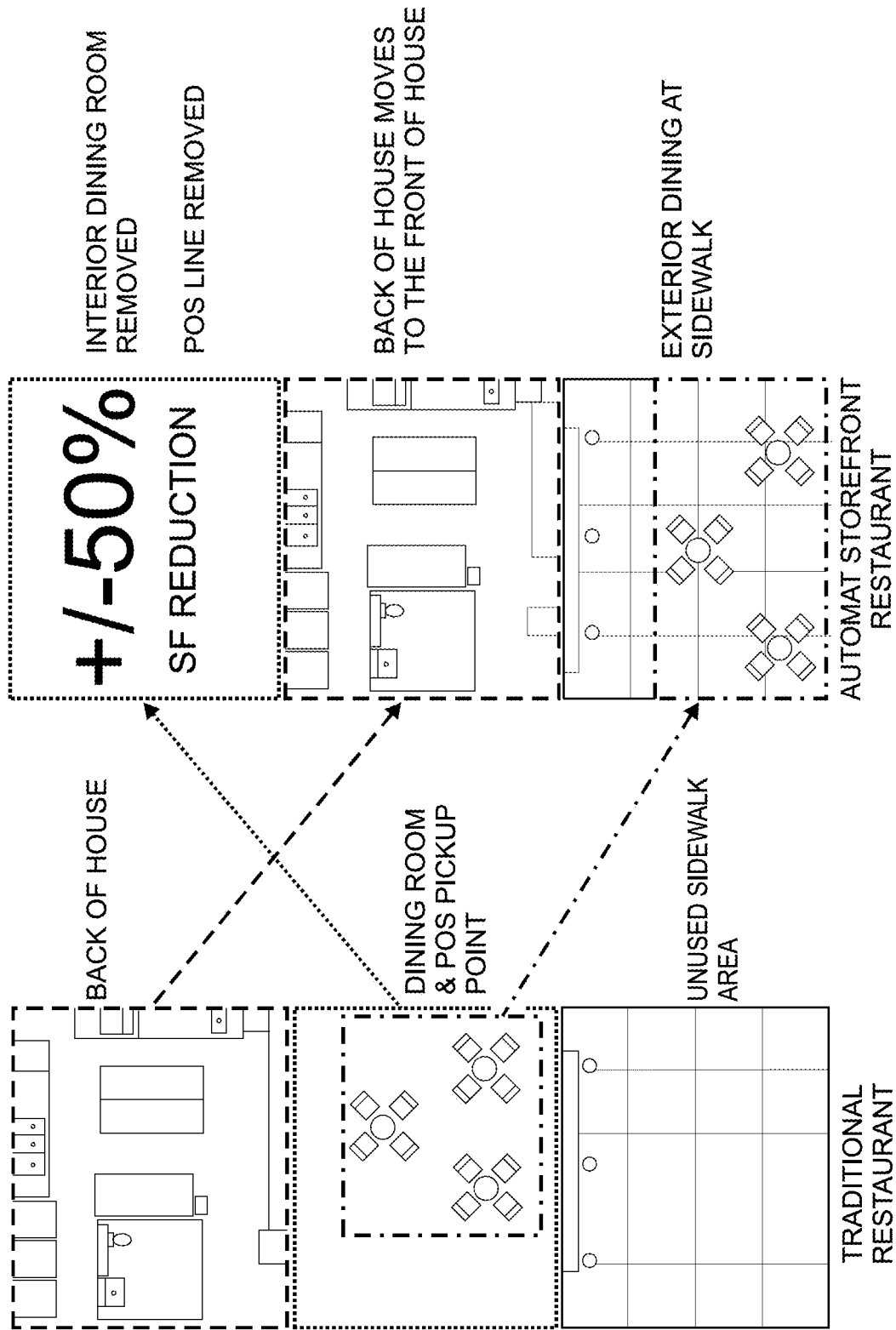
FIG. 46 schematically illustrates an example of an implementation of the storefront pickup system of FIG. 1.

FIG. 46 schematically illustrates an example of a layout of the storefront pickup system 100. As shown in FIG. 46, the kitchen of the retail establishment is moved toward the front of the building to occupy the traditional space of a dining area and point of sale pickup point, and the dining area and point of sale pickup point are moved to a sidewalk area in front of the building. This layout can reduce by approximately 50% the commercial space needed by the retail establishment for operating its business, leading to a more efficient use of the building. This can reduce overhead expenses such as commercial rent for the retail establishment.

Figure 47:
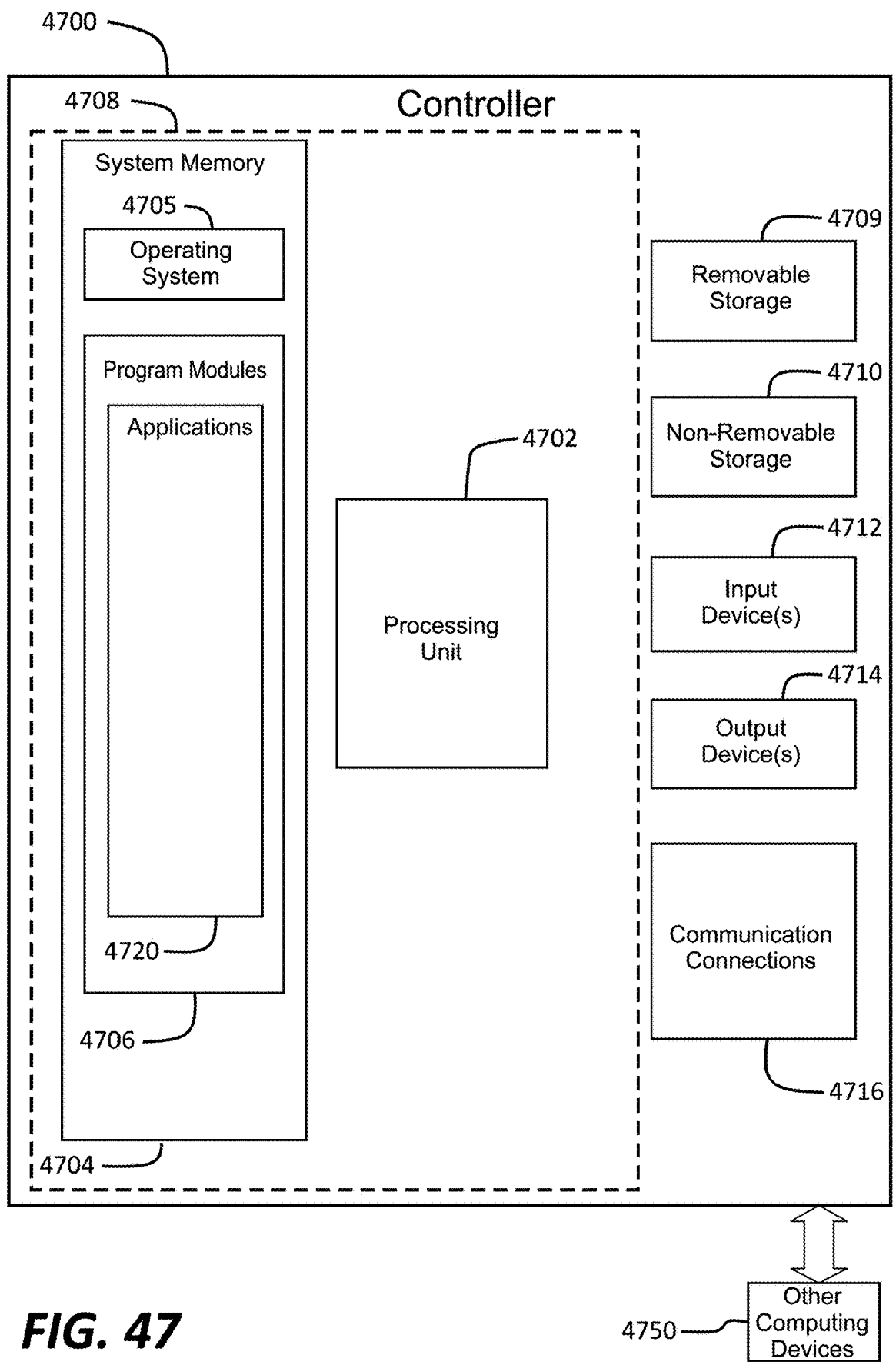
FIG. 47 schematically illustrates an example of a controller of the storefront pickup system of FIG. 1.

FIG. 47 schematically illustrates an example of the physical components (i.e., hardware) of the controller 4700 with which embodiments of the storefront pickup system 100 may be practiced. In a basic configuration, the controller 4700 includes at least one processing unit 4702 and a system memory 4704. Examples of the at least one processing unit 4702 include a central processing unit (CPU), a microcontroller, and similar devices.

The system memory 4704 may comprise, but is not limited to, volatile storage (e.g., random access memory), non-volatile storage (e.g., read-only memory), flash memory, or any combination thereof. The system memory 4704 may include an operating system 4705 and one or more program modules 4706 suitable for running software applications 4720. The operating system 4705 may be suitable for controlling the operation of the storefront pickup system 100.

A number of program modules 4706 and data files may be stored in the system memory 4704. While executing on the at least one processing unit 4702, the program modules 4706 may perform various tasks and methods, such as the tasks and methods described herein.

Embodiments of the storefront pickup system 100 may be practiced in conjunction with other operating systems, or other application programs not limited to any application or system. The basic configuration of the controller 4700 is illustrated by those components within a dashed line 4708 shown in FIG. 47. The controller 4700 may have additional features or functionality. For example, the controller 4700 may include additional data storage devices (removable and/or non-removable). The additional storage is illustrated by a removable storage device 4709 and a non-removable storage device 4710.

Further embodiments of the storefront pickup system 100 may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 47 may be integrated onto a single integrated circuit.

Such an SOC device may include one or more processing units, graphics units, communications units, system virtualization units and various application functionality all of which are integrated onto the chip substrate as a single integrated circuit. When operating via an SOC, the functionality, described herein, may be operated via application-specific logic integrated with other components of the controller 4700 on the single integrated circuit (chip). Embodiments of the storefront pickup system 100 may also be practiced using other technologies capable of performing logical operations. In addition, embodiments of the disclosure may be practiced within a general-purpose computer or in any other circuits or systems.

The term computer readable media as used herein may include non-transitory computer storage media. Computer storage media may include volatile and nonvolatile, removable, and non-removable media implemented in any method or technology for storage of information, such as computer readable instructions, data structures, or program modules.

The system memory 4704, the removable storage device 4709, and the non-removable storage device 4710 are all computer storage media examples (i.e., memory storage.) Computer storage media may include RAM, ROM, electrically erasable read-only memory (EEPROM), flash memory or other memory technology, or any other article of manufacture which can be used to store information, and which can be accessed by the controller 4700. Any such computer storage media may be part of the controller 4700.

The controller 4700 may be connected to one or more input devices 4712. Examples of the input devices 4712 can include the control panel 220, and the like. The controller 4700 may also be connected to one or more output devices 4714. Examples of the output devices 4714 can include the electric motor 136, HVAC system 188, and the control panel 220.

The controller 4700 can also be connected to communication devices 4716 for allowing communications with other computing devices 4750 such as mobile devices (e.g., smartphones, tablets, etc.) operated by customers and employees. Communication connections between the controller 4700 and the other computing devices 4750 can be affected through the wireless antenna 129. Examples of communication connections can include, without limitation, Bluetooth, Wi-Fi, Cellular networks (including 4G and 5G networks), RF transmitter, receiver, and/or transceiver circuitry; universal serial bus (USB), parallel, and/or serial ports, and the like.

Communication media may be embodied by computer readable instructions, data structures, program modules, or other data in a modulated data signal, such as a carrier wave or other transport mechanism, and includes any information delivery media. The term "modulated data signal" describes a signal having characteristics set or changed in such a manner as to encode information in the signal. Communication media may include wired media such as a wired network or direct-wired connection, and wireless media such as Bluetooth, Wi-Fi, Cellular (including 4G and 5G networks), radio frequency (RF), infrared, and other wireless media.

Embodiments of the present invention may be utilized in various distributed computing environments where tasks are performed by remote processing devices that are linked through a communications network in a distributed computing environment.

The block diagrams depicted herein are just examples. There may be many variations to these diagrams described therein without departing from the spirit of the disclosure. For instance, components may be added, deleted, or modified.

The various embodiments described above are provided by way of illustration only and should not be construed to be limiting in any way. Various modifications can be made to the embodiments described above without departing from the true spirit and scope of the disclosure.

What is claimed is:

1. A storefront pickup system, comprising:
 a building having an interior and an exterior;
 a support structure configured for installation into a storefront of the building;
 at least one storage compartment defined by the support structure, the at least one storage compartment including:
  a rear door assembly providing access from the interior of the building to the at least one storage compartment;
  a front door assembly providing access from the exterior of the building to the at least one storage compartment; and
 an exterior faceplate attached to the support structure, the exterior faceplate surrounding the at least one storage compartment and being made of a weather-resistant material;
 wherein the storefront pickup system provides a thermal break between the exterior and the interior of the building to allow ordered items to travel through the storefront.

2. The system of claim 1, wherein the support structure includes a top plate that is sloped in a direction toward the exterior of the building for runoff of moisture.

3. The system of claim 1, wherein the at least one storage compartment includes a sensor to detect placement of the ordered items inside the at least one storage compartment and to detect removal of the ordered items from the at least one storage compartment.

4. The system of claim 3, wherein the at least one storage compartment includes a sterilization assembly that is automated to sterilize the at least one storage compartment after the sensor detects removal of the ordered items from the at least one storage compartment.

5. The system of claim 4, where the sterilization assembly includes at least one light source that emits ultraviolet light for sanitization of the at least one storage compartment.

6. The system of claim 5, wherein the front door assembly includes a window coated with a protective film to block the ultraviolet light emitted from the at least one light source from exiting the at least one storage compartment.

7. The system of claim 1, further comprising a heating, ventilation, and air conditioning system configured to control temperature inside the at least one storage compartment.

8. The system of claim 1, wherein the at least one storage compartment further includes:
 a base mesh screen;
 a track positioned over the base mesh screen; and
 a washable tray configured to hold the ordered items inside the at least one storage compartment, the washable tray having a track channel for sliding on the track from the interior of the building, and wherein the track includes a stopper that prevents removal of the washable tray from the exterior of the building.

9. The system of claim 1, wherein the support structure defines at least one column of storage compartments, the at least one column including multiple storage compartments.

10. A storage compartment for a storefront pick up system, the storage compartment comprising:
 a housing defining an internal cavity;
 a rear door assembly attached to the housing, the rear door assembly providing access to the internal cavity from an interior of a building;
 a front door assembly attached to the housing, the front door assembly providing access to the internal cavity from an exterior of the building;
 a sensor to detect placement of ordered items inside the internal cavity and to detect removal of the ordered items from the internal cavity; and
 a sterilization assembly automated to sanitize the internal cavity after the sensor detects that the ordered items are removed from the internal cavity, wherein the sterilization assembly includes at least one light source configured to emit ultraviolet light to sanitize the internal cavity, and wherein the front door assembly includes a window coated with a protective film to block the ultraviolet light from exiting the internal cavity during sanitization.

11. The storage compartment of claim 10, further comprising:
 a base mesh screen;
 a track positioned over the base mesh screen; and
 a washable tray configured to hold the ordered items inside the at least one storage compartment, the washable tray having a track channel for sliding on the track from the interior of the building, and wherein the track includes a stopper that prevents removal of the washable tray from the exterior of the building.

12. The storage compartment of claim 10, further comprising:
 a temperature sensor configured to monitor temperature inside the internal cavity.

13. The storage compartment of claim 10, wherein the internal cavity is connected to a heating, ventilation, and air conditioning system to control temperature inside the internal cavity.

14. The storage compartment of claim 10, further comprising:
 a motor configured to rotate a rod;
 wherein a first end of the front door assembly is connected to the pivot rod, and an opposite end of the front door assembly includes a latch engaging a casing on the housing; and
 wherein the storage compartment is configured to receive a signal indicating that a customer is ready to pick up the ordered items, the signal causing the latch to disengage from the casing, and the signal further causing the motor to rotate the rod to rotate the front door assembly into an open position.

15. The storage compartment of claim 14, wherein the signal is received from a mobile device operated by the customer.

16. The storage compartment of claim 14, wherein the rod rotates the front door assembly from the open position into a closed position, causing the latch to re-engage with the casing to lock the front door assembly in response to the sensor detecting removal of the ordered items.

17. The storage compartment of claim 14, wherein the rear door assembly is prevented from opening while the front door assembly is in the open position.

18. The storage compartment of claim 10, wherein the rear and front door assemblies are both thermally insulated.

* * * * *